US008808570B2

(12) United States Patent
Low

(10) Patent No.: US 8,808,570 B2
(45) Date of Patent: Aug. 19, 2014

(54) HEAT TRANSFER COMPOSITIONS

(75) Inventor: Robert E. Low, Cheshire (GB)

(73) Assignee: Mexichem Amanco Holding S.A. de C.V., Tlalnepantla, Estado de Mexico (MX)

(*) Notice: Subject to any disclaimer, the term of this patent is extended or adjusted under 35 U.S.C. 154(b) by 0 days.

(21) Appl. No.: 13/698,803

(22) PCT Filed: May 20, 2011

(86) PCT No.: PCT/GB2011/000768
§ 371 (c)(1),
(2), (4) Date: Jan. 30, 2013

(87) PCT Pub. No.: WO2011/144905
PCT Pub. Date: Nov. 24, 2011

(65) Prior Publication Data
US 2013/0126776 A1   May 23, 2013

(30) Foreign Application Priority Data

| May 20, 2010 | (GB) | 1008438.2 |
| Jun. 16, 2010 | (GB) | 1010057.6 |
| Dec. 6, 2010 | (GB) | 1020624.1 |
| Feb. 14, 2011 | (GB) | 1102556.6 |

(51) Int. Cl.
- C09K 5/04 (2006.01)
- C08J 9/00 (2006.01)
- B08B 3/00 (2006.01)
- F03C 99/00 (2010.01)

(52) U.S. Cl.
USPC ............ 252/67; 252/68; 252/69; 252/364; 521/131; 62/114; 134/36; 60/531

(58) Field of Classification Search
USPC .......... 252/67, 68, 69, 364; 521/131; 62/114; 134/36; 60/531
See application file for complete search history.

(56) References Cited

U.S. PATENT DOCUMENTS

| 3,723,318 | A | 3/1973 | Butler |
| 3,884,828 | A | 5/1975 | Butler |
| 5,053,155 | A | 10/1991 | Mahler |
| 5,616,275 | A | 4/1997 | Chisolm et al. |
| 5,714,083 | A | 2/1998 | Turner |
| 5,788,886 | A | 8/1998 | Minor et al. |
| 6,258,292 | B1 | 7/2001 | Turner |
| 6,374,629 | B1 | 4/2002 | Oberle et al. |
| 6,426,019 | B1 | 7/2002 | Acharya et al. |
| 7,238,299 | B2 | 7/2007 | Singh et al. |
| 7,279,451 | B2* | 10/2007 | Singh et al. ............ 510/412 |
| 7,629,306 | B2 | 12/2009 | Shankland et al. |
| 7,829,748 | B1 | 11/2010 | Tung et al. |
| 7,846,355 | B2 | 12/2010 | Nappa et al. |
| 7,862,742 | B2 | 1/2011 | Minor et al. |
| 7,914,696 | B2* | 3/2011 | Low et al. ............ 252/67 |
| 8,333,901 | B2* | 12/2012 | Low ............ 252/67 |
| 8,454,853 | B2* | 6/2013 | Van Horn et al. ......... 252/68 |
| 8,512,591 | B2* | 8/2013 | Low ............ 252/67 |
| 2002/0046568 | A1 | 4/2002 | Thomas et al. |
| 2003/0042463 | A1 | 3/2003 | Arman et al. |
| 2004/0119047 | A1 | 6/2004 | Singh et al. |
| 2004/0127383 | A1 | 7/2004 | Pham et al. |
| 2004/0256594 | A1 | 12/2004 | Singh et al. |
| 2005/0233923 | A1 | 10/2005 | Singh et al. |
| 2005/0233932 | A1 | 10/2005 | Singh et al. |
| 2005/0247905 | A1 | 11/2005 | Singh et al. |
| 2006/0043331 | A1 | 3/2006 | Shankland et al. |
| 2006/0243944 | A1 | 11/2006 | Minor et al. |
| 2006/0243945 | A1 | 11/2006 | Minor et al. |
| 2007/0007488 | A1* | 1/2007 | Singh et al. ............ 252/68 |
| 2007/0010592 | A1* | 1/2007 | Bowman et al. ............ 521/131 |
| 2007/0069175 | A1 | 3/2007 | Thomas et al. |
| 2007/0108403 | A1 | 5/2007 | Sievert et al. |
| 2007/0210275 | A1 | 9/2007 | Luly et al. |
| 2007/0210276 | A1 | 9/2007 | Luly et al. |
| 2007/0290177 | A1* | 12/2007 | Singh et al. ............ 252/601 |
| 2008/0069177 | A1 | 3/2008 | Minor et al. |
| 2008/0098755 | A1 | 5/2008 | Singh et al. |
| 2008/0099190 | A1* | 5/2008 | Singh et al. ............ 165/104.21 |
| 2008/0121837 | A1 | 5/2008 | Singh et al. |
| 2008/0171652 | A1 | 7/2008 | Singh et al. |
| 2008/0230738 | A1 | 9/2008 | Minor et al. |
| 2008/0245421 | A1 | 10/2008 | Iou |

(Continued)

FOREIGN PATENT DOCUMENTS

| CA | 668494 A | 8/1963 |
| CN | 1183451 | 6/1998 |

(Continued)

OTHER PUBLICATIONS

Akasaka, R. "Applications of the Simple Multi-Fluid Model to Correlations of the Vapor-Liquid Equilibrium of Refrigerant Mixtures Containing Carbon Dioxide," *J. Thermal Sci. Tech.*, 2009, 4, 159-168.
Radermacher, R.; Hwang, Y. *Vapor Compression Heat Pumps With Refrigerant Mixtures*, "Chpt. 3 Vapor Compression Cycle Fundamentals," Taylor and Francis, NY, NY, 2005, 72 pages.
Althouse, A. D. et al., Modern Refrigeration and Air Conditioning, 1968, chapter 26, pp. 999, 1002-1003, The Goodheart-Willcox Company, Inc., Homewood, Illinois 1968.
Althouse, A. D. et al., Modern Refrigeration and Air Conditioning, 1988, chapter 27, pp. 949-975, The Goodheart-Willcox Company, Inc., South Holland, Illinois 1988.
ANSI/ASHRAE Standard 34/2007, *Designation and Safety Classification of Refrigerants*, 2007, 38 pgs., ISSN: 1041-2336.

(Continued)

Primary Examiner — Douglas McGinty
(74) Attorney, Agent, or Firm — Brinks Gilson & Lione

(57) ABSTRACT

The invention provides a heat transfer composition comprising (i) a first component selected from trans-1,3,3,3-tetrafluoropropene (R-1234ze(E)), cis-1,3,3,3-tetrafluoropropene (R-1234ze(Z)) and mixtures thereof; (ii) carbon dioxide (R-744); and (iii) a third component selected from propylene (R-1270), propane (R-290), n-butane (R-600), isobutane (R-600a), and mixtures thereof.

59 Claims, No Drawings

(56) References Cited

U.S. PATENT DOCUMENTS

| | | |
|---|---|---|
| 2008/0308763 A1 | 12/2008 | Singh et al. |
| 2008/0314073 A1 | 12/2008 | Minor |
| 2009/0120619 A1 | 5/2009 | Sievert et al. |
| 2009/0158771 A1 | 6/2009 | Low et al. |
| 2009/0253820 A1 | 10/2009 | Bowman et al. |
| 2009/0278076 A1 | 11/2009 | Singh et al. |
| 2009/0285764 A1 | 11/2009 | Singh et al. |
| 2009/0302285 A1 | 12/2009 | Singh et al. |
| 2010/0025619 A1 | 2/2010 | Riva et al. |
| 2010/0044619 A1 | 2/2010 | Hulse et al. |
| 2010/0122545 A1 | 5/2010 | Minor et al. |
| 2010/0200798 A1 | 8/2010 | Rao et al. |
| 2011/0162410 A1* | 7/2011 | Low ............................. 62/532 |
| 2013/0119299 A1* | 5/2013 | Low ............................. 252/68 |
| 2013/0126777 A1* | 5/2013 | Low ............................. 252/68 |
| 2013/0126778 A1* | 5/2013 | Low ............................. 252/68 |
| 2013/0193369 A1* | 8/2013 | Low ............................. 252/68 |

FOREIGN PATENT DOCUMENTS

| | | |
|---|---|---|
| CN | 101864276 A | 10/2010 |
| DE | 41 16 274 A1 | 11/1992 |
| EP | 0 398 147 A2 | 5/1990 |
| EP | 0 582 451 B1 | 8/1993 |
| EP | 1 167 894 A1 | 6/2001 |
| EP | 1 563 032 B1 | 10/2003 |
| EP | 2 036 943 B1 | 10/2003 |
| EP | 1 725 628 B1 | 10/2004 |
| EP | 1 716 216 B1 | 4/2005 |
| EP | 1 985 680 A2 | 3/2006 |
| EP | 1 743 010 A1 | 1/2007 |
| EP | 1 832 640 A1 | 3/2007 |
| EP | 2 246 649 A1 | 2/2009 |
| EP | 2 249 104 A1 | 3/2009 |
| EP | 2 149 592 A2 | 7/2009 |
| GB | 950876 | 2/1964 |
| GB | 2 435 747 A | 9/2007 |
| GB | 2 440 258 A | 1/2008 |
| JP | H4-110388 | 4/1992 |
| RU | 2 073 058 C1 | 2/1997 |
| WO | WO98/50331 A1 | 11/1998 |
| WO | WO2004/037752 A2 | 5/2004 |
| WO | WO2004/037913 A2 | 5/2004 |
| WO | WO2005/042663 A1 | 5/2005 |
| WO | WO2005/103190 A1 | 11/2005 |
| WO | WO2005/103191 A2 | 11/2005 |
| WO | WO2005/103192 A1 | 11/2005 |
| WO | WO2005/105947 A2 | 11/2005 |
| WO | WO2005/108522 A1 | 11/2005 |
| WO | WO2005/108523 A1 | 11/2005 |
| WO | WO2006/094303 A3 | 9/2006 |
| WO | WO2007/002625 A2 | 1/2007 |
| WO | WO2007/053697 A2 | 5/2007 |
| WO | WO2007/109748 A2 | 9/2007 |
| WO | WO2008/027555 A2 | 3/2008 |
| WO | WO2008/065011 A1 | 6/2008 |
| WO | WO2008/076272 A2 | 6/2008 |
| WO | WO2008/121776 A1 | 10/2008 |
| WO | WO2008/121783 A1 | 10/2008 |
| WO | WO2008/121785 A1 | 10/2008 |
| WO | WO2009/047535 A2 | 4/2009 |
| WO | WO2009/134957 A2 | 11/2009 |
| WO | WO2009/151669 A1 | 12/2009 |
| WO | WO2010/000993 A2 | 1/2010 |
| WO | WO2010/000994 A2 | 1/2010 |
| WO | WO2010/002020 A1 | 1/2010 |
| WO | WO2010/002023 A1 | 1/2010 |
| WO | WO2010/056695 A2 | 5/2010 |
| WO | WO2010/059677 A2 | 5/2010 |
| WO | WO2010/075046 A2 | 7/2010 |
| WO | WO2010/088320 A1 | 8/2010 |
| WO | WO2010/119265 A1 | 10/2010 |
| WO | WO2011/056824 A2 | 5/2011 |
| WO | WO2011/144906 A2 | 11/2011 |
| WO | WO2011/144908 A2 | 11/2011 |
| WO | WO2011/144909 A2 | 11/2011 |

OTHER PUBLICATIONS

ASTM E681-04, *Standard Test Method for Concentration Limits of Flammability of Chemicals (Vapors and Gases)*, 2004, pp. 1-12., ASTM International.

ASTM E681-04, *Standard Test Method for Concentration Limits of Flammability of Chemicals (Vapors and Gases)*, 2004, pp. 6-12., ASTM International.

Barrault et al., Analysis of the Economic and Environmental Consequences of a Phase Out or Considerable Reduction Leakage of Mobile Air Conditioners, Feb. 2003, pp. 1-53, Armines, Paris, France.

Brown, J. Steven, *HFOs New, Low Global Warming Potential Refrigerants*, Aug. 2009, pp. 22-29, American Society of Heating, Atlanta, Georgia.

Downing, R. C., *Fluorocarbon Refrigerants Handbook*, 1988, Prentice-Hall, pp. 21-22, and pp. 371-372.

International Search Report and the Written Opinion of the International Searching Authority dated Jan. 23, 2012, issued in PCT/GB2011/000768, 15 pgs., International Searching Authority of the European Patent Office, Rijswijk, The Netherlands.

International Search Report and the Written Opinion of the International Searching Authority dated Jan. 18, 2012, issued in PCT/GB2011/000769, 16 pgs., International Searching Authority of the European Patent Office, Rijswijk, The Netherlands.

International Search Report and the Written Opinion of the International Searching Authority dated Jan. 18, 2012, issued in PCT/GB2011/000771, 15 pgs., International Searching Authority of the European Patent Office, Rijswijk, The Netherlands.

International Search Report and the Written Opinion of the International Searching Authority dated Jan. 18, 2012, issued in PCT/GB2011/000772, 16 pgs., International Searching Authority of the European Patent Office, Rijswijk, The Netherlands.

Kleiber, Michael, *Fluid Phase Equilibria*, 1994, pp. 149-194, Elsevier Science Publishers B.V., Amsterdam.

Kutz, Myer, *Mechanical Engineers' Handbook*, 1998, $2^{nd}$ Edition, p. 1887, John Wiley & Sons, Inc., New York.

Langley, Billy C., *Refrigeration and Air Conditioning*, 1986, $3^{rd}$ Edition, p. 525-526, Prentice-Hall, Englewood Cliffs, New Jersey.

Lee et al., *Phase Equilibria of Chlorofluorocarbon Alternative Refrigerant*, 1999, pp. 190-192, American Chemical Society, Washington, DC.

Lee et al., *Measurement of Vapor-Liquid Equilibria for the Binary Mixture Difluoromethane (HFC-32) + Propulene (R-1270)*, 2005, pp. 419-424, American Chemical Society, Washington, DC.

Lemmon, Huber, and McLinden, *NIST Reference Fluid Thermodynamic and Transport Properties—REFPROP Version 8.0 User's Guide*, Apr. 2007, 57 pgs., U.S. Department of Commerce, Gaithersburg, Maryland.

Nagel, M. et al., *Vapour-liquid Equilibrium of Ternary Mixtures of the Refrigerants, R32, R125 and R134a*, 1995, pp. 534-543, Elsevier Science Ltd and HR, Great Britain.

Morrissey, C. J., *NASA Contract NAS-7-918 Technical Support Package on Nearly Azeotropic Mixtures to Replace Refrigerant 12*, Aug. 1992, pp. 1-39, California Institute of Technology, Pasadena, California.

Orkin, Vladimir L., *Photochemistry of Bromine-Containing Fluorinated Alkenes: Reactivity Toward OH and UV Spectra*, 2002, pp. 10195-10199, American Chemical Society, Washington, DC.

Papasavva and Hill, Global Refrigerants Energy & Environmental Mobile Air Conditioning—Life Cycle Climate Performance, Jul. 17, 2007, 35 pgs., SAE $8^{th}$ Alternate Refrigerant Systems Symposium, Scottsdale, Arizona, http://www.sae.org/events/aars/presentations/2007papasavva.pdf.

Poling, Prausnitz, and O'Connell, *The Properties of Gases and Liquids*, 2001, Extracts from Chapters 2-7, McGraw Hill, New York.-

(56) References Cited

OTHER PUBLICATIONS

Poling, Prausnitz, and O'Connell, *The Properties of Gases and Liquids*, 2001, Extracts from Chapters 8, McGraw Hill, New York.

Puhl, C., *Compressor Testing Results & Findings with the Usage of HFO-1234yf*, Feb. 2009, Presentation at VDA Winter Meeting, Saalfelden.

*Regulation of the European Parliament and the Council on Certain Fluorinated Greenhouse Gases*, 2003, pp. 1-42, Commission of the European Communities, Brussels.

Rivollet et al., *Vapor-Liquid Equilibrium Data for the Carbon Dioxide (CO2) + Difluoromethane (R32) System at Temperatures from 283.12 to 343.25 K and Pressures upt to 7.46 MPa*, 2003, pp. 95-101, Elsevier B.V., Amsterdam.

Solomon et al., Contribution of Working Group I to the Fourth Assessment Report of the Intergovernmental Panel on Climate Change, 2007, Table 2.14 and graph.

Takizawa et al, *Reaction Stoichiometry for Combustion of Fluoroethane Blends*, Jul. 1, 2006 pp. 1-12, ASHRAE Transactions, ISSN: 0001-2505.

*The Scientific Assessment of Ozone Depletion 2002 Chapter 1: Controlled Substances and Other Source Gases*, 2002, pp. 1-83.

*The Scientific Assessment of Ozone Depletion 2002 Chapter 6: Radiative Forcing of Climate Change*, 2002, pp. 351-415.

Total equivalent warming impact, 2013, http://en.wikipedia.org/wiki/Total_equivalent_warming_impact.

Van Ness, H. C. et at., *Vapor-Liquid Equilibrium: Part V. Data Reduction by Maximum Likelihood*, Nov. 1978, pp. 1005-1063, AIChE Journal, The American Institute of Chemical Engineers, New York, New York.

Supplementary European Search Report dated May 8, 2006, issued in EP03776535, 86 pgs., with Documents Considered to be Relevant (Chemical Abstract for "Nonazeotropic working media for thermal cycle," WO 2004/037752 A3, and CN1083474C with English abstract and partial translation).

\* cited by examiner

HEAT TRANSFER COMPOSITIONS

CROSS-REFERENCE TO RELATED APPLICATIONS

This application is the U.S. National Phase under 35 U.S.C. §371 of International Application No. PCT/GB2011/000768, filed May 20, 2011, designating the United States and published in English on Nov. 24, 2011, as WO 2011/144905, which claims priority to United Kingdom Application No. 1008438.2, filed May 20, 2010, United Kingdom Application No. 1010057.6, filed Jun. 16, 2010, United Kingdom Application No. 1020624.1, filed Dec. 6, 2010, and United Kingdom Application No. 1102556.6, filed Feb. 14, 2011, each of which is incorporated by reference in its entirety.

FIELD

The invention relates to heat transfer compositions, and in particular to heat transfer compositions which may be suitable as replacements for existing refrigerants such as R-134a, R-152a, R-1234yf, R-22, R-410A, R-407A, R-407B, R-407C, R507 and R-404a.

BACKGROUND

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred in a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals, or as a result of ready degradation through photolytic processes.

R-410A and R-407 refrigerants (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. R-134a is an energy efficient refrigerant, used currently for automotive air conditioning. However it is a greenhouse gas with a GWP of 1430 relative to $CO_2$ (GWP of $CO_2$ is 1 by definition). The proportion of the overall environmental impact of automotive air conditioning systems using this gas, which may be attributed to the direct emission of the refrigerant, is typically in the range 10-20%. Legislation has now been passed in the European Union to rule out use of refrigerants having GWP of greater than 150 for new models of car from 2011. The car industry operates global technology platforms, and in any event emission of greenhouse gas has global impact, thus there is a need to find fluids having reduced environmental impact (e.g. reduced GWP) compared to HFC-134a.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular it is believed that its lower flammable limit in air is too low, its flame speeds are too high, and its ignition energy is too low.

Thus there is a need to provide alternative refrigerants having improved properties such as low flammability. Fluorocarbon combustion chemistry is complex and unpredictable. It is not always the case that mixing a non-flammable fluorocarbon with a flammable fluorocarbon reduces the flammability of the fluid or reduces the range of flammable compositions in air. For example, the inventors have found that if non-flammable R-134a is mixed with flammable R-152a, the lower flammable limit of the mixture alters in a manner which is not predictable. The situation is rendered even more complex and less predictable if ternary or quaternary compositions are considered.

There is also a need to provide alternative refrigerants that may be used in existing devices such as refrigeration devices with little or no modification.

R-1234yf (2,3,3,3-tetrafluoropropene) has been identified as a candidate alternative refrigerant to replace R-134a in certain applications, notably the mobile air conditioning or heat pumping applications. Its GWP is about 4. R-1234yf is flammable but its flammability characteristics are generally regarded as acceptable for some applications including mobile air conditioning or heat pumping. In particular, when compared with R-152a, its lower flammable limit is higher, its minimum ignition energy is higher and the flame speed in air is significantly lower than that of R-152a.

The environmental impact of operating an air conditioning or refrigeration system, in terms of the emissions of greenhouse gases, should be considered with reference not only to the so-called "direct" GWP of the refrigerant, but also with reference to the so-called "indirect" emissions, meaning those emissions of carbon dioxide resulting from consumption of electricity or fuel to operate the system. Several metrics of this total GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact. Emissions of carbon dioxide associated with manufacture of the refrigerant and system equipment should also be considered.

The energy efficiency and refrigeration capacity of R-1234yf have been found to be significantly lower than those of R-134a and in addition the fluid has been found to exhibit increased pressure drop in system pipework and heat exchangers. A consequence of this is that to use R-1234yf and achieve energy efficiency and cooling performance equivalent to R-134a, increased complexity of equipment and increased size of pipework is required, leading to an increase in indirect emissions associated with equipment. Furthermore, the production of R-1234yf is thought to be more complex and less efficient in its use of raw materials (fluorinated and chlorinated) than R-134a. Current projections of long term pricing for R-1234yf is in the range 10-20 times greater than R-134a. This price differential and the need for extra expenditure on hardware will limit the rate at which refrigerants are changed and hence limit the rate at which the overall environmental impact of refrigeration or air conditioning may be reduced. In summary, the adoption of R-1234yf to replace R-134a will consume more raw materials and result in more indirect emissions of greenhouse gases than does R-134a.

Some existing technologies designed for R-134a may not be able to accept even the reduced flammability of some heat transfer compositions (any composition having a GWP of less than 150 is believed to be flammable to some extent).

SUMMARY

A principal object of the present invention is therefore to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 10% of the values, for example of those attained using existing refrigerants (e.g. R-134a, R-152a, R-1234yf, R-22, R-410A, R-407A, R-407B, R-407C, R507 and R-404a), and preferably within less than 10% (e.g. about 5%) of these values. It is known in the art that differences of this order between fluids are usually resolvable by redesign of equipment and system operational features. The composition should also ideally have reduced toxicity and acceptable flammability.

The subject invention addresses the above deficiencies by the provision of a heat transfer composition comprising (i) a first component selected from trans-1,3,3,3-tetrafluoropropene (R-1234ze(E)), cis-1,3,3,3-tetrafluoropropene (R-1234ze(Z)) and mixtures thereof; (ii) carbon dioxide ($CO_2$ or R-744); and (iii) a third component selected from propylene (R-1270), propane (R-290), n-butane (R-600), isobutane (R-600a), and mixtures thereof.

All of the chemicals herein described are commercially available. For example, the fluorochemicals may be obtained from Apollo Scientific (UK).

Typically, the compositions of the invention contain trans-1,3,3,3-tetrafluoropropene (R-1234ze(E)). The majority of the specific compositions described herein contain R-1234ze (E). It is to be understood, of course, that some or all of the R-1234ze(E) in such compositions can be replaced by R-1234ze(Z). The trans isomer is currently preferred, however.

Typically, the composition of the invention contain at least about 5% by weight R-1234ze(E), preferably at least about 15% by weight. In one embodiment, the compositions of the invention contain at least about 45% by weight R-1234ze(E), for example from about 50 to about 98% by weight.

The preferred amounts and choice of components for the invention are determined by a combination of properties:
 (a) Flammability: non-flammable or weakly flammable compositions are preferred.
 (b) Effective operating temperature of the refrigerant in an air conditioning system evaporator.
 (c) Temperature "glide" of the mixture and its effect on heat exchanger performance.
 (d) Critical temperature of the composition. This should be higher than the maximum expected condenser temperature.

DETAILED DESCRIPTION

The effective operating temperature in an air conditioning cycle, especially automotive air conditioning, is limited by the need to avoid ice formation on the air-side surface of the refrigerant evaporator. Typically air conditioning systems must cool and dehumidify humid air; so liquid water will be formed on the air-side surface. Most evaporators (without exception for the automotive application) have finned surfaces with narrow fin spacing. If the evaporator is too cold then ice can be formed between the fins, restricting the flow of air over the surface and reducing overall performance by reducing the working area of the heat exchanger.

It is known for automotive air-conditioning applications (*Modern Refrigeration and Air Conditioning* by AD Althouse et al, 1988 edition, Chapter 27, which is incorporated herein by reference) that refrigerant evaporation temperatures of −2° C. or higher are preferred to ensure that the problem of ice formation is thereby avoided.

It is also known that non-azeotropic refrigerant mixtures exhibit temperature "glide" in evaporation or condensation. In other words, as the refrigerant is progressively vaporised or condensed at constant pressure, the temperature rises (in evaporation) or drops (in condensation), with the total temperature difference (inlet to outlet) being referred to as the temperature glide. The effect of glide on evaporation and condensation temperature must also be considered.

The critical temperature of a heat transfer composition should be higher than the maximum expected condenser temperature. This is because the cycle efficiency drops as critical temperature is approached. As this happens, the latent heat of the refrigerant is reduced and so more of the heat rejection in the condenser takes place by cooling gaseous refrigerant; this requires more area per unit heat transferred.

R-410A is commonly used in building and domestic heat pump systems and by way of illustration its critical temperature of about 71° C. is higher than the highest normal condensing temperature required to deliver useful warm air at about 50° C. The automotive duty requires air at about 50° C. so the critical temperature of the fluids of the invention should be higher than this if a conventional vapour compression cycle is to be utilised. Critical temperature is preferably at least 15K higher than the maximum air temperature.

In one aspect, the compositions of the invention have a critical temperature of greater than about 65° C., preferably greater than about 70° C.

The carbon dioxide content of the compositions of the invention is limited primarily by considerations (b) and/or (c) and/or (d) above. Conveniently, the compositions of the invention typically contain up to about 35% by weight R-744, preferably up to about 30% by weight.

In a preferred aspect, the compositions of the invention contain from about 4 to about 30% R-744 by weight, preferably from about 4 to about 28% by weight, or from about 8 to about 30% by weight, or from about 10 to about 30% by weight.

The content of the third component, which includes one or more flammable refrigerants propylene, propane, n-butane or isobutane, is selected so that even in the absence of the carbon dioxide element of the composition, the residual fluorocarbon mixture has a lower flammable limit in air at ambient temperature (e.g. 23° C.) (as determined in the ASHRAE-34 12 liter flask test apparatus) which is greater than 5% v/v, preferably greater than 6% v/v, most preferably such that the mixture is non-flammable. The issue of flammability is discussed further later in this specification.

Typically, the compositions of the invention contain up to about 20% by weight of the third component. Preferably, the compositions of the invention contain up to about 12% by weight of the third component. Conveniently, the compositions of the invention contain up to about 10% by weight of the third component. In one aspect, the compositions of the invention contain from about 1 to about 10% by weight of the third component, preferably from about 2 to about 8%, for example from about 2 to about 5%.

In one embodiment, the compositions of the invention comprise from about 10 to about 95% R-1234ze(E) by weight, from about 2 to about 30% by weight R-744, and from about 3 to about 20% by weight of the third component.

As used herein, all % amounts mentioned in compositions herein, including in the claims, are by weight based on the total weight of the compositions, unless otherwise stated.

For the avoidance of doubt, it is to be understood that the stated upper and lower values for ranges of amounts of components in the compositions of the invention described herein may be interchanged in any way, provided that the resulting ranges fall within the broadest scope of the invention.

In one embodiment the compositions of the invention consist essentially of (or consist of) the first component (e.g. R-1234ze(E)), R-744 and the third component.

By the term "consist essentially of", we mean that the compositions of the invention contain substantially no other components, particularly no further (hydro)(fluoro)compounds (e.g. (hydro)(fluoro)alkanes or (hydro)(fluoro)alkenes) known to be used in heat transfer compositions. We include the term "consist of" within the meaning of "consist essentially of".

For the avoidance of doubt, any of the compositions of the invention described herein, including those with specifically defined compounds and amounts of compounds or components, may consist essentially of (or consist of) the compounds or components defined in those compositions.

The third component is selected from R-1270, R-290, R-600, R-600a and mixtures thereof.

In one aspect, the third component contains only one of the listed components. In other words, the third component may contain only one of propylene, propane, n-butane or isobutane. Thus, the compositions of the invention may be ternary blends of R-1234ze(E), R-744 and one of the listed third components (e.g. propylene, propane, n-butane or isobutane).

However, mixtures of one or more of these compounds can be used as the third component.

The invention contemplates compositions in which additional compounds are included in the third component. Example of such compounds include difluoromethane (R-32), 1,1-difluoroethane (R-152a), fluoroethane (R-161), 1,1,1,2-tetrafluoroethane (R-134a), 2,3,3,3-tetrafluoropropene (R-1234yf), 3,3,3-trifluoropropene (R1243zf), 1,1,1-trifluoropropane (R-263fb), 1,1,1,2,3-pentafluoropropane (R-245eb), ammonia (R-717) and mixtures thereof.

For example, the compositions of the invention may include R-134a. If present, the R-134a typically is present in an amount of from about 2 to about 50% by weight, such as from about 5 to about 40% by weight (e.g. from about 5 to about 20% by weight).

Preferably, the compositions of the invention which contain R-134a are non-flammable at a test temperature of 60° C. using the ASHRAE-34 methodology. Advantageously, the mixtures of vapour that exist in equilibrium with the compositions of the invention at any temperature between about −20° C. and 60° C. are non-flammable.

In one embodiment, the third component comprises propylene. The third component may consist essentially of (or consist of) propylene.

Compositions of the invention which contain propylene typically contain it in an amount of from about 1 to about 20% by weight, conveniently in an amount of from about 2 to about 12% by weight, for example from about 3 to about 10% by weight.

Preferred compositions of the invention contain from about 60 to about 95% R-1234ze(E), from about 4 to about 30% by weight R-744 and from about 1 to about 10% by weight propylene.

Further preferred compositions of the invention contain from about 64 to about 88% R-1234ze(E), from about 10 to about 28% by weight R-744 and from about 2 to about 8% by weight propylene.

In one embodiment, the third component comprises propane. The third component may consist essentially of (or consist of) propane.

Compositions of the invention which contain propane typically contain it in an amount of from about 1 to about 20% by weight, conveniently in an amount of from about 2 to about 12% by weight, for example from about 3 to about 10% by weight.

Preferred compositions of the invention contain from about 60 to about 95% R-1234ze(E), from about 4 to about 30% by weight R-744 and from about 1 to about 10% by weight propane.

Further preferred compositions of the invention contain from about 64 to about 88% R-1234ze(E), from about 10 to about 28% by weight R-744 and from about 2 to about 8% by weight propane.

In one embodiment, the third component comprises n-butane. The third component may consist essentially of (or consist of) n-butane. Compositions of the invention which contain n-butane typically contain it in an amount of up to about 20% by weight, conveniently in an amount of from about 2 to about 12% by weight, for example from about 3 to about 10% by weight.

Preferred compositions of the invention contain from about 60 to about 95% R-1234ze(E), from about 4 to about 30% by weight R-744 and from about 1 to about 10% by weight n-butane.

Further preferred compositions of the invention contain from about 64 to about 88% R-1234ze(E), from about 10 to about 28% by weight R-744 and from about 2 to about 8% by weight n-butane.

In one embodiment, the third component comprises isobutane. The third component may consist essentially of (or consist of) isobutane. Compositions of the invention which contain isobutane typically contain it in an amount of up to about 20% by weight, conveniently in an amount of from about 2 to about 12% by weight, for example from about 3 to about 10% by weight.

Preferred compositions of the invention contain from about 60 to about 95% R-1234ze(E), from about 4 to about 30% by weight R-744 and from about 1 to about 10% by weight isobutane.

Further preferred compositions of the invention contain from about 64 to about 88% R-1234ze(E), from about 10 to about 28% by weight R-744 and from about 2 to about 8% by weight isobutane.

The compositions of the invention may further contain pentafluoroethane (R-125). If present, R-125 typically is present in amounts up to about 40% by weight, preferably from about 2 to about 20% by weight.

Compositions according to the invention conveniently comprise substantially no R-1225 (pentafluoropropene), conveniently substantially no R-1225ye (1,2,3,3,3-pentafluoropropene) or R-1225zc (1,1,3,3,3-pentafluoropropene), which compounds may have associated toxicity issues.

By "substantially no", we include the meaning that the compositions of the invention contain 0.5% by weight or less of the stated component, preferably 0.1% or less, based on the total weight of the composition.

Certain compositions of the invention may contain substantially no:
(i) 2,3,3,3-tetrafluoropropene (R-1234yf),
(ii) cis-1,3,3,3-tetrafluoropropene (R-1234ze(Z)), and/or
(iii) 3,3,3-trifluoropropene (R-1243zf).

The compositions of the invention have zero ozone depletion potential.

Typically, the compositions of the invention have a GWP that is less than 1300, preferably less than 1000, more preferably less than 800, 500, 400, 300 or 200, especially less than 150 or 100, even less than 50 in some cases. Unless otherwise stated, IPCC (Intergovernmental Panel on Climate Change) TAR (Third Assessment Report) values of GWP have been used herein.

Advantageously, the compositions are of reduced flammability hazard when compared to the third component(s) alone, e.g. propane or propylene. Preferably, the compositions are of reduced flammability hazard when compared to R-1234yf.

In one aspect, the compositions have one or more of (a) a higher lower flammable limit; (b) a higher ignition energy; or (c) a lower flame velocity compared to the third component(s) such as propane or propylene. In a preferred embodiment, the compositions of the invention are non-flammable. Advantageously, the mixtures of vapour that exist in equilibrium with the compositions of the invention at any temperature between about −20° C. and 60° C. are also non-flammable.

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE-34 methodology; it is possible to develop fluids whose flammability limits will be sufficiently reduced in air to render them safe for use in the application, for example if it is physically not possible to make a flammable mixture by leaking the refrigeration equipment charge into the surrounds.

R-1234ze(E) is non-flammable in air at 23° C., although it exhibits flammability at higher temperatures in humid air. We have determined by experimentation that mixtures of R-1234ze(E) with flammable fluorocarbons such as R-32, R-152a or R-161 will remain non-flammable in air at 23° C. if the "fluorine ratio" $R_f$ of the mixture is greater than about 0.57, where $R_f$ is defined per gram-mole of the overall refrigerant mixture as:

$R_f$=(gram-moles of fluorine)/(gram-moles fluorine+ gram-moles hydrogen)

Thus for R-161, $R_f$=1/(1+5)=1/6 (0.167) and it is flammable, in contrast R-1234ze(E) has $R_f$=4/6 (0.667) and it is non-flammable. We found by experiment that a 20% v/v mixture of R-161 in R-1234ze(E) was similarly non-flammable. The fluorine ratio of this non-flammable mixture is 0.2*(1/6)+0.8*(4/6)=0.567.

The validity of this relationship between flammability and fluorine ratio of 0.57 or higher has thusfar been experimentally proven for HFC-32, HFC-152a and mixtures of HFC-32 with HFC-152a.

Takizawa et al, *Reaction Stoichiometry for Combustion of Fluoroethane Blends*, ASHRAE Transactions 112(2) 2006 (which is incorporated herein by reference), shows that there exists a near-linear relationship between this ratio and the flame speed of mixtures comprising R-152a, with increasing fluorine ratio resulting in lower flame speeds. The data in this reference teach that the fluorine ratio needs to be greater than about 0.65 for the flame speed to drop to zero, in other words, for the mixture to be non-flammable.

Similarly, Minor et al (Du Pont Patent Application WO2007/053697) provide teaching on the flammability of many hydrofluoroolefins, showing that such compounds could be expected to be non-flammable if the fluorine ratio is greater than about 0.7.

In view of this prior art teaching, it is unexpected that that mixtures of R-1234ze(E) with flammable fluorocarbons will remain non-flammable in air at 23° C. if the fluorine ratio $R_f$ of the mixture is greater than about 0.57.

Furthermore, we identified that if the fluorine ratio is greater than about 0.46 then the composition can be expected to have a lower flammable limit in air of greater than 6% v/v at room temperature.

By producing low- or non-flammable R-744/third component/R-1234ze(E) blends containing unexpectedly low amounts of R-1234ze(E), the amounts of the third component, in particular, in such compositions are increased. This is believed to result in heat transfer compositions exhibiting increased cooling capacity and/or decreased pressure drop, compared to equivalent compositions containing higher amounts of (e.g. almost 100%) R-1234ze(E).

Thus, the compositions of the invention exhibit a completely unexpected combination of low-/non-flammability, low GWP and improved refrigeration performance properties. Some of these refrigeration performance properties are explained in more detail below.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

Advantageously, the volumetric refrigeration capacity of the compositions of the invention is at least 85% of the existing refrigerant fluid it is replacing, preferably at least 90% or even at least 95%.

The compositions of the invention typically have a volumetric refrigeration capacity that is at least 90% of that of R-1234yf. Preferably, the compositions of the invention have a volumetric refrigeration capacity that is at least 95% of that of R-1234yf, for example from about 95% to about 120% of that of R-1234yf.

In one embodiment, the cycle efficiency (Coefficient of Performance, COP) of the compositions of the invention is within about 5% or even better than the existing refrigerant fluid it is replacing Conveniently, the compressor discharge temperature of the compositions of the invention is within about 15K of the existing refrigerant fluid it is replacing, preferably about 10K or even about 5K.

The compositions of the invention preferably have energy efficiency at least 95% (preferably at least 98%) of R-134a under equivalent conditions, while having reduced or equivalent pressure drop characteristics and cooling capacity at 95% or higher of R-134a values. Advantageously the compositions have higher energy efficiency and lower pressure drop characteristics than R-134a under equivalent conditions. The compositions also advantageously have better energy efficiency and pressure drop characteristics than R-1234yf alone.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

In one embodiment, the invention provides a heat transfer device comprising a composition of the invention.

Preferably, the heat transfer device is a refrigeration device.

Conveniently, the heat transfer device is selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably, the heat transfer device is a refrigeration device or an air-conditioning system.

The compositions of the invention are particularly suitable for use in mobile air-conditioning applications, such as automotive air-conditioning systems (e.g. heat pump cycle for automotive air-conditioning).

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to a further aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, and the composition of the invention contains R134a, R-1234ze(E), R-744, the third component and any R-125 present (and optional components such as a lubricant, a stabiliser or an additional flame retardant), R-1234ze(E) and R-744, etc, can be added to the R-134a in the heat transfer device, thereby forming the compositions of the invention, and the heat transfer device of the invention, in situ. Some of the existing R-134a may be removed from the heat transfer device prior to adding the R-1234ze(E), R-744, etc, to facilitate providing the components of the compositions of the invention in the desired proportions.

Thus, the invention provides a method for preparing a composition and/or heat transfer device of the invention comprising introducing R-1234ze(E), R-744, the third component, any R-125 desired, and optional components such as a lubricant, a stabiliser or an additional flame retardant, into a heat transfer device containing an existing heat transfer fluid which is R-134a. Optionally, at least some of the R-134a is removed from the heat transfer device before introducing the R-1234ze(E), R-744, etc.

Of course, the compositions of the invention may also be prepared simply by mixing the R-1234ze(E), R-744, the third component, any R-125 desired (and optional components such as a lubricant, a stabiliser or an additional flame retardant) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning or refrigeration.

Examples of suitable products include heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluoro-carbon compound or it may comprise a fluorinated olefin Preferably, the existing compound or composition is a heat transfer compound or composition such as a refrigerant. Examples of refrigerants that may be replaced include R-134a, R-152a, R-1234yf, R-410A, R-407A, R-407B, R-407C, R507, R-22 and R-404A. The compositions of the invention are particularly suited as replacements for R-134a, R-152a or R-1234yf, especially R-134a or R-1234yf.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

EXAMPLES

Flammability

It has been found that ternary nonazeotropic mixtures of R-744/third component/R-1234ze(E) can be used as refrigerant fluids having lower flammability as compared to R-1234yf or to the third component (propane, propylene, n-butane and/or isobutane) alone while exhibiting superior capacity and energy efficiency.

Modelled Performance Data

Generation of Accurate Physical Property Model

The physical properties of R-1234yf and R-1234ze(E) required to model refrigeration cycle performance, namely critical point, vapour pressure, liquid and vapour enthalpy, liquid and vapour density and heat capacities of vapour and liquid were accurately determined by experimental methods over the pressure range 0-200 bar and temperature range −40 to 200° C., and the resulting data used to generate Helmholtz free energy equation of state models of the Span-Wagner type for the fluid in the NIST REFPROP Version 8.0 software, which is more fully described in the user guide www.nist.gov/srd/PDFfiles/REFPROP8.PDF, and is incorporated herein by reference. The variation of ideal gas enthalpy of both fluids with temperature was estimated using molecular modelling software Hyperchem v7.5 (which is incorporated herein by reference) and the resulting ideal gas enthalpy function was used in the regression of the equation of state for these fluids. The predictions of this model for R1234yf and R1234ze(E) were compared to the predictions yielded by use of the standard files for R1234yf and R1234ze(E) included in REFPROP Version 9.0 (incorporated herein by reference). It was found that close agreement was obtained for each fluid's properties.

The vapour liquid equilibrium behaviour of R-1234ze(E) was studied in a series of binary pairs with carbon dioxide, R-32, R-125, R-134a, R-152a, R-161, propane and propylene over the temperature range −40 to +60° C., which encompasses the practical operating range of most refrigeration and air conditioning systems. The composition was varied over the full compositional space for each binary in the experimental programme, Mixture parameters for each binary pair were regressed to the experimentally obtained data and the parameters were also incorporated into the REFPROP software model. The academic literature was next searched for data on the vapour liquid equilibrium behaviour of carbon dioxide with the hydrofluorocarbons R-32, R-125, R-152a, R-161 and R-152a. The VLE data obtained from sources referenced in the article *Applications of the simple multi-fluid model to correlations of the vapour-liquid equilibrium of refrigerant mixtures containing carbon dioxide*, by R. Akasaka, Journal of Thermal Science and Technology, 159-168, 4, 1, 2009 (which is incorporated herein by reference) were then used to generate mixing parameters for the relevant binary mixtures and these were then also incorporated into the REFPROP model. The standard REFPROP mixing parameters for carbon dioxide with propane and propylene were also incorporated to this model.

The resulting software model was used to compare the performance of selected fluids of the invention with R-134a in a heat pumping cycle application.

Heat Pumping Cycle Comparison

In a first comparison the behaviour of the fluids was assessed for a simple vapour compression cycle with conditions typical of automotive heat pumping duty in low winter ambient temperatures. In this comparison pressure drop effects were included in the model by assignation of a representative expected pressure drop to the reference fluid (R-134a) followed by estimation of the equivalent pressure drop for the mixed refrigerant of the invention in the same equipment at the same heating capacity. The comparison was made on the basis of equal heat exchanger area for the reference fluid (R-134a) and for the mixed fluids of the invention. The methodology used for this model was derived using the assumptions of equal effective overall heat transfer coefficient for refrigerant condensation, refrigerant evaporation, refrigerant liquid subcooling and refrigerant vapour superheating processes to derive a so-called UA model for the process. The derivation of such a model for nonazeotropic refrigerant mixtures in heat pump cycles is more fully explained in the reference text *Vapor Compression Heat Pumps with refrigerant mixtures* by R Radermacher & Y Hwang (pub Taylor & Francis 2005) Chapter 3, which is incorporated herein by reference.

Briefly, the model starts with an initial estimate of the condensing and evaporating pressures for the refrigerant mixture and estimates the corresponding temperatures at the beginning and end of the condensation process in the condenser and the evaporation process in the evaporator. These temperatures are then used in conjunction with the specified changes in air temperatures over condenser and evaporator to estimate a required overall heat exchanger area for each of the condenser and evaporator. This is an iterative calculation: the condensing and evaporating pressures are adjusted to ensure that the overall heat exchanger areas are the same for reference fluid and for the mixed refrigerant.

For the comparison the worst case for heat pumping in automotive application was assumed with the following assumptions for air temperature and for R-134a cycle conditions.

Cycle Conditions

| | |
|---|---|
| Ambient air temperature on to condenser and evaporator | −15° C. |
| Air temperature leaving evaporator: | −25° C. |
| Air temperature leaving condenser (passenger air) | +45° C. |
| R134a evaporating temperature | −30° C. |
| R-134a condensing temperature | +50° C. |
| Subcooling of refrigerant in condenser | 1K |
| Superheating of refrigerant in evaporator | 5K |
| Compressor suction temperature | 0° C. |
| Compressor isentropic efficiency | 66% |
| Passenger air heating load | 2 kW |
| Pressure drop in evaporator for R-134a | 0.03 bar |
| Pressure drop in condenser for R-134a | 0.03 bar |
| Pressure drop in suction line for R-134a | 0.03 bar |

The model assumed countercurrent flow for each heat exchanger in its calculation of effective temperature differences for each of the heat transfer processes.

Condensing and evaporating temperatures for compositions was adjusted to give equivalent usage of heat exchange area as reference fluid. The following input parameters were used.

| Parameter | | Reference |
|---|---|---|
| Refrigerant | | R134a |
| Mean condenser temperature | ° C. | 50 |
| Mean evaporator temperature | ° C. | −30 |

-continued

| Parameter | | Reference |
|---|---|---|
| Condenser subcooling | K | 1 |
| Evaporator superheat | K | 5 |
| Suction diameter | mm | 16.2 |
| Heating capacity | kW | 2 |
| Evaporator pressure drop | bar | 0.03 |
| Suction line pressure drop | bar | 0.03 |
| Condenser pressure drop | bar | 0.03 |
| Compressor suction temperature | °C. | 0 |
| Isentropic efficiency | | 66% |
| Evaporator air on | °C. | −15.00 |
| Evaporator air off | °C. | −25.00 |
| Condenser air on | °C. | −15.00 |
| Condenser air off | °C. | 45.00 |
| Condenser area | 100.0% | 100.0% |
| Evaporator area | 100.0% | 100.0% |

Using the above model, the performance data for the reference R-134a is shown below.

| | | |
|---|---|---|
| COP (heating) | | 2.11 |
| COP (heating) relative to Reference | | 100.0% |
| Volumetric heating capacity at suction | kJ/m³ | 879 |
| Capacity relative to Reference | | 100.0% |
| Critical temperature | °C. | 101.06 |
| Critical pressure | bar | 40.59 |
| Condenser enthalpy change | kJ/kg | 237.1 |
| Pressure ratio | | 16.36 |
| Refrigerant mass flow | kg/hr | 30.4 |
| Compressor discharge temperature | °C. | 125.5 |
| Evaporator inlet pressure | bar | 0.86 |
| Condenser inlet pressure | bar | 13.2 |
| Evaporator inlet temperature | °C. | −29.7 |
| Evaporator dewpoint | °C. | −30.3 |
| Evaporator exit gas temperature | °C. | −25.3 |
| Evaporator mean temperature | °C. | −30.0 |
| Evaporator glide (out-in) | K | −0.6 |
| Compressor suction pressure | bar | 0.81 |
| Compressor discharge pressure | bar | 13.2 |
| Suction line pressure drop | Pa/m | 292 |
| Pressure drop relative to reference | | 100.0% |
| Condenser dew point | °C. | 50.0 |
| Condenser bubble point | °C. | 50.0 |
| Condenser exit liquid temperature | °C. | 49.0 |
| Condenser mean temperature | °C. | 50.0 |
| Condenser glide (in-out) | K | 0.1 |

The generated performance data for selected compositions of the invention is set out in the following Tables. The tables show key parameters of the heat pump cycle, including operating pressures, volumetric heating capacity, energy efficiency (expressed as coefficient of performance for heating COP) compressor discharge temperature and pressure drops in pipework. The volumetric heating capacity of a refrigerant is a measure of the amount of heating which can be obtained for a given size of compressor operating at fixed speed. The coefficient of performance (COP) is the ratio of the amount of heat energy delivered in the condenser of the heat pump cycle to the amount of work consumed by the compressor.

The performance of R-134a is taken as the reference point for comparison of heating capacity, energy efficiency and pressure drop. This fluid is used as a reference for comparison of the ability of the fluids of the invention to be used in the heat pump mode of an automotive combined air conditioning and heat pump system.

It should be noted in passing that the utility of fluids of the invention is not limited to automotive systems. Indeed these fluids can be used in so-called stationary (residential or commercial) equipment. Currently the main fluids used in such stationary equipment are R-410A (having a GWP of 2100) or R22 (having a GWP of 1800 and an ozone depletion potential of 0.05). The use of the fluids of the invention in such stationary equipment offers the ability to realise similar utility but with fluids having no ozone depletion potential and significantly reduced GWP compared to R410A.

It is evident that fluids of the invention can provide improved energy efficiency compared to R-134a or R-410A. It is unexpectedly found that the addition of carbon dioxide to the refrigerants of the invention can increase the COP of the resulting cycle above that of R-134a, even in case where admixture of the other mixture components would result in a fluid having worse energy efficiency than R-134a.

It is further found for all the fluids of the invention that compositions up to about 30% w/w of $CO_2$ can be used which yield refrigerant fluids whose critical temperature is about 70° C. or higher. This is particularly significant for stationary heat pumping applications where R-410A is currently used. The fundamental thermodynamic efficiency of a vapour compression process is affected by proximity of the critical temperature to the condensing temperature. R-410A has gained acceptance and can be considered an acceptable fluid for this application; its critical temperature is 71° C. It has unexpectedly been found that significant quantities of $CO_2$ (critical temperature 31° C.) can be incorporated in fluids of the invention to yield mixtures having similar or higher critical temperature to R-410A. Preferred compositions of the invention therefore have critical temperatures are about 70° C. or higher.

The heating capacity of the preferred fluids of the invention typically exceeds that of R134a. It is thought that R-134a alone, operated in an automotive a/c and heat pump system, cannot provide all of the potential passenger air heating demand in heat pump mode. Therefore higher heating capacities than R-134a are preferred for potential use in an automotive a/c and heat pump application. The fluids of the invention offer the ability to optimise fluid capacity and energy efficiency for both air conditioning and cooling modes so as to provide an improved overall energy efficiency for both duties.

For reference, the heating capacity of R-410A in the same cycle conditions was estimated at about 290% of the R-134a value and the corresponding energy efficiency was found to be about 106% of the R-134a reference value.

It is evident by inspection of the tables that fluids of the invention have been discovered having comparable heating capacities and energy efficiencies to R-410A, allowing adaption of existing R-410A technology to use the fluids of the invention if so desired.

Some further benefits of the fluids of the invention are described in more detail below.

At equivalent cooling capacity the compositions of the invention offer reduced pressure drop compared to R-134a. This reduced pressure drop characteristic is believed to result in further improvement in energy efficiency (through reduction of pressure losses) in a real system. Pressure drop effects are of particular significance for automotive air conditioning and heat pump applications so these fluids offer particular advantage for this application.

The use of hydrocarbon components in the compositions of the invention (e.g. the $CO_2$/R-1270/R-1234ze(E) and $CO_2$/R-290/R-1234ze(E) blends) results in an improved solubility and miscibility of the refrigerant with lubricants. In particular, the inclusion of hydrocarbon improves these properties in relation to synthetic hydrocarbon or mineral oil type lubricants, which can otherwise exhibit poor miscibility and low mutual solubility with hydrofluorocarbons such as R-134a.

Surprisingly, the use of hydrocarbon in the preferred amounts also results in an increase in cooling capacity of the refrigerant greater than may have been predicted using approximate estimation techniques. Without being bound by theory, it is believed that the non-ideal vapour-liquid equilibrium interaction of the hydrocarbons with R-1234ze(E) is responsible for this improvement. No azeotrope was found in determination of the vapour liquid equilibrium to exist between propene and R-1234ze(E) in the entire temperature range of relevance to the application (−40 to 60° C.) so the effect does not appear to be related to the presence of azeotropes.

The properties of selected ternary compositions of this invention in the range 2-10% w/w R-600a were estimated as described in the previous examples, using the default mixing parameters for R-1234ze(E) with R-600a estimated by the REFPROP calculation engine, to allow estimation of performance in the heat pump cycle previously discussed. The results are also shown in the appended tables. It was found that the addition of R-600a to R1234ze(E) improved the specific pressure drop and volumetric capacity of the mixture for any given amount of admixed R-744. It was also found that the critical temperature of the ternary mixture would be increased as compared to a binary R-744/R-1234ze(E) mixture having equivalent volumetric capacity. The increased critical temperature is important for improving performance in for example a dual mode (air conditioning/heat pump) system operating as an air conditioner in a hot ambient climate. The energy efficiency (COP) of the mixtures exhibited maxima corresponding to optimal R-744 content for a given level of R-600a in the mixture.

The use of R-600a in such a mixture is found to improve the miscibility of the refrigerant with PAG, POE, alkyl benzene and mineral oil lubricants. The flammability of mixtures of less than about 10% R-600a in R-1234ze(E) is anticipated as being less than that of R-1234yf.

The performance of fluids of the invention were compared to binary mixtures of $CO_2$/R1234ze(E). For all the ternary compositions of the invention the energy efficiency of the ternary mixtures was increased relative to the binary mixture having equivalent $CO_2$ content. These mixtures therefore represent an improved solution relative to the $CO_2$/R1234ze(E) binary refrigerant mixture, at least for $CO_2$ content less than 30% w/w.

TABLE 1

Theoretical Performance Data of Selected R-744/propane/R-1234ze(E) blends containing 0-14% R-744 and 4% propane

| | | Composition $CO_2$/propane/R-1234ze(E) % by weight ▶ | | | | | | | |
|---|---|---|---|---|---|---|---|---|---|
| | | 0/4/96 | 2/4/94 | 4/4/92 | 6/4/90 | 8/4/88 | 10/4/86 | 12/4/84 | 14/4/82 |
| COP (heating) | | 2.01 | 2.06 | 2.10 | 2.13 | 2.15 | 2.17 | 2.19 | 2.20 |
| COP (heating) relative to Reference | | 95.5% | 97.9% | 99.7% | 101.1% | 102.2% | 103.0% | 103.7% | 104.2% |
| Volumetric heating capacity at suction | kJ/m³ | 719 | 802 | 888 | 978 | 1071 | 1166 | 1264 | 1363 |
| Capacity relative to Reference | | 81.8% | 91.2% | 101.1% | 111.4% | 121.9% | 132.7% | 143.8% | 155.2% |
| Critical temperature | °C. | 108.61 | 104.95 | 101.45 | 98.11 | 94.94 | 91.92 | 89.05 | 86.32 |
| Critical pressure | bar | 39.97 | 40.74 | 41.51 | 42.27 | 43.03 | 43.77 | 44.50 | 45.23 |
| Condenser enthalpy change | kJ/kg | 220.6 | 232.1 | 242.3 | 251.0 | 258.8 | 265.6 | 271.8 | 277.5 |
| Pressure ratio | | 17.88 | 17.95 | 17.93 | 17.77 | 17.53 | 17.23 | 16.88 | 16.51 |
| Refrigerant mass flow | kg/hr | 32.6 | 31.0 | 29.7 | 28.7 | 27.8 | 27.1 | 26.5 | 25.9 |
| Compressor discharge temperature | °C. | 114.0 | 117.7 | 121.3 | 124.5 | 127.5 | 130.3 | 132.9 | 135.4 |
| Evaporator inlet pressure | bar | 0.74 | 0.79 | 0.85 | 0.92 | 1.00 | 1.08 | 1.16 | 1.25 |
| Condenser inlet pressure | bar | 12.1 | 13.2 | 14.4 | 15.6 | 16.8 | 18.0 | 19.1 | 20.2 |
| Evaporator inlet temperature | °C. | −29.7 | −30.4 | −31.1 | −31.9 | −32.7 | −33.6 | −34.5 | −35.4 |
| Evaporator dewpoint | °C. | −29.1 | −28.5 | −27.9 | −27.1 | −26.4 | −25.6 | −24.9 | −24.3 |
| Evaporator exit gas temperature | °C. | −24.1 | −23.5 | −22.9 | −22.1 | −21.4 | −20.6 | −19.9 | −19.3 |
| Evaporator mean temperature | °C. | −29.4 | −29.5 | −29.5 | −29.5 | −29.5 | −29.6 | −29.7 | −29.8 |
| Evaporator glide (out-in) | K | 0.5 | 1.8 | 3.2 | 4.8 | 6.3 | 7.9 | 9.6 | 11.2 |
| Compressor suction pressure | bar | 0.68 | 0.74 | 0.80 | 0.88 | 0.96 | 1.04 | 1.13 | 1.23 |
| Compressor discharge pressure | bar | 12.1 | 13.2 | 14.4 | 15.6 | 16.8 | 18.0 | 19.1 | 20.2 |
| Suction line pressure drop | Pa/m | 382 | 329 | 288 | 254 | 227 | 205 | 186 | 169 |
| Pressure drop relative to reference | | 130.6% | 112.7% | 98.5% | 87.1% | 77.8% | 70.1% | 63.5% | 58.0% |
| Condenser dew point | °C. | 54.3 | 55.8 | 57.1 | 58.2 | 59.0 | 59.6 | 60.0 | 60.3 |
| Condenser bubble point | °C. | 49.4 | 44.9 | 41.1 | 38.0 | 35.5 | 33.5 | 31.9 | 30.5 |
| Condenser exit liquid temperature | °C. | 48.4 | 43.9 | 40.1 | 37.0 | 34.5 | 32.5 | 30.9 | 29.5 |
| Condenser mean temperature | °C. | 51.9 | 50.3 | 49.1 | 48.1 | 47.3 | 46.6 | 46.0 | 45.4 |
| Condenser glide (in-out) | K | 4.9 | 11.0 | 16.1 | 20.2 | 23.5 | 26.1 | 28.2 | 29.8 |

TABLE 2

Theoretical Performance Data of Selected R-744/propane/R-1234ze(E) blends containing 16-30% R-744 and 4% propane

| | | Composition $CO_2$/propane/R-1234ze(E) % by weight ▶ | | | | | | | |
|---|---|---|---|---|---|---|---|---|---|
| | | 16/4/80 | 18/4/78 | 20/4/76 | 22/4/74 | 24/4/72 | 26/4/70 | 28/4/68 | 30/4/66 |
| COP (heating) | | 2.21 | 2.21 | 2.22 | 2.22 | 2.22 | 2.22 | 2.22 | 2.22 |
| COP (heating) relative to Reference | | 104.6% | 104.9% | 105.1% | 105.2% | 105.3% | 105.3% | 105.2% | 105.1% |
| Volumetric heating capacity at suction | kJ/m³ | 1465 | 1568 | 1672 | 1778 | 1884 | 1992 | 2099 | 2207 |
| Capacity relative to Reference | | 166.7% | 178.5% | 190.3% | 202.4% | 214.5% | 226.7% | 238.9% | 251.2% |
| Critical temperature | °C. | 83.71 | 81.23 | 78.85 | 76.58 | 74.41 | 72.34 | 70.35 | 68.44 |
| Critical pressure | bar | 45.95 | 46.67 | 47.38 | 48.08 | 48.78 | 49.48 | 50.18 | 50.87 |
| Condenser enthalpy change | kJ/kg | 282.8 | 287.7 | 292.4 | 296.9 | 301.2 | 305.4 | 309.5 | 313.4 |
| Pressure ratio | | 16.13 | 15.75 | 15.38 | 15.02 | 14.67 | 14.34 | 14.02 | 13.72 |
| Refrigerant mass flow | kg/hr | 25.5 | 25.0 | 24.6 | 24.3 | 23.9 | 23.6 | 23.3 | 23.0 |
| Compressor discharge temperature | °C. | 137.7 | 140.0 | 142.2 | 144.4 | 146.5 | 148.6 | 150.7 | 152.8 |

TABLE 2-continued

Theoretical Performance Data of Selected R-744/propane/R-1234ze(E) blends containing 16-30% R-744 and 4% propane Composition $CO_2$/propane/R-1234ze(E) % by weight▶

|  |  | 16/4/80 | 18/4/78 | 20/4/76 | 22/4/74 | 24/4/72 | 26/4/70 | 28/4/68 | 30/4/66 |
|---|---|---|---|---|---|---|---|---|---|
| Evaporator inlet pressure | bar | 1.35 | 1.45 | 1.55 | 1.66 | 1.77 | 1.88 | 1.99 | 2.11 |
| Condenser inlet pressure | bar | 21.3 | 22.4 | 23.5 | 24.6 | 25.6 | 26.6 | 27.7 | 28.7 |
| Evaporator inlet temperature | ° C. | −36.4 | −37.4 | −38.4 | −39.4 | −40.4 | −41.4 | −42.4 | −43.3 |
| Evaporator dewpoint | ° C. | −23.6 | −23.0 | −22.5 | −22.1 | −21.6 | −21.3 | −21.0 | −20.8 |
| Evaporator exit gas temperature | ° C. | −18.6 | −18.0 | −17.5 | −17.1 | −16.6 | −16.3 | −16.0 | −15.8 |
| Evaporator mean temperature | ° C. | −30.0 | −30.2 | −30.5 | −30.7 | −31.0 | −31.4 | −31.7 | −32.0 |
| Evaporator glide (out-in) | K | 12.8 | 14.4 | 15.9 | 17.4 | 18.8 | 20.1 | 21.4 | 22.6 |
| Compressor suction pressure | bar | 1.32 | 1.42 | 1.53 | 1.64 | 1.75 | 1.86 | 1.97 | 2.09 |
| Compressor discharge pressure | bar | 21.3 | 22.4 | 23.5 | 24.6 | 25.6 | 26.6 | 27.7 | 28.7 |
| Suction line pressure drop | Pa/m | 155 | 143 | 133 | 123 | 115 | 108 | 101 | 95 |
| Pressure drop relative to reference |  | 53.2% | 49.1% | 45.4% | 42.3% | 39.4% | 36.9% | 34.7% | 32.7% |
| Condenser dew point | ° C. | 60.4 | 60.3 | 60.2 | 59.9 | 59.5 | 59.1 | 58.6 | 58.1 |
| Condenser bubble point | ° C. | 29.4 | 28.4 | 27.6 | 26.9 | 26.2 | 25.7 | 25.3 | 24.9 |
| Condenser exit liquid temperature | ° C. | 28.4 | 27.4 | 26.6 | 25.9 | 25.2 | 24.7 | 24.3 | 23.9 |
| Condenser mean temperature | ° C. | 44.9 | 44.3 | 43.9 | 43.4 | 42.9 | 42.4 | 41.9 | 41.5 |
| Condenser glide (in-out) | K | 31.0 | 31.9 | 32.6 | 33.0 | 33.3 | 33.4 | 33.4 | 33.2 |

TABLE 3

Theoretical Performance Data of Selected R-744/propane/R-1234ze(E) blends containing 0-14% R-744 and 6% propane Composition $CO_2$/propane/R-1234ze(E) % by weight▶

|  |  | 0/6/94 | 2/6/92 | 4/6/90 | 6/6/88 | 8/6/86 | 10/6/84 | 12/6/82 | 14/6/80 |
|---|---|---|---|---|---|---|---|---|---|
| COP (heating) |  | 2.02 | 2.06 | 2.10 | 2.13 | 2.15 | 2.17 | 2.18 | 2.19 |
| COP (heating) relative to Reference |  | 95.7% | 97.9% | 99.6% | 101.0% | 102.0% | 102.8% | 103.4% | 103.9% |
| Volumetric heating capacity at suction | kJ/m³ | 767 | 851 | 940 | 1031 | 1125 | 1222 | 1320 | 1421 |
| Capacity relative to Reference |  | 87.3% | 96.9% | 106.9% | 117.4% | 128.1% | 139.0% | 150.3% | 161.7% |
| Critical temperature | ° C. | 108.03 | 104.52 | 101.14 | 97.90 | 94.81 | 91.87 | 89.05 | 86.36 |
| Critical pressure | bar | 41.33 | 42.11 | 42.89 | 43.66 | 44.41 | 45.16 | 45.89 | 46.62 |
| Condenser enthalpy change | kJ/kg | 224.4 | 235.3 | 245.0 | 253.5 | 261.0 | 267.8 | 273.9 | 279.5 |
| Pressure ratio |  | 17.34 | 17.37 | 17.31 | 17.15 | 16.93 | 16.65 | 16.33 | 15.99 |
| Refrigerant mass flow | kg/hr | 32.1 | 30.6 | 29.4 | 28.4 | 27.6 | 26.9 | 26.3 | 25.8 |
| Compressor discharge temperature | ° C. | 114.2 | 117.7 | 121.1 | 124.1 | 127.1 | 129.7 | 132.3 | 134.7 |
| Evaporator inlet pressure | bar | 0.79 | 0.85 | 0.91 | 0.98 | 1.06 | 1.14 | 1.23 | 1.33 |
| Condenser inlet pressure | bar | 12.6 | 13.8 | 15.0 | 16.2 | 17.3 | 18.5 | 19.6 | 20.8 |
| Evaporator inlet temperature | ° C. | −30.0 | −30.7 | −31.4 | −32.2 | −33.1 | −33.9 | −34.8 | −35.8 |
| Evaporator dewpoint | ° C. | −28.6 | −28.0 | −27.4 | −26.7 | −26.0 | −25.3 | −24.6 | −24.0 |
| Evaporator exit gas temperature | ° C. | −23.6 | −23.0 | −22.4 | −21.7 | −21.0 | −20.3 | −19.6 | −19.0 |
| Evaporator mean temperature | ° C. | −29.3 | −29.4 | −29.4 | −29.4 | −29.5 | −29.6 | −29.7 | −29.9 |
| Evaporator glide (out-in) | K | 1.3 | 2.7 | 4.1 | 5.6 | 7.1 | 8.7 | 10.3 | 11.8 |
| Compressor suction pressure | bar | 0.73 | 0.79 | 0.86 | 0.94 | 1.02 | 1.11 | 1.20 | 1.30 |
| Compressor discharge pressure | bar | 12.6 | 13.8 | 15.0 | 16.2 | 17.3 | 18.5 | 19.6 | 20.8 |
| Suction line pressure drop | Pa/m | 353 | 307 | 270 | 240 | 215 | 194 | 177 | 162 |
| Pressure drop relative to reference |  | 120.8% | 105.1% | 92.4% | 82.0% | 73.5% | 66.5% | 60.5% | 55.3% |
| Condenser dew point | ° C. | 54.5 | 55.8 | 57.0 | 58.0 | 58.7 | 59.2 | 59.6 | 59.8 |
| Condenser bubble point | ° C. | 48.6 | 44.5 | 41.0 | 38.1 | 35.7 | 33.8 | 32.2 | 30.8 |
| Condenser exit liquid temperature | ° C. | 47.6 | 43.5 | 40.0 | 37.1 | 34.7 | 32.8 | 31.2 | 29.8 |
| Condenser mean temperature | ° C. | 51.6 | 50.1 | 49.0 | 48.0 | 47.2 | 46.5 | 45.9 | 45.3 |
| Condenser glide (in-out) | K | 5.8 | 11.3 | 16.0 | 19.9 | 23.0 | 25.5 | 27.4 | 29.0 |

TABLE 4

Theoretical Performance Data of Selected R-744/propane/R-1234ze(E) blends containing 16-30% R-744 and 6% propane Composition $CO_2$/propane/R-1234ze(E) % by weight▶

|  |  | 16/6/78 | 18/6/76 | 20/6/74 | 22/6/72 | 24/6/70 | 26/6/68 | 28/6/66 | 30/6/64 |
|---|---|---|---|---|---|---|---|---|---|
| COP (heating) |  | 2.20 | 2.20 | 2.21 | 2.21 | 2.21 | 2.21 | 2.21 | 2.21 |
| COP (heating) relative to Reference |  | 104.2% | 104.5% | 104.7% | 104.8% | 104.9% | 104.8% | 104.8% | 104.7% |
| Volumetric heating capacity at suction | kJ/m³ | 1523 | 1627 | 1732 | 1838 | 1945 | 2053 | 2161 | 2270 |
| Capacity relative to Reference |  | 173.4% | 185.2% | 197.1% | 209.2% | 221.3% | 233.6% | 246.0% | 258.4% |
| Critical temperature | ° C. | 83.79 | 81.34 | 78.99 | 76.73 | 74.58 | 72.51 | 70.52 | 68.61 |
| Critical pressure | bar | 47.33 | 48.03 | 48.73 | 49.42 | 50.10 | 50.78 | 51.45 | 52.11 |
| Condenser enthalpy change | kJ/kg | 284.7 | 289.5 | 294.2 | 298.6 | 302.8 | 306.9 | 310.9 | 314.7 |
| Pressure ratio |  | 15.64 | 15.29 | 14.94 | 14.60 | 14.28 | 13.96 | 13.66 | 13.37 |
| Refrigerant mass flow | kg/hr | 25.3 | 24.9 | 24.5 | 24.1 | 23.8 | 23.5 | 23.2 | 22.9 |

TABLE 4-continued

Theoretical Performance Data of Selected R-744/propane/R-1234ze(E) blends containing 16-30% R-744 and 6% propane

| | | Composition $CO_2$/propane/R-1234ze(E) % by weight | | | | | | | |
|---|---|---|---|---|---|---|---|---|---|
| | | 16/6/78 | 18/6/76 | 20/6/74 | 22/6/72 | 24/6/70 | 26/6/68 | 28/6/66 | 30/6/64 |
| Compressor discharge temperature | °C. | 137.0 | 139.2 | 141.4 | 143.5 | 145.5 | 147.6 | 149.6 | 151.6 |
| Evaporator inlet pressure | bar | 1.42 | 1.52 | 1.63 | 1.74 | 1.85 | 1.96 | 2.08 | 2.20 |
| Condenser inlet pressure | bar | 21.9 | 22.9 | 24.0 | 25.1 | 26.1 | 27.2 | 28.2 | 29.2 |
| Evaporator inlet temperature | °C. | −36.7 | −37.7 | −38.7 | −39.6 | −40.6 | −41.5 | −42.4 | −43.3 |
| Evaporator dewpoint | °C. | −23.4 | −22.8 | −22.4 | −21.9 | −21.6 | −21.2 | −21.0 | −20.8 |
| Evaporator exit gas temperature | °C. | −18.4 | −17.8 | −17.4 | −16.9 | −16.6 | −16.2 | −16.0 | −15.8 |
| Evaporator mean temperature | °C. | −30.1 | −30.3 | −30.5 | −30.8 | −31.1 | −31.4 | −31.7 | −32.0 |
| Evaporator glide (out-in) | K | 13.3 | 14.8 | 16.3 | 17.7 | 19.0 | 20.3 | 21.5 | 22.5 |
| Compressor suction pressure | bar | 1.40 | 1.50 | 1.61 | 1.72 | 1.83 | 1.94 | 2.06 | 2.18 |
| Compressor discharge pressure | bar | 21.9 | 22.9 | 24.0 | 25.1 | 26.1 | 27.2 | 28.2 | 29.2 |
| Suction line pressure drop | Pa/m | 149 | 137 | 128 | 119 | 111 | 104 | 98 | 93 |
| Pressure drop relative to reference | | 50.9% | 47.1% | 43.7% | 40.7% | 38.1% | 35.7% | 33.6% | 31.7% |
| Condenser dew point | °C. | 59.8 | 59.7 | 59.6 | 59.3 | 58.9 | 58.5 | 57.9 | 57.4 |
| Condenser bubble point | °C. | 29.7 | 28.8 | 27.9 | 27.3 | 26.7 | 26.1 | 25.7 | 25.3 |
| Condenser exit liquid temperature | °C. | 28.7 | 27.8 | 26.9 | 26.3 | 25.7 | 25.1 | 24.7 | 24.3 |
| Condenser mean temperature | °C. | 44.8 | 44.2 | 43.7 | 43.3 | 42.8 | 42.3 | 41.8 | 41.4 |
| Condenser glide (in-out) | K | 30.1 | 31.0 | 31.6 | 32.0 | 32.2 | 32.3 | 32.2 | 32.1 |

TABLE 5

Theoretical Performance Data of Selected R-744/propane/R-1234ze(E) blends containing 0-14% R-744 and 8% propane

| | | Composition $CO_2$/propane/R-1234ze(E) % by weight | | | | | | | |
|---|---|---|---|---|---|---|---|---|---|
| | | 0/8/92 | 2/8/90 | 4/8/88 | 6/8/86 | 8/8/84 | 10/8/82 | 12/8/80 | 14/8/78 |
| COP (heating) | | 2.02 | 2.06 | 2.10 | 2.12 | 2.15 | 2.16 | 2.17 | 2.18 |
| COP (heating) relative to Reference | | 95.8% | 97.8% | 99.5% | 100.8% | 101.7% | 102.5% | 103.1% | 103.6% |
| Volumetric heating capacity at suction | kJ/m³ | 814 | 900 | 989 | 1082 | 1178 | 1275 | 1375 | 1476 |
| Capacity relative to Reference | | 92.7% | 102.4% | 112.6% | 123.2% | 134.0% | 145.1% | 156.5% | 168.0% |
| Critical temperature | °C. | 107.48 | 104.11 | 100.85 | 97.72 | 94.72 | 91.84 | 89.09 | 86.45 |
| Critical pressure | bar | 42.50 | 43.29 | 44.08 | 44.86 | 45.63 | 46.38 | 47.12 | 47.84 |
| Condenser enthalpy change | kJ/kg | 227.7 | 238.1 | 247.4 | 255.7 | 263.2 | 269.8 | 275.9 | 281.5 |
| Pressure ratio | | 16.79 | 16.78 | 16.71 | 16.55 | 16.35 | 16.09 | 15.80 | 15.49 |
| Refrigerant mass flow | kg/hr | 31.6 | 30.2 | 29.1 | 28.2 | 27.4 | 26.7 | 26.1 | 25.6 |
| Compressor discharge temperature | °C. | 114.2 | 117.5 | 120.7 | 123.7 | 126.5 | 129.2 | 131.6 | 134.0 |
| Evaporator inlet pressure | bar | 0.84 | 0.90 | 0.97 | 1.04 | 1.12 | 1.21 | 1.30 | 1.40 |
| Condenser inlet pressure | bar | 13.2 | 14.3 | 15.5 | 16.6 | 17.8 | 19.0 | 20.1 | 21.2 |
| Evaporator inlet temperature | °C. | −30.3 | −31.0 | −31.8 | −32.6 | −33.4 | −34.3 | −35.1 | −36.0 |
| Evaporator dewpoint | °C. | −28.2 | −27.6 | −26.9 | −26.3 | −25.6 | −24.9 | −24.3 | −23.7 |
| Evaporator exit gas temperature | °C. | −23.2 | −22.6 | −21.9 | −21.3 | −20.6 | −19.9 | −19.3 | −18.7 |
| Evaporator mean temperature | °C. | −29.2 | −29.3 | −29.4 | −29.4 | −29.5 | −29.6 | −29.7 | −29.9 |
| Evaporator glide (out-in) | K | 2.1 | 3.4 | 4.8 | 6.3 | 7.8 | 9.3 | 10.8 | 12.3 |
| Compressor suction pressure | bar | 0.78 | 0.85 | 0.92 | 1.00 | 1.09 | 1.18 | 1.27 | 1.37 |
| Compressor discharge pressure | bar | 13.2 | 14.3 | 15.5 | 16.6 | 17.8 | 19.0 | 20.1 | 21.2 |
| Suction line pressure drop | Pa/m | 329 | 288 | 254 | 227 | 204 | 185 | 169 | 155 |
| Pressure drop relative to reference | | 112.6% | 98.6% | 87.1% | 77.6% | 69.8% | 63.3% | 57.7% | 53.0% |
| Condenser dew point | °C. | 54.5 | 55.6 | 56.7 | 57.6 | 58.3 | 58.8 | 59.1 | 59.2 |
| Condenser bubble point | °C. | 48.2 | 44.4 | 41.1 | 38.3 | 36.0 | 34.1 | 32.5 | 31.2 |
| Condenser exit liquid temperature | °C. | 47.2 | 43.4 | 40.1 | 37.3 | 35.0 | 33.1 | 31.5 | 30.2 |
| Condenser mean temperature | °C. | 51.3 | 50.0 | 48.9 | 48.0 | 47.1 | 46.4 | 45.8 | 45.2 |
| Condenser glide (in-out) | K | 6.2 | 11.2 | 15.6 | 19.3 | 22.3 | 24.6 | 26.5 | 28.0 |

TABLE 6

Theoretical Performance Data of Selected R-744/propane/R-1234ze(E) blends containing 16-30% R-744 and 8% propane

| | | Composition $CO_2$/propane/R-1234ze(E) % by weight | | | | | | | |
|---|---|---|---|---|---|---|---|---|---|
| | | 16/8/76 | 18/8/74 | 20/8/72 | 22/8/70 | 24/8/68 | 26/8/66 | 28/8/64 | 30/8/62 |
| COP (heating) | | 2.19 | 2.20 | 2.20 | 2.20 | 2.20 | 2.20 | 2.20 | 2.20 |
| COP (heating) relative to Reference | | 103.9% | 104.2% | 104.3% | 104.4% | 104.5% | 104.5% | 104.4% | 104.3% |
| Volumetric heating capacity at suction | kJ/m³ | 1579 | 1683 | 1789 | 1895 | 2003 | 2112 | 2221 | 2332 |
| Capacity relative to Reference | | 179.7% | 191.6% | 203.6% | 215.7% | 228.0% | 240.3% | 252.8% | 265.4% |
| Critical temperature | °C. | 83.92 | 81.50 | 79.18 | 76.95 | 74.80 | 72.74 | 70.76 | 68.86 |
| Critical pressure | bar | 48.55 | 49.25 | 49.94 | 50.62 | 51.29 | 51.95 | 52.60 | 53.24 |
| Condenser enthalpy change | kJ/kg | 286.6 | 291.5 | 296.0 | 300.4 | 304.5 | 308.5 | 312.4 | 316.1 |
| Pressure ratio | | 15.17 | 14.85 | 14.53 | 14.21 | 13.90 | 13.61 | 13.32 | 13.04 |

TABLE 6-continued

Theoretical Performance Data of Selected R-744/propane/R-1234ze(E) blends containing 16-30% R-744 and 8% propane

| | | \multicolumn{8}{c}{Composition $CO_2$/propane/R-1234ze(E) % by weight} |
|---|---|---|---|---|---|---|---|---|---|
| | | 16/8/76 | 18/8/74 | 20/8/72 | 22/8/70 | 24/8/68 | 26/8/66 | 28/8/64 | 30/8/62 |
| Refrigerant mass flow | kg/hr | 25.1 | 24.7 | 24.3 | 24.0 | 23.6 | 23.3 | 23.0 | 22.8 |
| Compressor discharge temperature | °C. | 136.3 | 138.4 | 140.5 | 142.6 | 144.6 | 146.6 | 148.5 | 150.4 |
| Evaporator inlet pressure | bar | 1.50 | 1.60 | 1.71 | 1.82 | 1.93 | 2.05 | 2.17 | 2.29 |
| Condenser inlet pressure | bar | 22.3 | 23.4 | 24.5 | 25.5 | 26.6 | 27.6 | 28.6 | 29.7 |
| Evaporator inlet temperature | °C. | −37.0 | −37.9 | −38.8 | −39.7 | −40.6 | −41.5 | −42.3 | −43.1 |
| Evaporator dewpoint | °C. | −23.2 | −22.7 | −22.3 | −21.9 | −21.5 | −21.2 | −21.0 | −20.8 |
| Evaporator exit gas temperature | °C. | −18.2 | −17.7 | −17.3 | −16.9 | −16.5 | −16.2 | −16.0 | −15.8 |
| Evaporator mean temperature | °C. | −30.1 | −30.3 | −30.5 | −30.8 | −31.1 | −31.4 | −31.6 | −31.9 |
| Evaporator glide (out-in) | K | 13.8 | 15.2 | 16.5 | 17.8 | 19.1 | 20.2 | 21.3 | 22.3 |
| Compressor suction pressure | bar | 1.47 | 1.58 | 1.69 | 1.80 | 1.91 | 2.03 | 2.15 | 2.27 |
| Compressor discharge pressure | bar | 22.3 | 23.4 | 24.5 | 25.5 | 26.6 | 27.6 | 28.6 | 29.7 |
| Suction line pressure drop | Pa/m | 143 | 132 | 123 | 115 | 107 | 101 | 95 | 90 |
| Pressure drop relative to reference | | 48.9% | 45.3% | 42.1% | 39.3% | 36.8% | 34.6% | 32.6% | 30.7% |
| Condenser dew point | °C. | 59.2 | 59.1 | 58.9 | 58.6 | 58.3 | 57.8 | 57.3 | 56.7 |
| Condenser bubble point | °C. | 30.1 | 29.2 | 28.4 | 27.7 | 27.1 | 26.6 | 26.2 | 25.8 |
| Condenser exit liquid temperature | °C. | 29.1 | 28.2 | 27.4 | 26.7 | 26.1 | 25.6 | 25.2 | 24.8 |
| Condenser mean temperature | °C. | 44.7 | 44.2 | 43.7 | 43.2 | 42.7 | 42.2 | 41.7 | 41.3 |
| Condenser glide (in-out) | K | 29.1 | 30.0 | 30.6 | 31.0 | 31.2 | 31.2 | 31.1 | 30.9 |

TABLE 7

Theoretical Performance Data of Selected R-744/propane/R-1234ze(E) blends containing 0-14% R-744 and 10% propane

| | | \multicolumn{8}{c}{Composition $CO_2$/propane/R-1234ze(E) % by weight} |
|---|---|---|---|---|---|---|---|---|---|
| | | 0/10/90 | 2/10/88 | 4/10/86 | 6/10/84 | 8/10/82 | 10/10/80 | 12/10/78 | 14/10/76 |
| COP (heating) | | 2.02 | 2.06 | 2.09 | 2.12 | 2.14 | 2.16 | 2.17 | 2.18 |
| COP (heating) relative to Reference | | 95.8% | 97.7% | 99.3% | 100.6% | 101.5% | 102.3% | 102.9% | 103.3% |
| Volumetric heating capacity at suction | kJ/m³ | 860 | 946 | 1037 | 1132 | 1228 | 1327 | 1427 | 1529 |
| Capacity relative to Reference | | 97.9% | 107.7% | 118.1% | 128.8% | 139.8% | 151.0% | 162.4% | 174.0% |
| Critical temperature | °C. | 106.95 | 103.72 | 100.58 | 97.56 | 94.64 | 91.84 | 89.16 | 86.57 |
| Critical pressure | bar | 43.51 | 44.31 | 45.11 | 45.90 | 46.68 | 47.44 | 48.19 | 48.92 |
| Condenser enthalpy change | kJ/kg | 230.7 | 240.7 | 249.8 | 257.9 | 265.3 | 272.0 | 278.0 | 283.5 |
| Pressure ratio | | 16.25 | 16.22 | 16.14 | 15.99 | 15.81 | 15.58 | 15.31 | 15.03 |
| Refrigerant mass flow | kg/hr | 31.2 | 29.9 | 28.8 | 27.9 | 27.1 | 26.5 | 25.9 | 25.4 |
| Compressor discharge temperature | °C. | 114.2 | 117.3 | 120.4 | 123.3 | 126.0 | 128.6 | 131.0 | 133.3 |
| Evaporator inlet pressure | bar | 0.89 | 0.96 | 1.03 | 1.10 | 1.19 | 1.27 | 1.37 | 1.47 |
| Condenser inlet pressure | bar | 13.6 | 14.7 | 15.9 | 17.1 | 18.2 | 19.4 | 20.5 | 21.6 |
| Evaporator inlet temperature | °C. | −30.5 | −31.3 | −32.0 | −32.8 | −33.7 | −34.5 | −35.4 | −36.2 |
| Evaporator dewpoint | °C. | −27.8 | −27.2 | −26.6 | −25.9 | −25.3 | −24.7 | −24.1 | −23.6 |
| Evaporator exit gas temperature | °C. | −22.8 | −22.2 | −21.6 | −20.9 | −20.3 | −19.7 | −19.1 | −18.6 |
| Evaporator mean temperature | °C. | −29.2 | −29.2 | −29.3 | −29.4 | −29.5 | −29.6 | −29.7 | −29.9 |
| Evaporator glide (out-in) | K | 2.8 | 4.1 | 5.5 | 6.9 | 8.3 | 9.8 | 11.2 | 12.6 |
| Compressor suction pressure | bar | 0.84 | 0.91 | 0.99 | 1.07 | 1.15 | 1.24 | 1.34 | 1.44 |
| Compressor discharge pressure | bar | 13.6 | 14.7 | 15.9 | 17.1 | 18.2 | 19.4 | 20.5 | 21.6 |
| Suction line pressure drop | Pa/m | 308 | 271 | 241 | 215 | 194 | 177 | 162 | 149 |
| Pressure drop relative to reference | | 105.6% | 92.9% | 82.4% | 73.8% | 66.6% | 60.5% | 55.3% | 50.9% |
| Condenser dew point | °C. | 54.3 | 55.4 | 56.4 | 57.2 | 57.8 | 58.3 | 58.5 | 58.7 |
| Condenser bubble point | °C. | 48.1 | 44.5 | 41.3 | 38.7 | 36.4 | 34.5 | 33.0 | 31.7 |
| Condenser exit liquid temperature | °C. | 47.1 | 43.5 | 40.3 | 37.7 | 35.4 | 33.5 | 32.0 | 30.7 |
| Condenser mean temperature | °C. | 51.2 | 49.9 | 48.9 | 47.9 | 47.1 | 46.4 | 45.8 | 45.2 |
| Condenser glide (in-out) | K | 6.3 | 10.9 | 15.0 | 18.5 | 21.4 | 23.7 | 25.6 | 27.0 |

TABLE 8

Theoretical Performance Data of Selected R-744/propane/R-1234ze(E) blends containing 16-30% R-744 and 10% propane

| | | \multicolumn{8}{c}{Composition $CO_2$/propane/R-1234ze(E) % by weight} |
|---|---|---|---|---|---|---|---|---|---|
| | | 16/10/74 | 18/10/72 | 20/10/70 | 22/10/68 | 24/10/66 | 26/10/64 | 28/10/62 | 30/10/60 |
| COP (heating) | | 2.19 | 2.19 | 2.19 | 2.20 | 2.20 | 2.20 | 2.20 | 2.19 |
| COP (heating) relative to Reference | | 103.7% | 103.9% | 104.0% | 104.1% | 104.2% | 104.2% | 104.1% | 104.0% |
| Volumetric heating capacity at suction | kJ/m³ | 1633 | 1737 | 1843 | 1951 | 2059 | 2169 | 2280 | 2393 |
| Capacity relative to Reference | | 185.8% | 197.7% | 209.8% | 222.0% | 234.3% | 246.8% | 259.5% | 272.4% |
| Critical temperature | °C. | 84.09 | 81.70 | 79.41 | 77.20 | 75.08 | 73.03 | 71.06 | 69.16 |
| Critical pressure | bar | 49.64 | 50.34 | 51.02 | 51.69 | 52.35 | 53.00 | 53.64 | 54.27 |
| Condenser enthalpy change | kJ/kg | 288.7 | 293.5 | 298.0 | 302.3 | 306.4 | 310.4 | 314.1 | 317.7 |

TABLE 8-continued

Theoretical Performance Data of Selected R-744/propane/R-1234ze(E) blends containing 16-30% R-744 and 10% propane Composition $CO_2$/propane/R-1234ze(E) % by weight▶

| | | 16/10/74 | 18/10/72 | 20/10/70 | 22/10/68 | 24/10/66 | 26/10/64 | 28/10/62 | 30/10/60 |
|---|---|---|---|---|---|---|---|---|---|
| Pressure ratio | | 14.74 | 14.44 | 14.14 | 13.85 | 13.56 | 13.27 | 12.99 | 12.72 |
| Refrigerant mass flow | kg/hr | 24.9 | 24.5 | 24.2 | 23.8 | 23.5 | 23.2 | 22.9 | 22.7 |
| Compressor discharge temperature | °C. | 135.5 | 137.7 | 139.7 | 141.7 | 143.7 | 145.6 | 147.4 | 149.2 |
| Evaporator inlet pressure | bar | 1.57 | 1.67 | 1.78 | 1.89 | 2.01 | 2.13 | 2.25 | 2.38 |
| Condenser inlet pressure | bar | 22.7 | 23.8 | 24.9 | 26.0 | 27.0 | 28.0 | 29.1 | 30.1 |
| Evaporator inlet temperature | °C. | −37.1 | −38.0 | −38.8 | −39.7 | −40.5 | −41.3 | −42.0 | −42.7 |
| Evaporator dewpoint | °C. | −23.1 | −22.6 | −22.2 | −21.9 | −21.5 | −21.3 | −21.0 | −20.8 |
| Evaporator exit gas temperature | °C. | −18.1 | −17.6 | −17.2 | −16.9 | −16.5 | −16.3 | −16.0 | −15.8 |
| Evaporator mean temperature | °C. | −30.1 | −30.3 | −30.5 | −30.8 | −31.0 | −31.3 | −31.5 | −31.8 |
| Evaporator glide (out-in) | K | 14.0 | 15.3 | 16.6 | 17.8 | 18.9 | 20.0 | 21.0 | 21.9 |
| Compressor suction pressure | bar | 1.54 | 1.65 | 1.76 | 1.87 | 1.99 | 2.11 | 2.24 | 2.37 |
| Compressor discharge pressure | bar | 22.7 | 23.8 | 24.9 | 26.0 | 27.0 | 28.0 | 29.1 | 30.1 |
| Suction line pressure drop | Pa/m | 137 | 127 | 119 | 111 | 104 | 98 | 92 | 87 |
| Pressure drop relative to reference | | 47.0% | 43.6% | 40.6% | 38.0% | 35.6% | 33.5% | 31.6% | 29.8% |
| Condenser dew point | °C. | 58.7 | 58.6 | 58.3 | 58.0 | 57.6 | 57.2 | 56.7 | 56.1 |
| Condenser bubble point | °C. | 30.6 | 29.6 | 28.8 | 28.1 | 27.5 | 27.0 | 26.6 | 26.2 |
| Condenser exit liquid temperature | °C. | 29.6 | 28.6 | 27.8 | 27.1 | 26.5 | 26.0 | 25.6 | 25.2 |
| Condenser mean temperature | °C. | 44.6 | 44.1 | 43.6 | 43.1 | 42.6 | 42.1 | 41.6 | 41.2 |
| Condenser glide (in-out) | K | 28.1 | 28.9 | 29.5 | 29.9 | 30.1 | 30.2 | 30.1 | 29.9 |

TABLE 9

Theoretical Performance Data of Selected R-744/propane/R-1234ze(E) blends containing 0-14% R-744 and 12% propane Composition $CO_2$/propane/R-1234ze(E) % by weight▶

| | | 0/12/88 | 2/12/86 | 4/12/84 | 6/12/82 | 8/12/80 | 10/12/78 | 12/12/76 | 14/12/74 |
|---|---|---|---|---|---|---|---|---|---|
| COP (heating) | | 2.02 | 2.06 | 2.09 | 2.12 | 2.14 | 2.15 | 2.16 | 2.17 |
| COP (heating) relative to Reference | | 95.8% | 97.7% | 99.2% | 100.4% | 101.3% | 102.1% | 102.6% | 103.1% |
| Volumetric heating capacity at suction | kJ/m³ | 905 | 992 | 1084 | 1180 | 1277 | 1376 | 1477 | 1579 |
| Capacity relative to Reference | | 103.0% | 112.9% | 123.4% | 134.2% | 145.3% | 156.6% | 168.1% | 179.8% |
| Critical temperature | °C. | 106.46 | 103.35 | 100.33 | 97.40 | 94.58 | 91.86 | 89.24 | 86.71 |
| Critical pressure | bar | 44.37 | 45.19 | 46.00 | 46.80 | 47.60 | 48.37 | 49.13 | 49.87 |
| Condenser enthalpy change | kJ/kg | 233.5 | 243.2 | 252.1 | 260.2 | 267.5 | 274.1 | 280.2 | 285.8 |
| Pressure ratio | | 15.75 | 15.69 | 15.60 | 15.47 | 15.30 | 15.10 | 14.86 | 14.61 |
| Refrigerant mass flow | kg/hr | 30.8 | 29.6 | 28.6 | 27.7 | 26.9 | 26.3 | 25.7 | 25.2 |
| Compressor discharge temperature | °C. | 114.1 | 117.1 | 120.0 | 122.8 | 125.5 | 128.0 | 130.4 | 132.7 |
| Evaporator inlet pressure | bar | 0.95 | 1.01 | 1.08 | 1.16 | 1.25 | 1.34 | 1.43 | 1.53 |
| Condenser inlet pressure | bar | 14.1 | 15.2 | 16.3 | 17.5 | 18.6 | 19.8 | 20.9 | 22.0 |
| Evaporator inlet temperature | °C. | −30.8 | −31.5 | −32.3 | −33.1 | −33.9 | −34.7 | −35.5 | −36.3 |
| Evaporator dewpoint | °C. | −27.4 | −26.9 | −26.3 | −25.7 | −25.1 | −24.5 | −24.0 | −23.5 |
| Evaporator exit gas temperature | °C. | −22.4 | −21.9 | −21.3 | −20.7 | −20.1 | −19.5 | −19.0 | −18.5 |
| Evaporator mean temperature | °C. | −29.1 | −29.2 | −29.3 | −29.4 | −29.5 | −29.6 | −29.7 | −29.9 |
| Evaporator glide (out-in) | K | 3.4 | 4.7 | 6.0 | 7.4 | 8.8 | 10.2 | 11.5 | 12.8 |
| Compressor suction pressure | bar | 0.90 | 0.97 | 1.05 | 1.13 | 1.22 | 1.31 | 1.41 | 1.51 |
| Compressor discharge pressure | bar | 14.1 | 15.2 | 16.3 | 17.5 | 18.6 | 19.8 | 20.9 | 22.0 |
| Suction line pressure drop | Pa/m | 290 | 257 | 229 | 205 | 186 | 169 | 155 | 143 |
| Pressure drop relative to reference | | 99.5% | 88.0% | 78.3% | 70.3% | 63.6% | 58.0% | 53.1% | 49.0% |
| Condenser dew point | °C. | 54.2 | 55.1 | 56.0 | 56.7 | 57.3 | 57.7 | 58.0 | 58.1 |
| Condenser bubble point | °C. | 48.1 | 44.7 | 41.7 | 39.1 | 36.9 | 35.0 | 33.4 | 32.1 |
| Condenser exit liquid temperature | °C. | 47.1 | 43.7 | 40.7 | 38.1 | 35.9 | 34.0 | 32.4 | 31.1 |
| Condenser mean temperature | °C. | 51.1 | 49.9 | 48.8 | 47.9 | 47.1 | 46.4 | 45.7 | 45.1 |
| Condenser glide (in-out) | K | 6.1 | 10.4 | 14.3 | 17.7 | 20.5 | 22.7 | 24.6 | 26.0 |

TABLE 1C

Theoretical Performance Data of Selected R-744/propane/R-1234ze(E) blends containing 16-30% R-744 and 12% propane Composition $CO_2$/propane/R-1234ze(E) % by weight▶

| | | 16/12/72 | 18/12/70 | 20/12/68 | 22/12/66 | 24/12/64 | 26/12/62 | 28/12/60 | 30/12/58 |
|---|---|---|---|---|---|---|---|---|---|
| COP (heating) | | 2.18 | 2.18 | 2.19 | 2.19 | 2.19 | 2.19 | 2.19 | 2.19 |
| COP (heating) relative to Reference | | 103.4% | 103.6% | 103.8% | 103.9% | 103.9% | 103.9% | 103.9% | 103.8% |
| Volumetric heating capacity at suction | kJ/m³ | 1683 | 1789 | 1895 | 2003 | 2113 | 2224 | 2338 | 2452 |
| Capacity relative to Reference | | 191.6% | 203.6% | 215.7% | 228.0% | 240.5% | 253.1% | 266.0% | 279.1% |
| Critical temperature | °C. | 84.28 | 81.93 | 79.67 | 77.49 | 75.39 | 73.36 | 71.40 | 69.51 |
| Critical pressure | bar | 50.59 | 51.30 | 51.98 | 52.65 | 53.31 | 53.95 | 54.58 | 55.20 |

TABLE 1C-continued

Theoretical Performance Data of Selected R-744/propane/R-1234ze(E) blends containing 16-30% R-744 and 12% propane Composition CO$_2$/propane/R-1234ze(E) % by weight▶

| | | 16/12/72 | 18/12/70 | 20/12/68 | 22/12/66 | 24/12/64 | 26/12/62 | 28/12/60 | 30/12/58 |
|---|---|---|---|---|---|---|---|---|---|
| Condenser enthalpy change | kJ/kg | 290.9 | 295.7 | 300.2 | 304.5 | 308.5 | 312.3 | 316.0 | 319.4 |
| Pressure ratio | | 14.34 | 14.06 | 13.79 | 13.51 | 13.23 | 12.96 | 12.68 | 12.41 |
| Refrigerant mass flow | kg/hr | 24.8 | 24.3 | 24.0 | 23.6 | 23.3 | 23.1 | 22.8 | 22.5 |
| Compressor discharge temperature | °C. | 134.9 | 136.9 | 139.0 | 140.9 | 142.8 | 144.6 | 146.4 | 148.1 |
| Evaporator inlet pressure | bar | 1.64 | 1.74 | 1.85 | 1.97 | 2.09 | 2.21 | 2.34 | 2.47 |
| Condenser inlet pressure | bar | 23.1 | 24.2 | 25.3 | 26.3 | 27.4 | 28.4 | 29.5 | 30.5 |
| Evaporator inlet temperature | °C. | −37.1 | −37.9 | −38.7 | −39.5 | −40.2 | −40.9 | −41.6 | −42.3 |
| Evaporator dewpoint | °C. | −23.0 | −22.6 | −22.3 | −21.9 | −21.6 | −21.4 | −21.1 | −21.0 |
| Evaporator exit gas temperature | °C. | −18.0 | −17.6 | −17.3 | −16.9 | −16.6 | −16.4 | −16.1 | −16.0 |
| Evaporator mean temperature | °C. | −30.1 | −30.3 | −30.5 | −30.7 | −30.9 | −31.2 | −31.4 | −31.6 |
| Evaporator glide (out-in) | K | 14.1 | 15.3 | 16.5 | 17.6 | 18.6 | 19.6 | 20.5 | 21.3 |
| Compressor suction pressure | bar | 1.61 | 1.72 | 1.83 | 1.95 | 2.07 | 2.19 | 2.32 | 2.45 |
| Compressor discharge pressure | bar | 23.1 | 24.2 | 25.3 | 26.3 | 27.4 | 28.4 | 29.5 | 30.5 |
| Suction line pressure drop | Pa/m | 132 | 123 | 115 | 107 | 101 | 95 | 90 | 85 |
| Pressure drop relative to reference | | 45.3% | 42.1% | 39.3% | 36.8% | 34.6% | 32.5% | 30.7% | 29.0% |
| Condenser dew point | °C. | 58.1 | 58.0 | 57.8 | 57.5 | 57.1 | 56.6 | 56.1 | 55.6 |
| Condenser bubble point | °C. | 31.0 | 30.1 | 29.2 | 28.6 | 28.0 | 27.5 | 27.0 | 26.7 |
| Condenser exit liquid temperature | °C. | 30.0 | 29.1 | 28.2 | 27.6 | 27.0 | 26.5 | 26.0 | 25.7 |
| Condenser mean temperature | °C. | 44.6 | 44.0 | 43.5 | 43.0 | 42.5 | 42.0 | 41.6 | 41.1 |
| Condenser glide (in-out) | K | 27.1 | 27.9 | 28.5 | 28.9 | 29.1 | 29.2 | 29.1 | 28.9 |

TABLE 11

Theoretical Performance Data of Selected R-744/propane/R-1234ze(E) blends containing 0-14% R-744 and 20% propane Composition CO$_2$/propane/R-1234ze(E) % by weight▶

| | | 0/20/80 | 2/20/78 | 4/20/76 | 6/20/74 | 8/20/72 | 10/20/70 | 12/20/68 | 14/20/66 |
|---|---|---|---|---|---|---|---|---|---|
| COP (heating) | | 2.02 | 2.05 | 2.08 | 2.10 | 2.12 | 2.14 | 2.15 | 2.16 |
| COP (heating) relative to Reference | | 95.7% | 97.3% | 98.6% | 99.8% | 100.6% | 101.3% | 101.9% | 102.3% |
| Volumetric heating capacity at suction | kJ/m$^3$ | 1072 | 1162 | 1255 | 1351 | 1449 | 1549 | 1651 | 1755 |
| Capacity relative to Reference | | 122.0% | 132.2% | 142.8% | 153.7% | 164.9% | 176.3% | 187.9% | 199.7% |
| Critical temperature | °C. | 104.73 | 102.05 | 99.43 | 96.87 | 94.38 | 91.96 | 89.61 | 87.32 |
| Critical pressure | bar | 46.70 | 47.56 | 48.43 | 49.29 | 50.14 | 50.98 | 51.79 | 52.59 |
| Condenser enthalpy change | kJ/kg | 244.4 | 253.5 | 262.2 | 270.2 | 277.7 | 284.4 | 290.6 | 296.3 |
| Pressure ratio | | 13.94 | 13.91 | 13.86 | 13.79 | 13.70 | 13.57 | 13.42 | 13.24 |
| Refrigerant mass flow | kg/hr | 29.5 | 28.4 | 27.5 | 26.6 | 25.9 | 25.3 | 24.8 | 24.3 |
| Compressor discharge temperature | °C. | 113.3 | 116.0 | 118.6 | 121.2 | 123.8 | 126.1 | 128.4 | 130.5 |
| Evaporator inlet pressure | bar | 1.16 | 1.23 | 1.31 | 1.39 | 1.48 | 1.57 | 1.67 | 1.78 |
| Condenser inlet pressure | bar | 15.6 | 16.6 | 17.7 | 18.8 | 19.9 | 21.0 | 22.1 | 23.2 |
| Evaporator inlet temperature | °C. | −31.5 | −32.1 | −32.7 | −33.4 | −34.0 | −34.6 | −35.2 | −35.7 |
| Evaporator dewpoint | °C. | −26.5 | −26.1 | −25.7 | −25.3 | −24.9 | −24.5 | −24.1 | −23.8 |
| Evaporator exit gas temperature | °C. | −21.5 | −21.1 | −20.7 | −20.3 | −19.9 | −19.5 | −19.1 | −18.8 |
| Evaporator mean temperature | °C. | −29.0 | −29.1 | −29.2 | −29.3 | −29.4 | −29.5 | −29.6 | −29.8 |
| Evaporator glide (out-in) | K | 5.0 | 6.0 | 7.1 | 8.1 | 9.1 | 10.1 | 11.0 | 12.0 |
| Compressor suction pressure | bar | 1.12 | 1.19 | 1.28 | 1.36 | 1.45 | 1.55 | 1.65 | 1.75 |
| Compressor discharge pressure | bar | 15.6 | 16.6 | 17.7 | 18.8 | 19.9 | 21.0 | 22.1 | 23.2 |
| Suction line pressure drop | Pa/m | 237 | 213 | 192 | 174 | 159 | 146 | 135 | 125 |
| Pressure drop relative to reference | | 81.1% | 72.8% | 65.7% | 59.7% | 54.5% | 50.1% | 46.2% | 42.9% |
| Condenser dew point | °C. | 53.1 | 53.8 | 54.5 | 55.1 | 55.5 | 55.9 | 56.1 | 56.2 |
| Condenser bubble point | °C. | 48.8 | 45.9 | 43.2 | 40.7 | 38.6 | 36.8 | 35.2 | 33.8 |
| Condenser exit liquid temperature | °C. | 47.8 | 44.9 | 42.2 | 39.7 | 37.6 | 35.8 | 34.2 | 32.8 |
| Condenser mean temperature | °C. | 51.0 | 49.8 | 48.8 | 47.9 | 47.1 | 46.3 | 45.6 | 45.0 |
| Condenser glide (in-out) | K | 4.3 | 7.9 | 11.3 | 14.3 | 16.9 | 19.1 | 20.9 | 22.4 |

TABLE 12

Theoretical Performance Data of Selected R-744/propane/R-1234ze(E) blends containing 16-30% R-744 and 20% propane Composition CO$_2$/propane/R-1234ze(E) % by weight▶

| | | 16/20/64 | 18/20/62 | 20/20/60 | 22/20/58 | 24/20/56 | 26/20/54 | 28/20/52 | 30/20/50 |
|---|---|---|---|---|---|---|---|---|---|
| COP (heating) | | 2.16 | 2.17 | 2.17 | 2.18 | 2.18 | 2.18 | 2.18 | 2.18 |
| COP (heating) relative to Reference | | 102.6% | 102.9% | 103.0% | 103.2% | 103.3% | 103.3% | 103.3% | 103.3% |
| Volumetric heating capacity at suction | kJ/m$^3$ | 1861 | 1969 | 2079 | 2192 | 2308 | 2426 | 2547 | 2671 |
| Capacity relative to Reference | | 211.8% | 224.1% | 236.7% | 249.5% | 262.6% | 276.1% | 289.9% | 304.0% |
| Critical temperature | °C. | 85.10 | 82.94 | 80.84 | 78.80 | 76.81 | 74.88 | 73.00 | 71.17 |

TABLE 12-continued

Theoretical Performance Data of Selected R-744/propane/R-1234ze(E) blends containing 16-30% R-744 and 20% propane Composition CO$_2$/propane/R-1234ze(E) % by weight▶

| | | 16/20/64 | 18/20/62 | 20/20/60 | 22/20/58 | 24/20/56 | 26/20/54 | 28/20/52 | 30/20/50 |
|---|---|---|---|---|---|---|---|---|---|
| Critical pressure | bar | 53.36 | 54.11 | 54.83 | 55.53 | 56.21 | 56.87 | 57.50 | 58.11 |
| Condenser enthalpy change | kJ/kg | 301.5 | 306.3 | 310.7 | 314.8 | 318.6 | 322.1 | 325.3 | 328.3 |
| Pressure ratio | | 13.05 | 12.83 | 12.61 | 12.37 | 12.13 | 11.88 | 11.63 | 11.38 |
| Refrigerant mass flow | kg/hr | 23.9 | 23.5 | 23.2 | 22.9 | 22.6 | 22.4 | 22.1 | 21.9 |
| Compressor discharge temperature | °C. | 132.6 | 134.5 | 136.3 | 138.0 | 139.6 | 141.1 | 142.6 | 144.0 |
| Evaporator inlet pressure | bar | 1.88 | 2.00 | 2.12 | 2.24 | 2.37 | 2.51 | 2.65 | 2.80 |
| Condenser inlet pressure | bar | 24.3 | 25.4 | 26.5 | 27.5 | 28.6 | 29.6 | 30.7 | 31.7 |
| Evaporator inlet temperature | °C. | −36.3 | −36.8 | −37.4 | −37.9 | −38.4 | −38.9 | −39.4 | −39.9 |
| Evaporator dewpoint | °C. | −23.4 | −23.1 | −22.8 | −22.6 | −22.3 | −22.1 | −21.9 | −21.7 |
| Evaporator exit gas temperature | °C. | −18.4 | −18.1 | −17.8 | −17.6 | −17.3 | −17.1 | −16.9 | −16.7 |
| Evaporator mean temperature | °C. | −29.9 | −30.0 | −30.1 | −30.2 | −30.4 | −30.5 | −30.7 | −30.8 |
| Evaporator glide (out-in) | K | 12.8 | 13.7 | 14.5 | 15.3 | 16.1 | 16.8 | 17.5 | 18.1 |
| Compressor suction pressure | bar | 1.86 | 1.98 | 2.10 | 2.22 | 2.36 | 2.49 | 2.64 | 2.79 |
| Compressor discharge pressure | bar | 24.3 | 25.4 | 26.5 | 27.5 | 28.6 | 29.6 | 30.7 | 31.7 |
| Suction line pressure drop | Pa/m | 117 | 109 | 102 | 96 | 90 | 85 | 80 | 76 |
| Pressure drop relative to reference | | 39.9% | 37.3% | 34.9% | 32.8% | 30.9% | 29.1% | 27.5% | 26.1% |
| Condenser dew point | °C. | 56.2 | 56.1 | 56.0 | 55.7 | 55.4 | 55.0 | 54.6 | 54.1 |
| Condenser bubble point | °C. | 32.6 | 31.6 | 30.8 | 30.1 | 29.5 | 28.9 | 28.5 | 28.1 |
| Condenser exit liquid temperature | °C. | 31.6 | 30.6 | 29.8 | 29.1 | 28.5 | 27.9 | 27.5 | 27.1 |
| Condenser mean temperature | °C. | 44.4 | 43.9 | 43.4 | 42.9 | 42.4 | 42.0 | 41.5 | 41.1 |
| Condenser glide (in-out) | K | 23.6 | 24.5 | 25.2 | 25.6 | 25.9 | 26.1 | 26.1 | 26.0 |

TABLE 13

Theoretical Performance Data of Selected R-744/propene/R-1234ze(E) blends containing 0-14% R-744 and 4% propene Composition CO$_2$/propene/R-1234ze(E) % by weight▶

| | | 0/4/96 | 2/4/94 | 4/4/92 | 6/4/90 | 8/4/88 | 10/4/86 | 12/4/84 | 14/4/82 |
|---|---|---|---|---|---|---|---|---|---|
| COP (heating) | | 2.03 | 2.08 | 2.11 | 2.14 | 2.16 | 2.18 | 2.20 | 2.21 |
| COP (heating) relative to Reference | | 96.0% | 98.5% | 100.2% | 101.6% | 102.7% | 103.5% | 104.2% | 104.7% |
| Volumetric heating capacity at suction | kJ/m$^3$ | 718 | 802 | 888 | 977 | 1069 | 1163 | 1260 | 1360 |
| Capacity relative to Reference | | 81.7% | 91.2% | 101.0% | 111.2% | 121.6% | 132.4% | 143.4% | 154.7% |
| Critical temperature | °C. | 107.98 | 104.32 | 100.84 | 97.55 | 94.43 | 91.47 | 88.66 | 85.98 |
| Critical pressure | bar | 39.10 | 39.88 | 40.64 | 41.39 | 42.14 | 42.88 | 43.61 | 44.35 |
| Condenser enthalpy change | kJ/kg | 222.7 | 234.5 | 244.6 | 253.4 | 261.0 | 267.9 | 274.1 | 279.8 |
| Pressure ratio | | 17.75 | 17.86 | 17.83 | 17.67 | 17.42 | 17.11 | 16.77 | 16.40 |
| Refrigerant mass flow | kg/hr | 32.3 | 30.7 | 29.4 | 28.4 | 27.6 | 26.9 | 26.3 | 25.7 |
| Compressor discharge temperature | °C. | 114.8 | 118.7 | 122.2 | 125.5 | 128.5 | 131.2 | 133.8 | 136.3 |
| Evaporator inlet pressure | bar | 0.74 | 0.79 | 0.85 | 0.92 | 0.99 | 1.07 | 1.16 | 1.25 |
| Condenser inlet pressure | bar | 11.9 | 13.1 | 14.3 | 15.4 | 16.6 | 17.7 | 18.9 | 20.0 |
| Evaporator inlet temperature | °C. | −29.7 | −30.4 | −31.1 | −31.9 | −32.7 | −33.6 | −34.4 | −35.4 |
| Evaporator dewpoint | °C. | −29.3 | −28.7 | −28.0 | −27.2 | −26.5 | −25.7 | −25.0 | −24.4 |
| Evaporator exit gas temperature | °C. | −24.3 | −23.7 | −23.0 | −22.2 | −21.5 | −20.7 | −20.0 | −19.4 |
| Evaporator mean temperature | °C. | −29.5 | −29.5 | −29.5 | −29.6 | −29.6 | −29.7 | −29.7 | −29.9 |
| Evaporator glide (out-in) | K | 0.4 | 1.7 | 3.1 | 4.7 | 6.2 | 7.8 | 9.4 | 11.0 |
| Compressor suction pressure | bar | 0.67 | 0.73 | 0.80 | 0.87 | 0.95 | 1.04 | 1.12 | 1.22 |
| Compressor discharge pressure | bar | 11.9 | 13.1 | 14.3 | 15.4 | 16.6 | 17.7 | 18.9 | 20.0 |
| Suction line pressure drop | Pa/m | 379 | 327 | 286 | 253 | 226 | 204 | 185 | 169 |
| Pressure drop relative to reference | | 129.8% | 111.9% | 97.9% | 86.6% | 77.4% | 69.8% | 63.3% | 57.8% |
| Condenser dew point | °C. | 54.0 | 55.6 | 56.9 | 58.0 | 58.8 | 59.4 | 59.8 | 60.0 |
| Condenser bubble point | °C. | 49.9 | 45.1 | 41.3 | 38.3 | 35.8 | 33.8 | 32.2 | 30.8 |
| Condenser exit liquid temperature | °C. | 48.9 | 44.1 | 40.3 | 37.3 | 34.8 | 32.8 | 31.2 | 29.8 |
| Condenser mean temperature | °C. | 51.9 | 50.3 | 49.1 | 48.1 | 47.3 | 46.6 | 46.0 | 45.4 |
| Condenser glide (in-out) | K | 4.1 | 10.5 | 15.6 | 19.7 | 23.0 | 25.6 | 27.6 | 29.3 |

TABLE 14

Theoretical Performance Data of Selected R-744/propene/R-1234ze(E) blends containing 16-30% R-744 and 4% propene Composition CO$_2$/propene/R-1234ze(E) % by weight▶

| | | 16/4/80 | 18/4/78 | 20/4/76 | 22/4/74 | 24/4/72 | 26/4/70 | 28/4/68 | 30/4/66 |
|---|---|---|---|---|---|---|---|---|---|
| COP (heating) | | 2.22 | 2.22 | 2.23 | 2.23 | 2.23 | 2.23 | 2.23 | 2.23 |
| COP (heating) relative to Reference | | 105.1% | 105.4% | 105.6% | 105.8% | 105.8% | 105.8% | 105.8% | 105.7% |
| Volumetric heating capacity at suction | kJ/m$^3$ | 1461 | 1563 | 1668 | 1773 | 1879 | 1986 | 2093 | 2201 |
| Capacity relative to Reference | | 166.2% | 177.9% | 189.8% | 201.8% | 213.8% | 226.0% | 238.2% | 250.5% |

TABLE 14-continued

Theoretical Performance Data of Selected R-744/propene/R-1234ze(E) blends containing 16-30% R-744 and 4% propene

| | | Composition CO$_2$/propene/R-1234ze(E) % by weight | | | | | | | |
|---|---|---|---|---|---|---|---|---|---|
| | | 16/4/80 | 18/4/78 | 20/4/76 | 22/4/74 | 24/4/72 | 26/4/70 | 28/4/68 | 30/4/66 |
| Critical temperature | ° C. | 83.44 | 81.01 | 78.70 | 76.49 | 74.38 | 72.35 | 70.42 | 68.56 |
| Critical pressure | bar | 45.08 | 45.81 | 46.54 | 47.27 | 47.99 | 48.72 | 49.44 | 50.16 |
| Condenser enthalpy change | kJ/kg | 285.1 | 290.1 | 294.9 | 299.4 | 303.8 | 308.0 | 312.1 | 316.2 |
| Pressure ratio | | 16.02 | 15.65 | 15.28 | 14.92 | 14.58 | 14.25 | 13.94 | 13.64 |
| Refrigerant mass flow | kg/hr | 25.3 | 24.8 | 24.4 | 24.0 | 23.7 | 23.4 | 23.1 | 22.8 |
| Compressor discharge temperature | ° C. | 138.7 | 141.0 | 143.2 | 145.4 | 147.6 | 149.7 | 151.8 | 153.9 |
| Evaporator inlet pressure | bar | 1.34 | 1.44 | 1.54 | 1.64 | 1.75 | 1.86 | 1.98 | 2.09 |
| Condenser inlet pressure | bar | 21.0 | 22.1 | 23.2 | 24.2 | 25.3 | 26.3 | 27.3 | 28.3 |
| Evaporator inlet temperature | ° C. | -36.3 | -37.3 | -38.3 | -39.3 | -40.3 | -41.3 | -42.2 | -43.1 |
| Evaporator dewpoint | ° C. | -23.7 | -23.2 | -22.6 | -22.2 | -21.7 | -21.4 | -21.1 | -20.8 |
| Evaporator exit gas temperature | ° C. | -18.7 | -18.2 | -17.6 | -17.2 | -16.7 | -16.4 | -16.1 | -15.8 |
| Evaporator mean temperature | ° C. | -30.0 | -30.2 | -30.5 | -30.7 | -31.0 | -31.3 | -31.6 | -32.0 |
| Evaporator glide (out-in) | K | 12.6 | 14.2 | 15.7 | 17.2 | 18.5 | 19.9 | 21.1 | 22.2 |
| Compressor suction pressure | bar | 1.31 | 1.41 | 1.52 | 1.62 | 1.73 | 1.84 | 1.96 | 2.07 |
| Compressor discharge pressure | bar | 21.0 | 22.1 | 23.2 | 24.2 | 25.3 | 26.3 | 27.3 | 28.3 |
| Suction line pressure drop | Pa/m | 155 | 143 | 132 | 123 | 115 | 108 | 101 | 95 |
| Pressure drop relative to reference | | 53.0% | 48.9% | 45.3% | 42.1% | 39.3% | 36.8% | 34.6% | 32.6% |
| Condenser dew point | ° C. | 60.1 | 60.1 | 60.0 | 59.8 | 59.4 | 59.0 | 58.6 | 58.1 |
| Condenser bubble point | ° C. | 29.6 | 28.7 | 27.8 | 27.1 | 26.5 | 25.9 | 25.5 | 25.1 |
| Condenser exit liquid temperature | ° C. | 28.6 | 27.7 | 26.8 | 26.1 | 25.5 | 24.9 | 24.5 | 24.1 |
| Condenser mean temperature | ° C. | 44.9 | 44.4 | 43.9 | 43.4 | 43.0 | 42.5 | 42.0 | 41.6 |
| Condenser glide (in-out) | K | 30.5 | 31.5 | 32.2 | 32.7 | 33.0 | 33.1 | 33.1 | 33.0 |

TABLE 15

Theoretical Performance Data of Selected R-744/propene/R-1234ze(E) blends containing 0-14% R-744 and 6% propene

| | | Composition CO$_2$/propene/R-1234ze(E) % by weight | | | | | | | |
|---|---|---|---|---|---|---|---|---|---|
| | | 0/6/94 | 2/6/92 | 4/6/90 | 6/6/88 | 8/6/86 | 10/6/84 | 12/6/82 | 14/6/80 |
| COP (heating) | | 2.04 | 2.08 | 2.12 | 2.15 | 2.17 | 2.18 | 2.20 | 2.21 |
| COP (heating) relative to Reference | | 96.6% | 98.8% | 100.4% | 101.7% | 102.7% | 103.5% | 104.1% | 104.6% |
| Volumetric heating capacity at suction | kJ/m$^3$ | 768 | 853 | 941 | 1031 | 1124 | 1220 | 1317 | 1417 |
| Capacity relative to Reference | | 87.4% | 97.1% | 107.0% | 117.4% | 127.9% | 138.8% | 149.9% | 161.3% |
| Critical temperature | ° C. | 107.11 | 103.60 | 100.25 | 97.07 | 94.04 | 91.16 | 88.42 | 85.81 |
| Critical pressure | bar | 40.14 | 40.94 | 41.71 | 42.46 | 43.21 | 43.95 | 44.68 | 45.41 |
| Condenser enthalpy change | kJ/kg | 227.9 | 239.2 | 248.9 | 257.3 | 264.7 | 271.4 | 277.5 | 283.1 |
| Pressure ratio | | 17.22 | 17.29 | 17.23 | 17.06 | 16.82 | 16.53 | 16.21 | 15.87 |
| Refrigerant mass flow | kg/hr | 31.6 | 30.1 | 28.9 | 28.0 | 27.2 | 26.5 | 25.9 | 25.4 |
| Compressor discharge temperature | ° C. | 115.6 | 119.2 | 122.6 | 125.7 | 128.6 | 131.3 | 133.8 | 136.2 |
| Evaporator inlet pressure | bar | 0.78 | 0.84 | 0.90 | 0.97 | 1.05 | 1.13 | 1.22 | 1.31 |
| Condenser inlet pressure | bar | 12.5 | 13.6 | 14.8 | 15.9 | 17.1 | 18.2 | 19.3 | 20.4 |
| Evaporator inlet temperature | ° C. | -30.0 | -30.7 | -31.5 | -32.2 | -33.1 | -33.9 | -34.8 | -35.7 |
| Evaporator dewpoint | ° C. | -28.8 | -28.2 | -27.5 | -26.7 | -26.1 | -25.4 | -24.7 | -24.1 |
| Evaporator exit gas temperature | ° C. | -23.8 | -23.2 | -22.5 | -21.8 | -21.1 | -20.4 | -19.7 | -19.1 |
| Evaporator mean temperature | ° C. | -29.4 | -29.5 | -29.5 | -29.5 | -29.6 | -29.7 | -29.8 | -29.9 |
| Evaporator glide (out-in) | K | 1.2 | 2.5 | 4.0 | 5.5 | 7.0 | 8.5 | 10.1 | 11.6 |
| Compressor suction pressure | bar | 0.72 | 0.79 | 0.86 | 0.93 | 1.01 | 1.10 | 1.19 | 1.29 |
| Compressor discharge pressure | bar | 12.5 | 13.6 | 14.8 | 15.9 | 17.1 | 18.2 | 19.3 | 20.4 |
| Suction line pressure drop | Pa/m | 348 | 303 | 266 | 237 | 213 | 192 | 175 | 160 |
| Pressure drop relative to reference | | 119.3% | 103.6% | 91.2% | 81.1% | 72.8% | 65.9% | 60.0% | 54.9% |
| Condenser dew point | ° C. | 54.1 | 55.6 | 56.8 | 57.7 | 58.5 | 59.0 | 59.4 | 59.5 |
| Condenser bubble point | ° C. | 49.0 | 44.6 | 41.0 | 38.2 | 35.9 | 34.0 | 32.4 | 31.1 |
| Condenser exit liquid temperature | ° C. | 48.0 | 43.6 | 40.0 | 37.2 | 34.9 | 33.0 | 31.4 | 30.1 |
| Condenser mean temperature | ° C. | 51.6 | 50.1 | 48.9 | 48.0 | 47.2 | 46.5 | 45.9 | 45.3 |
| Condenser glide (in-out) | K | 5.1 | 11.0 | 15.7 | 19.5 | 22.6 | 25.0 | 26.9 | 28.5 |

TABLE 16

Theoretical Performance Data of Selected R-744/propene/R-1234ze(E) blends containing 16-30% R-744 and 6% propene

| | | Composition CO$_2$/propene/R-1234ze(E) % by weight | | | | | | | |
|---|---|---|---|---|---|---|---|---|---|
| | | 16/6/78 | 18/6/76 | 20/6/74 | 22/6/72 | 24/6/70 | 26/6/68 | 28/6/66 | 30/6/64 |
| COP (heating) | | 2.21 | 2.22 | 2.22 | 2.23 | 2.23 | 2.23 | 2.23 | 2.23 |
| COP (heating) relative to Reference | | 105.0% | 105.3% | 105.4% | 105.6% | 105.6% | 105.6% | 105.6% | 105.5% |
| Volumetric heating capacity at suction | kJ/m$^3$ | 1519 | 1622 | 1726 | 1832 | 1938 | 2045 | 2154 | 2263 |

TABLE 16-continued

Theoretical Performance Data of Selected R-744/propene/R-1234ze(E) blends containing 16-30% R-744 and 6% propene

| | | Composition $CO_2$/propene/R-1234ze(E) % by weight | | | | | | | |
|---|---|---|---|---|---|---|---|---|---|
| | | 16/6/78 | 18/6/76 | 20/6/74 | 22/6/72 | 24/6/70 | 26/6/68 | 28/6/66 | 30/6/64 |
| Capacity relative to Reference | | 172.8% | 184.6% | 196.4% | 208.5% | 220.6% | 232.8% | 245.1% | 257.6% |
| Critical temperature | °C. | 83.32 | 80.94 | 78.67 | 76.50 | 74.42 | 72.44 | 70.53 | 68.70 |
| Critical pressure | bar | 46.13 | 46.85 | 47.57 | 48.28 | 48.99 | 49.70 | 50.41 | 51.11 |
| Condenser enthalpy change | kJ/kg | 288.3 | 293.2 | 297.9 | 302.4 | 306.7 | 310.8 | 314.9 | 318.8 |
| Pressure ratio | | 15.52 | 15.17 | 14.82 | 14.49 | 14.17 | 13.86 | 13.56 | 13.28 |
| Refrigerant mass flow | kg/hr | 25.0 | 24.6 | 24.2 | 23.8 | 23.5 | 23.2 | 22.9 | 22.6 |
| Compressor discharge temperature | °C. | 138.5 | 140.7 | 142.9 | 145.1 | 147.1 | 149.2 | 151.3 | 153.3 |
| Evaporator inlet pressure | bar | 1.41 | 1.51 | 1.61 | 1.72 | 1.83 | 1.94 | 2.06 | 2.18 |
| Condenser inlet pressure | bar | 21.5 | 22.5 | 23.6 | 24.6 | 25.7 | 26.7 | 27.7 | 28.7 |
| Evaporator inlet temperature | °C. | −36.7 | −37.6 | −38.6 | −39.5 | −40.4 | −41.3 | −42.2 | −43.0 |
| Evaporator dewpoint | °C. | −23.5 | −23.0 | −22.5 | −22.1 | −21.7 | −21.4 | −21.1 | −20.8 |
| Evaporator exit gas temperature | °C. | −18.5 | −18.0 | −17.5 | −17.1 | −16.7 | −16.4 | −16.1 | −15.8 |
| Evaporator mean temperature | °C. | −30.1 | −30.3 | −30.5 | −30.8 | −31.1 | −31.3 | −31.6 | −31.9 |
| Evaporator glide (out-in) | K | 13.1 | 14.6 | 16.1 | 17.4 | 18.7 | 20.0 | 21.1 | 22.2 |
| Compressor suction pressure | bar | 1.38 | 1.49 | 1.59 | 1.70 | 1.81 | 1.92 | 2.04 | 2.16 |
| Compressor discharge pressure | bar | 21.5 | 22.5 | 23.6 | 24.6 | 25.7 | 26.7 | 27.7 | 28.7 |
| Suction line pressure drop | Pa/m | 148 | 137 | 127 | 118 | 111 | 104 | 97 | 92 |
| Pressure drop relative to reference | | 50.6% | 46.8% | 43.4% | 40.5% | 37.8% | 35.5% | 33.4% | 31.5% |
| Condenser dew point | °C. | 59.6 | 59.5 | 59.4 | 59.1 | 58.8 | 58.4 | 57.9 | 57.4 |
| Condenser bubble point | °C. | 30.0 | 29.0 | 28.2 | 27.5 | 26.9 | 26.4 | 25.9 | 25.6 |
| Condenser exit liquid temperature | °C. | 29.0 | 28.0 | 27.2 | 26.5 | 25.9 | 25.4 | 24.9 | 24.6 |
| Condenser mean temperature | °C. | 44.8 | 44.3 | 43.8 | 43.3 | 42.9 | 42.4 | 41.9 | 41.5 |
| Condenser glide (in-out) | K | 29.6 | 30.5 | 31.2 | 31.6 | 31.9 | 32.0 | 32.0 | 31.8 |

TABLE 17

Theoretical Performance Data of Selected R-744/propene/R-1234ze(E) blends containing 0-14% R-744 and 8% propene

| | | Composition $CO_2$/propene/R-1234ze(E) % by weight | | | | | | | |
|---|---|---|---|---|---|---|---|---|---|
| | | 0/8/92 | 2/8/90 | 4/8/88 | 6/8/86 | 8/8/84 | 10/8/82 | 12/8/80 | 14/8/78 |
| COP (heating) | | 2.05 | 2.09 | 2.12 | 2.15 | 2.17 | 2.18 | 2.19 | 2.20 |
| COP (heating) relative to Reference | | 97.0% | 99.1% | 100.6% | 101.8% | 102.7% | 103.5% | 104.1% | 104.5% |
| Volumetric heating capacity at suction | kJ/m³ | 816 | 903 | 992 | 1084 | 1178 | 1274 | 1373 | 1473 |
| Capacity relative to Reference | | 92.9% | 102.8% | 112.9% | 123.4% | 134.1% | 145.0% | 156.2% | 167.6% |
| Critical temperature | °C. | 106.30 | 102.93 | 99.70 | 96.62 | 93.68 | 90.88 | 88.21 | 85.66 |
| Critical pressure | bar | 41.05 | 41.87 | 42.66 | 43.42 | 44.17 | 44.91 | 45.64 | 46.36 |
| Condenser enthalpy change | kJ/kg | 232.8 | 243.6 | 253.0 | 261.1 | 268.4 | 274.9 | 280.9 | 286.4 |
| Pressure ratio | | 16.69 | 16.73 | 16.66 | 16.49 | 16.27 | 15.99 | 15.69 | 15.37 |
| Refrigerant mass flow | kg/hr | 30.9 | 29.6 | 28.5 | 27.6 | 26.8 | 26.2 | 25.6 | 25.1 |
| Compressor discharge temperature | °C. | 116.1 | 119.7 | 122.9 | 125.9 | 128.7 | 131.3 | 133.7 | 136.1 |
| Evaporator inlet pressure | bar | 0.83 | 0.89 | 0.96 | 1.03 | 1.11 | 1.20 | 1.29 | 1.38 |
| Condenser inlet pressure | bar | 13.0 | 14.1 | 15.3 | 16.4 | 17.5 | 18.6 | 19.7 | 20.8 |
| Evaporator inlet temperature | °C. | −30.3 | −31.1 | −31.8 | −32.6 | −33.4 | −34.2 | −35.1 | −36.0 |
| Evaporator dewpoint | °C. | −28.4 | −27.8 | −27.1 | −26.4 | −25.8 | −25.1 | −24.5 | −23.9 |
| Evaporator exit gas temperature | °C. | −23.4 | −22.8 | −22.1 | −21.4 | −20.8 | −20.1 | −19.5 | −18.9 |
| Evaporator mean temperature | °C. | −29.4 | −29.4 | −29.5 | −29.5 | −29.6 | −29.7 | −29.8 | −29.9 |
| Evaporator glide (out-in) | K | 2.0 | 3.3 | 4.7 | 6.2 | 7.6 | 9.1 | 10.6 | 12.1 |
| Compressor suction pressure | bar | 0.78 | 0.84 | 0.92 | 0.99 | 1.08 | 1.17 | 1.26 | 1.35 |
| Compressor discharge pressure | bar | 13.0 | 14.1 | 15.3 | 16.4 | 17.5 | 18.6 | 19.7 | 20.8 |
| Suction line pressure drop | Pa/m | 323 | 282 | 249 | 223 | 201 | 182 | 167 | 153 |
| Pressure drop relative to reference | | 110.4% | 96.5% | 85.4% | 76.3% | 68.8% | 62.5% | 57.1% | 52.4% |
| Condenser dew point | °C. | 54.1 | 55.5 | 56.6 | 57.4 | 58.1 | 58.6 | 58.9 | 59.0 |
| Condenser bubble point | °C. | 48.4 | 44.3 | 40.9 | 38.2 | 36.0 | 34.2 | 32.7 | 31.4 |
| Condenser exit liquid temperature | °C. | 47.4 | 43.3 | 39.9 | 37.2 | 35.0 | 33.2 | 31.7 | 30.4 |
| Condenser mean temperature | °C. | 51.3 | 49.9 | 48.8 | 47.8 | 47.1 | 46.4 | 45.8 | 45.2 |
| Condenser glide (in-out) | K | 5.7 | 11.2 | 15.6 | 19.2 | 22.1 | 24.4 | 26.2 | 27.6 |

TABLE 18

Theoretical Performance Data of Selected R-744/propene/R-1234ze(E) blends containing 16-30% R-744 and 8% propene

| | | Composition $CO_2$/propene/R-1234ze(E) % by weight | | | | | | | |
|---|---|---|---|---|---|---|---|---|---|
| | | 16/8/76 | 18/8/74 | 20/8/72 | 22/8/70 | 24/8/68 | 26/8/66 | 28/8/64 | 30/8/62 |
| COP (heating) | | 2.21 | 2.22 | 2.22 | 2.22 | 2.22 | 2.22 | 2.22 | 2.22 |
| COP (heating) relative to Reference | | 104.9% | 105.1% | 105.3% | 105.4% | 105.5% | 105.5% | 105.4% | 105.4% |

TABLE 18-continued

Theoretical Performance Data of Selected R-744/propene/R-1234ze(E) blends containing 16-30% R-744 and 8% propene

| | | Composition CO$_2$/propene/R-1234ze(E) % by weight ▶ | | | | | | | |
|---|---|---|---|---|---|---|---|---|---|
| | | 16/8/76 | 18/8/74 | 20/8/72 | 22/8/70 | 24/8/68 | 26/8/66 | 28/8/64 | 30/8/62 |
| Volumetric heating capacity at suction | kJ/m$^3$ | 1575 | 1678 | 1783 | 1889 | 1996 | 2104 | 2213 | 2324 |
| Capacity relative to Reference | | 179.2% | 191.0% | 202.9% | 215.0% | 227.1% | 239.4% | 251.9% | 264.5% |
| Critical temperature | ° C. | 83.23 | 80.90 | 78.67 | 76.54 | 74.50 | 72.54 | 70.66 | 68.85 |
| Critical pressure | bar | 47.08 | 47.79 | 48.50 | 49.20 | 49.90 | 50.60 | 51.29 | 51.98 |
| Condenser enthalpy change | kJ/kg | 291.5 | 296.4 | 301.0 | 305.4 | 309.6 | 313.7 | 317.6 | 321.4 |
| Pressure ratio | | 15.05 | 14.72 | 14.40 | 14.09 | 13.79 | 13.49 | 13.21 | 12.93 |
| Refrigerant mass flow | kg/hr | 24.7 | 24.3 | 23.9 | 23.6 | 23.3 | 23.0 | 22.7 | 22.4 |
| Compressor discharge temperature | ° C. | 138.3 | 140.5 | 142.6 | 144.7 | 146.7 | 148.7 | 150.7 | 152.6 |
| Evaporator inlet pressure | bar | 1.48 | 1.58 | 1.69 | 1.79 | 1.91 | 2.02 | 2.14 | 2.26 |
| Condenser inlet pressure | bar | 21.9 | 22.9 | 24.0 | 25.0 | 26.0 | 27.0 | 28.0 | 29.0 |
| Evaporator inlet temperature | ° C. | −36.9 | −37.8 | −38.7 | −39.6 | −40.5 | −41.3 | −42.1 | −42.9 |
| Evaporator dewpoint | ° C. | −23.3 | −22.8 | −22.4 | −22.0 | −21.6 | −21.3 | −21.1 | −20.9 |
| Evaporator exit gas temperature | ° C. | −18.3 | −17.8 | −17.4 | −17.0 | −16.6 | −16.3 | −16.1 | −15.9 |
| Evaporator mean temperature | ° C. | −30.1 | −30.3 | −30.6 | −30.8 | −31.1 | −31.3 | −31.6 | −31.9 |
| Evaporator glide (out-in) | K | 13.6 | 15.0 | 16.3 | 17.6 | 18.8 | 20.0 | 21.0 | 22.0 |
| Compressor suction pressure | bar | 1.45 | 1.56 | 1.66 | 1.77 | 1.89 | 2.00 | 2.12 | 2.24 |
| Compressor discharge pressure | bar | 21.9 | 22.9 | 24.0 | 25.0 | 26.0 | 27.0 | 28.0 | 29.0 |
| Suction line pressure drop | Pa/m | 141 | 131 | 122 | 114 | 107 | 100 | 94 | 89 |
| Pressure drop relative to reference | | 48.4% | 44.8% | 41.7% | 38.9% | 36.5% | 34.3% | 32.3% | 30.5% |
| Condenser dew point | ° C. | 59.1 | 59.0 | 58.8 | 58.5 | 58.2 | 57.8 | 57.3 | 56.7 |
| Condenser bubble point | ° C. | 30.3 | 29.4 | 28.6 | 27.9 | 27.3 | 26.8 | 26.4 | 26.0 |
| Condenser exit liquid temperature | ° C. | 29.3 | 28.4 | 27.6 | 26.9 | 26.3 | 25.8 | 25.4 | 25.0 |
| Condenser mean temperature | ° C. | 44.7 | 44.2 | 43.7 | 43.2 | 42.8 | 42.3 | 41.8 | 41.4 |
| Condenser glide (in-out) | K | 28.7 | 29.6 | 30.2 | 30.6 | 30.8 | 30.9 | 30.9 | 30.7 |

TABLE 19

Theoretical Performance Data of Selected R-744/propene/R-1234ze(E) blends containing 0-14% R-744 and 10% propene

| | | Composition CO$_2$/propene/R-1234ze(E) % by weight ▶ | | | | | | | |
|---|---|---|---|---|---|---|---|---|---|
| | | 0/10/90 | 2/10/90 | 4/10/88 | 6/10/86 | 8/10/84 | 10/10/82 | 12/10/80 | 14/10/78 |
| COP (heating) | | 2.05 | 2.09 | 2.12 | 2.15 | 2.17 | 2.18 | 2.19 | 2.20 |
| COP (heating) relative to Reference | | 97.4% | 99.3% | 100.7% | 101.9% | 102.8% | 103.5% | 104.0% | 104.4% |
| Volumetric heating capacity at suction | kJ/m$^3$ | 864 | 952 | 1043 | 1136 | 1230 | 1327 | 1426 | 1527 |
| Capacity relative to Reference | | 98.3% | 108.3% | 118.6% | 129.2% | 140.0% | 151.1% | 162.3% | 173.8% |
| Critical temperature | ° C. | 105.53 | 102.30 | 99.18 | 96.21 | 93.36 | 90.64 | 88.03 | 85.55 |
| Critical pressure | bar | 41.86 | 42.70 | 43.51 | 44.28 | 45.04 | 45.78 | 46.51 | 47.23 |
| Condenser enthalpy change | kJ/kg | 237.4 | 247.8 | 256.9 | 264.9 | 272.0 | 278.4 | 284.3 | 289.8 |
| Pressure ratio | | 16.18 | 16.20 | 16.12 | 15.96 | 15.75 | 15.49 | 15.21 | 14.92 |
| Refrigerant mass flow | kg/hr | 30.3 | 29.1 | 28.0 | 27.2 | 26.5 | 25.9 | 25.3 | 24.8 |
| Compressor discharge temperature | ° C. | 116.6 | 120.0 | 123.1 | 126.0 | 128.7 | 131.3 | 133.7 | 136.0 |
| Evaporator inlet pressure | bar | 0.88 | 0.94 | 1.01 | 1.09 | 1.17 | 1.26 | 1.35 | 1.45 |
| Condenser inlet pressure | bar | 13.4 | 14.6 | 15.7 | 16.8 | 17.9 | 19.0 | 20.1 | 21.2 |
| Evaporator inlet temperature | ° C. | −30.6 | −31.4 | −32.1 | −32.9 | −33.7 | −34.5 | −35.4 | −36.2 |
| Evaporator dewpoint | ° C. | −28.0 | −27.4 | −26.8 | −26.1 | −25.5 | −24.9 | −24.3 | −23.7 |
| Evaporator exit gas temperature | ° C. | −23.0 | −22.4 | −21.8 | −21.1 | −20.5 | −19.9 | −19.3 | −18.7 |
| Evaporator mean temperature | ° C. | −29.3 | −29.4 | −29.4 | −29.5 | −29.6 | −29.7 | −29.8 | −30.0 |
| Evaporator glide (out-in) | K | 2.6 | 4.0 | 5.3 | 6.8 | 8.2 | 9.6 | 11.1 | 12.5 |
| Compressor suction pressure | bar | 0.83 | 0.90 | 0.97 | 1.05 | 1.14 | 1.23 | 1.32 | 1.42 |
| Compressor discharge pressure | bar | 13.4 | 14.6 | 15.7 | 16.8 | 17.9 | 19.0 | 20.1 | 21.2 |
| Suction line pressure drop | Pa/m | 300 | 264 | 235 | 211 | 190 | 173 | 159 | 146 |
| Pressure drop relative to reference | | 102.8% | 90.4% | 80.3% | 72.1% | 65.2% | 59.4% | 54.4% | 50.1% |
| Condenser dew point | ° C. | 54.1 | 55.3 | 56.3 | 57.1 | 57.7 | 58.1 | 58.4 | 58.5 |
| Condenser bubble point | ° C. | 48.0 | 44.1 | 40.9 | 38.4 | 36.2 | 34.5 | 33.0 | 31.7 |
| Condenser exit liquid temperature | ° C. | 47.0 | 43.1 | 39.9 | 37.4 | 35.2 | 33.5 | 32.0 | 30.7 |
| Condenser mean temperature | ° C. | 51.0 | 49.7 | 48.6 | 47.7 | 47.0 | 46.3 | 45.7 | 45.1 |
| Condenser glide (in-out) | K | 6.0 | 11.2 | 15.4 | 18.8 | 21.5 | 23.7 | 25.4 | 26.8 |

TABLE 20

Theoretical Performance Data of Selected R-744/propene/R-1234ze(E) blends containing 16-30% R-744 and 10% propene

| | | Composition CO$_2$/propene/R-1234ze(E) % by weight ▶ | | | | | | | |
|---|---|---|---|---|---|---|---|---|---|
| | | 16/10/76 | 18/10/74 | 20/10/72 | 22/10/70 | 24/10/68 | 26/10/66 | 28/10/64 | 30/10/62 |
| COP (heating) | | 2.21 | 2.21 | 2.22 | 2.22 | 2.22 | 2.22 | 2.22 | 2.22 |
| COP (heating) relative to Reference | | 104.8% | 105.0% | 105.2% | 105.3% | 105.3% | 105.3% | 105.3% | 105.2% |
| Volumetric heating capacity at suction | kJ/m$^3$ | 1629 | 1733 | 1838 | 1944 | 2052 | 2161 | 2271 | 2383 |
| Capacity relative to Reference | | 185.4% | 197.2% | 209.2% | 221.3% | 233.5% | 245.9% | 258.5% | 271.3% |
| Critical temperature | °C. | 83.16 | 80.88 | 78.70 | 76.60 | 74.59 | 72.66 | 70.81 | 69.03 |
| Critical pressure | bar | 47.95 | 48.65 | 49.35 | 50.05 | 50.74 | 51.42 | 52.11 | 52.78 |
| Condenser enthalpy change | kJ/kg | 294.8 | 299.6 | 304.2 | 308.5 | 312.6 | 316.6 | 320.5 | 324.2 |
| Pressure ratio | | 14.62 | 14.31 | 14.01 | 13.72 | 13.43 | 13.15 | 12.87 | 12.61 |
| Refrigerant mass flow | kg/hr | 24.4 | 24.0 | 23.7 | 23.3 | 23.0 | 22.7 | 22.5 | 22.2 |
| Compressor discharge temperature | °C. | 138.2 | 140.3 | 142.4 | 144.4 | 146.4 | 148.3 | 150.2 | 152.0 |
| Evaporator inlet pressure | bar | 1.55 | 1.65 | 1.76 | 1.87 | 1.98 | 2.10 | 2.22 | 2.34 |
| Condenser inlet pressure | bar | 22.3 | 23.3 | 24.3 | 25.4 | 26.4 | 27.4 | 28.4 | 29.4 |
| Evaporator inlet temperature | °C. | -37.1 | -37.9 | -38.8 | -39.6 | -40.4 | -41.2 | -41.9 | -42.6 |
| Evaporator dewpoint | °C. | -23.2 | -22.8 | -22.3 | -22.0 | -21.7 | -21.4 | -21.1 | -20.9 |
| Evaporator exit gas temperature | °C. | -18.2 | -17.8 | -17.3 | -17.0 | -16.7 | -16.4 | -16.1 | -15.9 |
| Evaporator mean temperature | °C. | -30.1 | -30.3 | -30.6 | -30.8 | -31.0 | -31.3 | -31.5 | -31.8 |
| Evaporator glide (out-in) | K | 13.8 | 15.2 | 16.4 | 17.6 | 18.8 | 19.8 | 20.8 | 21.7 |
| Compressor suction pressure | bar | 1.52 | 1.63 | 1.74 | 1.85 | 1.96 | 2.08 | 2.20 | 2.33 |
| Compressor discharge pressure | bar | 22.3 | 23.3 | 24.3 | 25.4 | 26.4 | 27.4 | 28.4 | 29.4 |
| Suction line pressure drop | Pa/m | 135 | 126 | 117 | 110 | 103 | 97 | 91 | 86 |
| Pressure drop relative to reference | | 46.4% | 43.1% | 40.1% | 37.5% | 35.2% | 33.1% | 31.2% | 29.5% |
| Condenser dew point | °C. | 58.5 | 58.4 | 58.2 | 57.9 | 57.6 | 57.2 | 56.7 | 56.1 |
| Condenser bubble point | °C. | 30.7 | 29.8 | 29.0 | 28.3 | 27.8 | 27.3 | 26.8 | 26.5 |
| Condenser exit liquid temperature | °C. | 29.7 | 28.8 | 28.0 | 27.3 | 26.8 | 26.3 | 25.8 | 25.5 |
| Condenser mean temperature | °C. | 44.6 | 44.1 | 43.6 | 43.1 | 42.7 | 42.2 | 41.8 | 41.3 |
| Condenser glide (in-out) | K | 27.8 | 28.6 | 29.2 | 29.6 | 29.8 | 29.9 | 29.8 | 29.7 |

TABLE 21

Theoretical Performance Data of Selected R-744/propene/R-1234ze(E) blends containing 0-14% R-744 and 12% propene

| | | Composition CO$_2$/propene/R-1234ze(E) % by weight ▶ | | | | | | | |
|---|---|---|---|---|---|---|---|---|---|
| | | 0/12/88 | 2/12/86 | 4/12/84 | 6/12/82 | 8/12/80 | 10/12/78 | 12/12/76 | 14/12/74 |
| COP (heating) | | 2.06 | 2.10 | 2.13 | 2.15 | 2.17 | 2.18 | 2.19 | 2.20 |
| COP (heating) relative to Reference | | 97.6% | 99.5% | 100.8% | 101.9% | 102.8% | 103.4% | 104.0% | 104.4% |
| Volumetric heating capacity at suction | kJ/m$^3$ | 911 | 1000 | 1092 | 1186 | 1281 | 1379 | 1478 | 1579 |
| Capacity relative to Reference | | 103.6% | 113.8% | 124.2% | 134.9% | 145.8% | 156.9% | 168.2% | 179.7% |
| Critical temperature | °C. | 104.81 | 101.70 | 98.70 | 95.82 | 93.06 | 90.41 | 87.88 | 85.45 |
| Critical pressure | bar | 42.57 | 43.44 | 44.26 | 45.05 | 45.81 | 46.56 | 47.30 | 48.02 |
| Condenser enthalpy change | kJ/kg | 241.8 | 252.0 | 260.8 | 268.6 | 275.7 | 282.0 | 287.8 | 293.2 |
| Pressure ratio | | 15.70 | 15.70 | 15.62 | 15.47 | 15.27 | 15.04 | 14.78 | 14.50 |
| Refrigerant mass flow | kg/hr | 29.8 | 28.6 | 27.6 | 26.8 | 26.1 | 25.5 | 25.0 | 24.6 |
| Compressor discharge temperature | °C. | 117.1 | 120.3 | 123.4 | 126.2 | 128.8 | 131.3 | 133.6 | 135.9 |
| Evaporator inlet pressure | bar | 0.93 | 1.00 | 1.07 | 1.15 | 1.23 | 1.32 | 1.41 | 1.51 |
| Condenser inlet pressure | bar | 13.8 | 15.0 | 16.1 | 17.2 | 18.3 | 19.4 | 20.5 | 21.6 |
| Evaporator inlet temperature | °C. | -30.9 | -31.6 | -32.4 | -33.1 | -33.9 | -34.7 | -35.5 | -36.3 |
| Evaporator dewpoint | °C. | -27.7 | -27.1 | -26.5 | -25.9 | -25.3 | -24.7 | -24.1 | -23.6 |
| Evaporator exit gas temperature | °C. | -22.7 | -22.1 | -21.5 | -20.9 | -20.3 | -19.7 | -19.1 | -18.6 |
| Evaporator mean temperature | °C. | -29.3 | -29.4 | -29.4 | -29.5 | -29.6 | -29.7 | -29.8 | -30.0 |
| Evaporator glide (out-in) | K | 3.2 | 4.5 | 5.9 | 7.3 | 8.7 | 10.0 | 11.4 | 12.7 |
| Compressor suction pressure | bar | 0.88 | 0.95 | 1.03 | 1.11 | 1.20 | 1.29 | 1.39 | 1.49 |
| Compressor discharge pressure | bar | 13.8 | 15.0 | 16.1 | 17.2 | 18.3 | 19.4 | 20.5 | 21.6 |
| Suction line pressure drop | Pa/m | 281 | 248 | 222 | 200 | 181 | 165 | 152 | 140 |
| Pressure drop relative to reference | | 96.2% | 85.0% | 75.9% | 68.3% | 62.0% | 56.6% | 52.0% | 48.0% |
| Condenser dew point | °C. | 53.9 | 55.1 | 56.0 | 56.8 | 57.3 | 57.7 | 57.9 | 58.0 |
| Condenser bubble point | °C. | 47.8 | 44.1 | 41.0 | 38.5 | 36.5 | 34.7 | 33.3 | 32.1 |
| Condenser exit liquid temperature | °C. | 46.8 | 43.1 | 40.0 | 37.5 | 35.5 | 33.7 | 32.3 | 31.1 |
| Condenser mean temperature | °C. | 50.9 | 49.6 | 48.5 | 47.6 | 46.9 | 46.2 | 45.6 | 45.1 |
| Condenser glide (in-out) | K | 6.1 | 11.0 | 15.0 | 18.2 | 20.8 | 22.9 | 24.6 | 25.9 |

TABLE 22

Theoretical Performance Data of Selected R-744/propene/R-1234ze(E) blends containing 16-30% R-744 and 12% propene Composition CO$_2$/propene/R-1234ze(E) % by weight ▶

| | | 16/12/72 | 18/12/70 | 20/12/68 | 22/12/66 | 24/12/64 | 26/12/62 | 28/12/60 | 30/12/58 |
|---|---|---|---|---|---|---|---|---|---|
| COP (heating) | | 2.21 | 2.21 | 2.21 | 2.22 | 2.22 | 2.22 | 2.22 | 2.22 |
| COP (heating) relative to Reference | | 104.7% | 104.9% | 105.0% | 105.1% | 105.2% | 105.2% | 105.2% | 105.1% |
| Volumetric heating capacity at suction | kJ/m$^3$ | 1682 | 1786 | 1891 | 1998 | 2107 | 2217 | 2329 | 2442 |
| Capacity relative to Reference | | 191.4% | 203.2% | 215.2% | 227.4% | 239.8% | 252.3% | 265.0% | 277.9% |
| Critical temperature | °C. | 83.12 | 80.88 | 78.74 | 76.68 | 74.70 | 72.80 | 70.97 | 69.21 |
| Critical pressure | bar | 48.73 | 49.44 | 50.13 | 50.82 | 51.50 | 52.18 | 52.85 | 53.52 |
| Condenser enthalpy change | kJ/kg | 298.2 | 302.9 | 307.4 | 311.7 | 315.7 | 319.6 | 323.4 | 326.9 |
| Pressure ratio | | 14.22 | 13.93 | 13.65 | 13.37 | 13.09 | 12.82 | 12.56 | 12.30 |
| Refrigerant mass flow | kg/hr | 24.1 | 23.8 | 23.4 | 23.1 | 22.8 | 22.5 | 22.3 | 22.0 |
| Compressor discharge temperature | °C. | 138.0 | 140.1 | 142.1 | 144.1 | 146.0 | 147.8 | 149.6 | 151.4 |
| Evaporator inlet pressure | bar | 1.61 | 1.72 | 1.83 | 1.94 | 2.05 | 2.17 | 2.30 | 2.43 |
| Condenser inlet pressure | bar | 22.6 | 23.6 | 24.7 | 25.7 | 26.7 | 27.7 | 28.7 | 29.7 |
| Evaporator inlet temperature | °C. | −37.2 | −38.0 | −38.8 | −39.5 | −40.3 | −41.0 | −41.7 | −42.3 |
| Evaporator dewpoint | °C. | −23.2 | −22.7 | −22.3 | −22.0 | −21.7 | −21.4 | −21.2 | −21.0 |
| Evaporator exit gas temperature | °C. | −18.2 | −17.7 | −17.3 | −17.0 | −16.7 | −16.4 | −16.2 | −16.0 |
| Evaporator mean temperature | °C. | −30.2 | −30.4 | −30.6 | −30.8 | −31.0 | −31.2 | −31.4 | −31.7 |
| Evaporator glide (out-in) | K | 14.0 | 15.2 | 16.4 | 17.5 | 18.6 | 19.6 | 20.5 | 21.3 |
| Compressor suction pressure | bar | 1.59 | 1.70 | 1.81 | 1.92 | 2.04 | 2.16 | 2.28 | 2.41 |
| Compressor discharge pressure | bar | 22.6 | 23.6 | 24.7 | 25.7 | 26.7 | 27.7 | 28.7 | 29.7 |
| Suction line pressure drop | Pa/m | 130 | 121 | 113 | 106 | 99 | 94 | 88 | 84 |
| Pressure drop relative to reference | | 44.5% | 41.4% | 38.7% | 36.3% | 34.1% | 32.1% | 30.3% | 28.6% |
| Condenser dew point | °C. | 58.0 | 57.9 | 57.7 | 57.4 | 57.0 | 56.6 | 56.1 | 55.6 |
| Condenser bubble point | °C. | 31.0 | 30.2 | 29.4 | 28.7 | 28.2 | 27.7 | 27.3 | 26.9 |
| Condenser exit liquid temperature | °C. | 30.0 | 29.2 | 28.4 | 27.7 | 27.2 | 26.7 | 26.3 | 25.9 |
| Condenser mean temperature | °C. | 44.5 | 44.0 | 43.5 | 43.1 | 42.6 | 42.1 | 41.7 | 41.3 |
| Condenser glide (in-out) | K | 27.0 | 27.7 | 28.3 | 28.6 | 28.8 | 28.9 | 28.8 | 28.7 |

TABLE 23

Theoretical Performance Data of Selected R-744/propene/R-1234ze(E) blends containing 0-14% R-744 and 20% propene Composition CO$_2$/propene/R-1234ze(E) % by weight ▶

| | | 0/20/80 | 2/20/78 | 4/20/76 | 6/20/74 | 8/20/72 | 10/20/70 | 12/20/68 | 14/20/66 |
|---|---|---|---|---|---|---|---|---|---|
| COP (heating) | | 2.08 | 2.11 | 2.13 | 2.15 | 2.17 | 2.18 | 2.19 | 2.20 |
| COP (heating) relative to Reference | | 98.5% | 100.0% | 101.1% | 102.0% | 102.8% | 103.3% | 103.8% | 104.1% |
| Volumetric heating capacity at suction | kJ/m$^3$ | 1086 | 1179 | 1273 | 1369 | 1467 | 1566 | 1667 | 1770 |
| Capacity relative to Reference | | 123.6% | 134.2% | 144.9% | 155.8% | 166.9% | 178.2% | 189.7% | 201.4% |
| Critical temperature | °C. | 102.29 | 99.61 | 97.01 | 94.49 | 92.04 | 89.68 | 87.40 | 85.20 |
| Critical pressure | bar | 44.66 | 45.61 | 46.50 | 47.36 | 48.18 | 48.97 | 49.73 | 50.48 |
| Condenser enthalpy change | kJ/kg | 258.7 | 268.2 | 276.6 | 284.1 | 290.8 | 297.0 | 302.6 | 307.8 |
| Pressure ratio | | 14.03 | 14.03 | 13.97 | 13.87 | 13.73 | 13.55 | 13.35 | 13.14 |
| Refrigerant mass flow | kg/hr | 27.8 | 26.8 | 26.0 | 25.3 | 24.8 | 24.2 | 23.8 | 23.4 |
| Compressor discharge temperature | °C. | 118.4 | 121.3 | 124.1 | 126.7 | 129.1 | 131.4 | 133.5 | 135.6 |
| Evaporator inlet pressure | bar | 1.13 | 1.20 | 1.28 | 1.37 | 1.46 | 1.55 | 1.65 | 1.75 |
| Condenser inlet pressure | bar | 15.3 | 16.4 | 17.5 | 18.6 | 19.6 | 20.7 | 21.7 | 22.8 |
| Evaporator inlet temperature | °C. | −31.7 | −32.4 | −33.0 | −33.7 | −34.3 | −35.0 | −35.6 | −36.3 |
| Evaporator dewpoint | °C. | −26.8 | −26.3 | −25.9 | −25.4 | −24.9 | −24.5 | −24.1 | −23.7 |
| Evaporator exit gas temperature | °C. | −21.8 | −21.3 | −20.9 | −20.4 | −19.9 | −19.5 | −19.1 | −18.7 |
| Evaporator mean temperature | °C. | −29.3 | −29.3 | −29.4 | −29.5 | −29.6 | −29.7 | −29.8 | −30.0 |
| Evaporator glide (out-in) | K | 4.9 | 6.0 | 7.2 | 8.3 | 9.4 | 10.5 | 11.6 | 12.6 |
| Compressor suction pressure | bar | 1.09 | 1.17 | 1.25 | 1.34 | 1.43 | 1.53 | 1.63 | 1.73 |
| Compressor discharge pressure | bar | 15.3 | 16.4 | 17.5 | 18.6 | 19.6 | 20.7 | 21.7 | 22.8 |
| Suction line pressure drop | Pa/m | 224 | 201 | 182 | 166 | 152 | 140 | 130 | 121 |
| Pressure drop relative to reference | | 76.7% | 68.8% | 62.2% | 56.7% | 52.0% | 48.0% | 44.4% | 41.3% |
| Condenser dew point | °C. | 53.1 | 54.0 | 54.7 | 55.3 | 55.7 | 56.0 | 56.1 | 56.2 |
| Condenser bubble point | °C. | 47.6 | 44.3 | 41.6 | 39.4 | 37.5 | 35.9 | 34.5 | 33.4 |
| Condenser exit liquid temperature | °C. | 46.6 | 43.3 | 40.6 | 38.4 | 36.5 | 34.9 | 33.5 | 32.4 |
| Condenser mean temperature | °C. | 50.3 | 49.2 | 48.2 | 47.3 | 46.6 | 45.9 | 45.3 | 44.8 |
| Condenser glide (in-out) | K | 5.5 | 9.6 | 13.1 | 15.9 | 18.2 | 20.1 | 21.6 | 22.8 |

TABLE 24

Theoretical Performance Data of Selected R-744/propene/R-1234ze(E) blends containing 16-30% R-744 and 20% propene

| | | Composition $CO_2$/propene/R-1234ze(E) % by weight ▶ | | | | | | | |
|---|---|---|---|---|---|---|---|---|---|
| | | 16/20/64 | 18/20/62 | 20/20/60 | 22/20/58 | 24/20/56 | 26/20/54 | 28/20/52 | 30/20/50 |
| COP (heating) | | 2.20 | 2.21 | 2.21 | 2.21 | 2.21 | 2.21 | 2.21 | 2.21 |
| COP (heating) relative to Reference | | 104.4% | 104.6% | 104.7% | 104.8% | 104.9% | 104.9% | 105.0% | 104.9% |
| Volumetric heating capacity at suction | $kJ/m^3$ | 1874 | 1981 | 2089 | 2200 | 2312 | 2427 | 2545 | 2665 |
| Capacity relative to Reference | | 213.3% | 225.4% | 237.8% | 250.3% | 263.2% | 276.2% | 289.6% | 303.3% |
| Critical temperature | °C. | 83.07 | 81.01 | 79.03 | 77.11 | 75.26 | 73.47 | 71.74 | 70.07 |
| Critical pressure | bar | 51.21 | 51.92 | 52.61 | 53.29 | 53.96 | 54.62 | 55.27 | 55.91 |
| Condenser enthalpy change | kJ/kg | 312.6 | 317.1 | 321.3 | 325.2 | 328.9 | 332.4 | 335.7 | 338.8 |
| Pressure ratio | | 12.91 | 12.68 | 12.44 | 12.20 | 11.96 | 11.72 | 11.48 | 11.24 |
| Refrigerant mass flow | kg/hr | 23.0 | 22.7 | 22.4 | 22.1 | 21.9 | 21.7 | 21.4 | 21.2 |
| Compressor discharge temperature | °C. | 137.5 | 139.4 | 141.2 | 142.9 | 144.5 | 146.1 | 147.7 | 149.1 |
| Evaporator inlet pressure | bar | 1.86 | 1.97 | 2.09 | 2.21 | 2.34 | 2.47 | 2.61 | 2.75 |
| Condenser inlet pressure | bar | 23.8 | 24.8 | 25.8 | 26.8 | 27.8 | 28.8 | 29.8 | 30.7 |
| Evaporator inlet temperature | °C. | -36.9 | -37.5 | -38.1 | -38.7 | -39.2 | -39.7 | -40.2 | -40.6 |
| Evaporator dewpoint | °C. | -23.3 | -23.0 | -22.6 | -22.4 | -22.1 | -21.9 | -21.7 | -21.5 |
| Evaporator exit gas temperature | °C. | -18.3 | -18.0 | -17.6 | -17.4 | -17.1 | -16.9 | -16.7 | -16.5 |
| Evaporator mean temperature | °C. | -30.1 | -30.2 | -30.4 | -30.5 | -30.7 | -30.8 | -30.9 | -31.1 |
| Evaporator glide (out-in) | K | 13.6 | 14.5 | 15.4 | 16.3 | 17.1 | 17.8 | 18.5 | 19.1 |
| Compressor suction pressure | bar | 1.84 | 1.96 | 2.07 | 2.20 | 2.32 | 2.46 | 2.59 | 2.74 |
| Compressor discharge pressure | bar | 23.8 | 24.8 | 25.8 | 26.8 | 27.8 | 28.8 | 29.8 | 30.7 |
| Suction line pressure drop | Pa/m | 113 | 105 | 99 | 93 | 88 | 83 | 79 | 75 |
| Pressure drop relative to reference | | 38.6% | 36.1% | 33.9% | 31.9% | 30.1% | 28.4% | 26.9% | 25.5% |
| Condenser dew point | °C. | 56.1 | 56.0 | 55.8 | 55.5 | 55.1 | 54.7 | 54.3 | 53.8 |
| Condenser bubble point | °C. | 32.4 | 31.5 | 30.8 | 30.2 | 29.7 | 29.2 | 28.8 | 28.5 |
| Condenser exit liquid temperature | °C. | 31.4 | 30.5 | 29.8 | 29.2 | 28.7 | 28.2 | 27.8 | 27.5 |
| Condenser mean temperature | °C. | 44.2 | 43.8 | 43.3 | 42.8 | 42.4 | 42.0 | 41.5 | 41.1 |
| Condenser glide (in-out) | K | 23.7 | 24.4 | 24.9 | 25.3 | 25.5 | 25.5 | 25.4 | 25.3 |

TABLE 25

Theoretical Performance Data of Selected R-744/R600a/R-1234ze(E) blends containing 0-14% R-744 and 3% R600a

| | | Composition $CO_2$/R600a/R-1234ze(E) % by weight ▶ | | | | | | | |
|---|---|---|---|---|---|---|---|---|---|
| | | 0/3/97 | 2/3/95 | 4/3/93 | 6/3/91 | 8/3/89 | 10/3/87 | 12/3/85 | 14/3/83 |
| COP (heating) | | 1.98 | 2.05 | 2.09 | 2.13 | 2.15 | 2.17 | 2.19 | 2.20 |
| COP relative to Reference | | 94.1% | 97.1% | 99.3% | 100.9% | 102.2% | 103.1% | 103.9% | 104.5% |
| Volumetric heating capacity at suction | kJ/m3 | 638 | 718 | 800 | 886 | 975 | 1067 | 1161 | 1258 |
| Capacity relative to Reference | | 72.6% | 81.7% | 91.1% | 100.8% | 111.0% | 121.4% | 132.1% | 143.2% |
| Critical temperature | °C. | 111.31 | 107.87 | 104.36 | 100.97 | 97.73 | 94.65 | 91.72 | 88.93 |
| Critical pressure | bar | 38.05 | 39.16 | 40.07 | 40.93 | 41.75 | 42.57 | 43.36 | 44.15 |
| Condenser enthalpy change | kJ/kg | 213.2 | 226.5 | 238.0 | 247.8 | 256.2 | 263.6 | 270.2 | 276.2 |
| Pressure ratio | | 18.23 | 18.48 | 18.56 | 18.49 | 18.28 | 18.00 | 17.64 | 17.25 |
| Refrigerant mass flow | kg/hr | 33.8 | 31.8 | 30.3 | 29.1 | 28.1 | 27.3 | 26.6 | 26.1 |
| Compressor discharge temperature | °C. | 111.9 | 116.1 | 119.9 | 123.5 | 126.6 | 129.6 | 132.3 | 134.9 |
| Evaporator inlet pressure | bar | 0.68 | 0.72 | 0.77 | 0.83 | 0.90 | 0.97 | 1.05 | 1.14 |
| Condenser inlet pressure | bar | 11.0 | 12.1 | 13.3 | 14.5 | 15.7 | 16.8 | 18.0 | 19.1 |
| Evaporator inlet temperature | °C. | -29.0 | -29.7 | -30.4 | -31.1 | -31.8 | -32.7 | -33.5 | -34.4 |
| Evaporator dewpoint | °C. | -30.0 | -29.5 | -28.9 | -28.2 | -27.4 | -26.6 | -25.8 | -25.1 |
| Evaporator exit gas temperature | °C. | -25.0 | -24.5 | -23.9 | -23.2 | -22.4 | -21.6 | -20.8 | -20.1 |
| Evaporator mean temperature | °C. | -29.5 | -29.6 | -29.6 | -29.6 | -29.6 | -29.6 | -29.7 | -29.8 |
| Evaporator glide (out-in) | K | -1.0 | 0.2 | 1.5 | 2.9 | 4.5 | 6.1 | 7.7 | 9.3 |
| Compressor suction pressure | bar | 0.60 | 0.66 | 0.72 | 0.78 | 0.86 | 0.94 | 1.02 | 1.11 |
| Compressor discharge pressure | bar | 11.0 | 12.1 | 13.3 | 14.5 | 15.7 | 16.8 | 18.0 | 19.1 |
| Suction line pressure drop | Pa/m | 441 | 375 | 324 | 284 | 251 | 225 | 203 | 184 |
| Pressure drop relative to reference | | 151.0% | 128.3% | 110.8% | 97.1% | 86.1% | 77.0% | 69.5% | 63.1% |
| Condenser dew point | °C. | 53.3 | 55.2 | 56.8 | 58.1 | 59.1 | 59.9 | 60.5 | 60.9 |
| Condenser bubble point | °C. | 53.0 | 47.4 | 42.8 | 39.3 | 36.4 | 34.1 | 32.3 | 30.7 |
| Condenser exit liquid temperature | °C. | 52.0 | 46.4 | 41.8 | 38.3 | 35.4 | 33.1 | 31.3 | 29.7 |
| Condenser mean temperature | °C. | 53.2 | 51.3 | 49.8 | 48.7 | 47.8 | 47.0 | 46.4 | 45.8 |
| Condenser glide (in-out) | K | 0.3 | 7.8 | 13.9 | 18.8 | 22.7 | 25.8 | 28.2 | 30.1 |

TABLE 26

Theoretical Performance Data of Selected R-744/R600a/R-1234ze(E) blends containing 16-30% R-744 and 3% R600a

| | | Composition CO$_2$/R600a/R-1234ze(E) % by weight | | | | | | | |
|---|---|---|---|---|---|---|---|---|---|
| | | 16/3/81 | 18/3/79 | 20/3/77 | 22/3/75 | 24/3/73 | 26/3/71 | 28/3/69 | 30/3/67 |
| COP (heating) | | 2.21 | 2.22 | 2.23 | 2.23 | 2.23 | 2.24 | 2.24 | 2.23 |
| COP relative to Reference | | 105.0% | 105.3% | 105.6% | 105.8% | 105.9% | 106.0% | 106.0% | 105.9% |
| Volumetric heating capacity at suction | kJ/m3 | 1357 | 1459 | 1562 | 1666 | 1771 | 1878 | 1985 | 2092 |
| Capacity relative to Reference | | 154.5% | 166.0% | 177.7% | 189.6% | 201.6% | 213.7% | 225.9% | 238.1% |
| Critical temperature | °C. | 86.27 | 83.74 | 81.32 | 79.01 | 76.80 | 74.68 | 72.66 | 70.72 |
| Critical pressure | bar | 44.93 | 45.70 | 46.47 | 47.23 | 47.99 | 48.74 | 49.49 | 50.23 |
| Condenser enthalpy change | kJ/kg | 281.7 | 286.9 | 291.8 | 296.4 | 300.9 | 305.2 | 309.4 | 313.5 |
| Pressure ratio | | 16.85 | 16.43 | 16.03 | 15.63 | 15.25 | 14.88 | 14.54 | 14.21 |
| Refrigerant mass flow | kg/hr | 25.6 | 25.1 | 24.7 | 24.3 | 23.9 | 23.6 | 23.3 | 23.0 |
| Compressor discharge temperature | °C. | 137.4 | 139.7 | 142.0 | 144.2 | 146.3 | 148.5 | 150.6 | 152.7 |
| Evaporator inlet pressure | bar | 1.23 | 1.32 | 1.42 | 1.52 | 1.63 | 1.73 | 1.84 | 1.96 |
| Condenser inlet pressure | bar | 20.2 | 21.3 | 22.4 | 23.4 | 24.5 | 25.5 | 26.6 | 27.6 |
| Evaporator inlet temperature | °C. | −35.4 | −36.4 | −37.4 | −38.4 | −39.4 | −40.5 | −41.5 | −42.5 |
| Evaporator dewpoint | °C. | −24.4 | −23.7 | −23.1 | −22.6 | −22.1 | −21.7 | −21.3 | −21.0 |
| Evaporator exit gas temperature | °C. | −19.4 | −18.7 | −18.1 | −17.6 | −17.1 | −16.7 | −16.3 | −16.0 |
| Evaporator mean temperature | °C. | −29.9 | −30.1 | −30.3 | −30.5 | −30.8 | −31.1 | −31.4 | −31.7 |
| Evaporator glide (out-in) | K | 11.0 | 12.6 | 14.2 | 15.8 | 17.3 | 18.8 | 20.2 | 21.4 |
| Compressor suction pressure | bar | 1.20 | 1.30 | 1.40 | 1.50 | 1.61 | 1.72 | 1.83 | 1.94 |
| Compressor discharge pressure | bar | 20.2 | 21.3 | 22.4 | 23.4 | 24.5 | 25.5 | 26.6 | 27.6 |
| Suction line pressure drop | Pa/m | 168 | 154 | 142 | 132 | 123 | 114 | 107 | 101 |
| Pressure drop relative to reference | | 57.6% | 52.9% | 48.7% | 45.2% | 42.0% | 39.2% | 36.7% | 34.5% |
| Condenser dew point | °C. | 61.1 | 61.1 | 61.1 | 60.9 | 60.7 | 60.3 | 59.9 | 59.4 |
| Condenser bubble point | °C. | 29.5 | 28.4 | 27.5 | 26.7 | 26.1 | 25.5 | 25.0 | 24.6 |
| Condenser exit liquid temperature | °C. | 28.5 | 27.4 | 26.5 | 25.7 | 25.1 | 24.5 | 24.0 | 23.6 |
| Condenser mean temperature | °C. | 45.3 | 44.8 | 44.3 | 43.8 | 43.4 | 42.9 | 42.4 | 42.0 |
| Condenser glide (in-out) | K | 31.6 | 32.7 | 33.6 | 34.2 | 34.6 | 34.8 | 34.9 | 34.8 |

TABLE 27

Theoretical Performance Data of Selected R-744/R600a/R-1234ze(E) blends containing 0-14% R-744 and 4% R600a

| | | Composition CO$_2$/R600a/R-1234ze(E) % by weight | | | | | | | |
|---|---|---|---|---|---|---|---|---|---|
| | | 0/4/96 | 2/4/94 | 4/4/92 | 6/4/90 | 8/4/88 | 10/4/86 | 12/4/84 | 14/4/82 |
| COP (heating) | | 1.98 | 2.04 | 2.09 | 2.13 | 2.15 | 2.17 | 2.19 | 2.20 |
| COP relative to Reference | | 94.0% | 97.0% | 99.2% | 100.8% | 102.1% | 103.0% | 103.8% | 104.4% |
| Volumetric heating capacity at suction | kJ/m3 | 645 | 724 | 807 | 892 | 981 | 1072 | 1166 | 1263 |
| Capacity relative to Reference | | 73.4% | 82.4% | 91.8% | 101.5% | 111.6% | 122.0% | 132.7% | 143.7% |
| Critical temperature | °C. | 111.76 | 108.42 | 104.98 | 101.65 | 98.45 | 95.40 | 92.48 | 89.71 |
| Critical pressure | bar | 38.48 | 39.63 | 40.59 | 41.48 | 42.34 | 43.17 | 43.99 | 44.79 |
| Condenser enthalpy change | kJ/kg | 214.2 | 227.5 | 239.0 | 248.8 | 257.3 | 264.7 | 271.3 | 277.4 |
| Pressure ratio | | 18.07 | 18.32 | 18.41 | 18.36 | 18.16 | 17.88 | 17.54 | 17.16 |
| Refrigerant mass flow | kg/hr | 33.6 | 31.6 | 30.1 | 28.9 | 28.0 | 27.2 | 26.5 | 26.0 |
| Compressor discharge temperature | °C. | 111.6 | 115.7 | 119.6 | 123.1 | 126.2 | 129.2 | 131.9 | 134.5 |
| Evaporator inlet pressure | bar | 0.68 | 0.73 | 0.78 | 0.84 | 0.91 | 0.98 | 1.06 | 1.15 |
| Condenser inlet pressure | bar | 11.0 | 12.2 | 13.4 | 14.5 | 15.7 | 16.9 | 18.0 | 19.1 |
| Evaporator inlet temperature | °C. | −29.0 | −29.7 | −30.4 | −31.1 | −31.8 | −32.6 | −33.5 | −34.4 |
| Evaporator dewpoint | °C. | −30.0 | −29.5 | −28.8 | −28.1 | −27.4 | −26.6 | −25.9 | −25.1 |
| Evaporator exit gas temperature | °C. | −25.0 | −24.5 | −23.8 | −23.1 | −22.4 | −21.6 | −20.9 | −20.1 |
| Evaporator mean temperature | °C. | −29.5 | −29.6 | −29.6 | −29.6 | −29.6 | −29.6 | −29.7 | −29.8 |
| Evaporator glide (out-in) | K | −0.9 | 0.2 | 1.5 | 3.0 | 4.5 | 6.0 | 7.6 | 9.3 |
| Compressor suction pressure | bar | 0.61 | 0.66 | 0.73 | 0.79 | 0.87 | 0.94 | 1.03 | 1.12 |
| Compressor discharge pressure | bar | 11.0 | 12.2 | 13.4 | 14.5 | 15.7 | 16.9 | 18.0 | 19.1 |
| Suction line pressure drop | Pa/m | 435 | 370 | 320 | 281 | 249 | 223 | 201 | 183 |
| Pressure drop relative to reference | | 148.9% | 126.7% | 109.6% | 96.2% | 85.3% | 76.4% | 68.9% | 62.6% |
| Condenser dew point | °C. | 53.3 | 55.2 | 56.8 | 58.1 | 59.1 | 59.9 | 60.5 | 60.8 |
| Condenser bubble point | °C. | 53.0 | 47.5 | 43.0 | 39.4 | 36.5 | 34.2 | 32.4 | 30.8 |
| Condenser exit liquid temperature | °C. | 52.0 | 46.5 | 42.0 | 38.4 | 35.5 | 33.2 | 31.4 | 29.8 |
| Condenser mean temperature | °C. | 53.2 | 51.3 | 49.9 | 48.7 | 47.8 | 47.1 | 46.4 | 45.8 |
| Condenser glide (in-out) | K | 0.3 | 7.7 | 13.8 | 18.7 | 22.6 | 25.7 | 28.1 | 30.0 |

TABLE 28

Theoretical Performance Data of Selected R-744/R600a/R-1234ze(E) blends containing 16-30% R-744 and 4% R600a

| | | Composition $CO_2$/R600a/R-1234ze(E) % by weight | | | | | | | |
|---|---|---|---|---|---|---|---|---|---|
| | | 16/4/80 | 18/4/78 | 20/4/76 | 22/4/74 | 24/4/72 | 26/4/70 | 28/4/68 | 30/4/66 |
| COP (heating) | | 2.21 | 2.22 | 2.23 | 2.23 | 2.23 | 2.23 | 2.23 | 2.23 |
| COP relative to Reference | | 104.9% | 105.2% | 105.5% | 105.7% | 105.9% | 105.9% | 105.9% | 105.9% |
| Volumetric heating capacity at suction | kJ/m3 | 1362 | 1463 | 1566 | 1670 | 1775 | 1881 | 1988 | 2096 |
| Capacity relative to Reference | | 155.0% | 166.5% | 178.2% | 190.0% | 202.0% | 214.1% | 226.3% | 238.5% |
| Critical temperature | ° C. | 87.06 | 84.53 | 82.11 | 79.80 | 77.59 | 75.47 | 73.44 | 71.50 |
| Critical pressure | bar | 45.58 | 46.37 | 47.14 | 47.91 | 48.67 | 49.42 | 50.17 | 50.92 |
| Condenser enthalpy change | kJ/kg | 282.9 | 288.1 | 292.9 | 297.5 | 302.0 | 306.3 | 310.4 | 314.5 |
| Pressure ratio | | 16.76 | 16.35 | 15.95 | 15.56 | 15.18 | 14.82 | 14.48 | 14.15 |
| Refrigerant mass flow | kg/hr | 25.5 | 25.0 | 24.6 | 24.2 | 23.8 | 23.5 | 23.2 | 22.9 |
| Compressor discharge temperature | ° C. | 136.9 | 139.2 | 141.4 | 143.6 | 145.7 | 147.8 | 149.9 | 152.0 |
| Evaporator inlet pressure | bar | 1.24 | 1.33 | 1.43 | 1.53 | 1.64 | 1.74 | 1.85 | 1.97 |
| Condenser inlet pressure | bar | 20.2 | 21.3 | 22.4 | 23.5 | 24.5 | 25.5 | 26.6 | 27.6 |
| Evaporator inlet temperature | ° C. | −35.3 | −36.3 | −37.3 | −38.3 | −39.3 | −40.3 | −41.3 | −42.3 |
| Evaporator dewpoint | ° C. | −24.4 | −23.8 | −23.2 | −22.6 | −22.2 | −21.7 | −21.4 | −21.1 |
| Evaporator exit gas temperature | ° C. | −19.4 | −18.8 | −18.2 | −17.6 | −17.2 | −16.7 | −16.4 | −16.1 |
| Evaporator mean temperature | ° C. | −29.9 | −30.0 | −30.2 | −30.5 | −30.7 | −31.0 | −31.3 | −31.7 |
| Evaporator glide (out-in) | K | 10.9 | 12.5 | 14.1 | 15.6 | 17.1 | 18.6 | 20.0 | 21.3 |
| Compressor suction pressure | bar | 1.21 | 1.30 | 1.40 | 1.51 | 1.61 | 1.72 | 1.83 | 1.95 |
| Compressor discharge pressure | bar | 20.2 | 21.3 | 22.4 | 23.5 | 24.5 | 25.5 | 26.6 | 27.6 |
| Suction line pressure drop | Pa/m | 167 | 153 | 142 | 131 | 122 | 114 | 107 | 100 |
| Pressure drop relative to reference | | 57.2% | 52.5% | 48.5% | 44.9% | 41.8% | 39.0% | 36.5% | 34.3% |
| Condenser dew point | ° C. | 61.1 | 61.1 | 61.1 | 60.9 | 60.7 | 60.3 | 59.9 | 59.4 |
| Condenser bubble point | ° C. | 29.6 | 28.5 | 27.6 | 26.8 | 26.2 | 25.6 | 25.1 | 24.7 |
| Condenser exit liquid temperature | ° C. | 28.6 | 27.5 | 26.6 | 25.8 | 25.2 | 24.6 | 24.1 | 23.7 |
| Condenser mean temperature | ° C. | 45.3 | 44.8 | 44.3 | 43.9 | 43.4 | 43.0 | 42.5 | 42.1 |
| Condenser glide (in-out) | K | 31.5 | 32.6 | 33.5 | 34.1 | 34.5 | 34.7 | 34.8 | 34.8 |

TABLE 29

Theoretical Performance Data of Selected R-744/R600a/R-1234ze(E) blends containing 0-14% R-744 and 5% R600a

| | | Composition $CO_2$/R600a/R-1234ze(E) % by weight | | | | | | | |
|---|---|---|---|---|---|---|---|---|---|
| | | 0/5/95 | 2/5/93 | 4/5/91 | 6/5/89 | 8/5/87 | 10/5/85 | 12/5/83 | 14/5/81 |
| COP (heating) | | 1.98 | 2.04 | 2.09 | 2.12 | 2.15 | 2.17 | 2.19 | 2.20 |
| COP relative to Reference | | 94.0% | 96.9% | 99.1% | 100.7% | 102.0% | 102.9% | 103.7% | 104.3% |
| Volumetric heating capacity at suction | kJ/m3 | 651 | 730 | 812 | 898 | 986 | 1077 | 1171 | 1267 |
| Capacity relative to Reference | | 74.1% | 83.1% | 92.5% | 102.1% | 112.2% | 122.6% | 133.3% | 144.2% |
| Critical temperature | ° C. | 112.21 | 108.94 | 105.57 | 102.29 | 99.14 | 96.11 | 93.22 | 90.46 |
| Critical pressure | bar | 38.89 | 40.06 | 41.06 | 41.99 | 42.88 | 43.73 | 44.57 | 45.39 |
| Condenser enthalpy change | kJ/kg | 215.2 | 228.5 | 240.0 | 249.9 | 258.4 | 265.9 | 272.5 | 278.6 |
| Pressure ratio | | 17.92 | 18.16 | 18.27 | 18.22 | 18.04 | 17.77 | 17.44 | 17.07 |
| Refrigerant mass flow | kg/hr | 33.5 | 31.5 | 30.0 | 28.8 | 27.9 | 27.1 | 26.4 | 25.8 |
| Compressor discharge temperature | ° C. | 111.3 | 115.4 | 119.2 | 122.7 | 125.9 | 128.8 | 131.5 | 134.0 |
| Evaporator inlet pressure | bar | 0.69 | 0.74 | 0.79 | 0.85 | 0.92 | 0.99 | 1.07 | 1.15 |
| Condenser inlet pressure | bar | 11.1 | 12.2 | 13.4 | 14.6 | 15.8 | 16.9 | 18.0 | 19.2 |
| Evaporator inlet temperature | ° C. | −29.0 | −29.7 | −30.4 | −31.1 | −31.8 | −32.6 | −33.4 | −34.3 |
| Evaporator dewpoint | ° C. | −29.9 | −29.4 | −28.8 | −28.1 | −27.4 | −26.6 | −25.9 | −25.2 |
| Evaporator exit gas temperature | ° C. | −24.9 | −24.4 | −23.8 | −23.1 | −22.4 | −21.6 | −20.9 | −20.2 |
| Evaporator mean temperature | ° C. | −29.5 | −29.6 | −29.6 | −29.6 | −29.6 | −29.6 | −29.7 | −29.7 |
| Evaporator glide (out-in) | K | −0.9 | 0.3 | 1.5 | 2.9 | 4.4 | 6.0 | 7.6 | 9.2 |
| Compressor suction pressure | bar | 0.62 | 0.67 | 0.73 | 0.80 | 0.87 | 0.95 | 1.03 | 1.12 |
| Compressor discharge pressure | bar | 11.1 | 12.2 | 13.4 | 14.6 | 15.8 | 16.9 | 18.0 | 19.2 |
| Suction line pressure drop | Pa/m | 429 | 366 | 317 | 278 | 247 | 221 | 200 | 182 |
| Pressure drop relative to reference | | 146.9% | 125.3% | 108.5% | 95.3% | 84.5% | 75.8% | 68.4% | 62.2% |
| Condenser dew point | ° C. | 53.4 | 55.2 | 56.7 | 58.1 | 59.1 | 59.9 | 60.5 | 60.9 |
| Condenser bubble point | ° C. | 53.1 | 47.6 | 43.1 | 39.5 | 36.6 | 34.3 | 32.5 | 30.9 |
| Condenser exit liquid temperature | ° C. | 52.1 | 46.6 | 42.1 | 38.5 | 35.6 | 33.3 | 31.5 | 29.9 |
| Condenser mean temperature | ° C. | 53.2 | 51.4 | 49.9 | 48.8 | 47.9 | 47.1 | 46.5 | 45.9 |
| Condenser glide (in-out) | K | 0.3 | 7.6 | 13.7 | 18.6 | 22.5 | 25.6 | 28.0 | 29.9 |

TABLE 30

Theoretical Performance Data of Selected R-744/R600a/R-1234ze(E) blends containing 16-30% R-744 and 5% R600a

| | | Composition CO$_2$/R600a/R-1234ze(E) % by weight | | | | | | | |
|---|---|---|---|---|---|---|---|---|---|
| | | 16/5/79 | 18/5/77 | 20/5/75 | 22/5/73 | 24/5/71 | 26/5/69 | 28/5/67 | 30/5/65 |
| COP (heating) | | 2.21 | 2.22 | 2.22 | 2.23 | 2.23 | 2.23 | 2.23 | 2.23 |
| COP relative to Reference | | 104.8% | 105.2% | 105.4% | 105.6% | 105.8% | 105.8% | 105.9% | 105.8% |
| Volumetric heating capacity at suction | kJ/m3 | 1366 | 1467 | 1569 | 1673 | 1778 | 1884 | 1991 | 2098 |
| Capacity relative to Reference | | 155.5% | 166.9% | 178.6% | 190.4% | 202.4% | 214.4% | 226.6% | 238.8% |
| Critical temperature | °C. | 87.83 | 85.31 | 82.89 | 80.59 | 78.38 | 76.26 | 74.23 | 72.27 |
| Critical pressure | bar | 46.19 | 46.99 | 47.77 | 48.55 | 49.31 | 50.07 | 50.83 | 51.57 |
| Condenser enthalpy change | kJ/kg | 284.1 | 289.3 | 294.1 | 298.7 | 303.2 | 307.4 | 311.6 | 315.6 |
| Pressure ratio | | 16.68 | 16.28 | 15.89 | 15.50 | 15.12 | 14.76 | 14.42 | 14.10 |
| Refrigerant mass flow | kg/hr | 25.3 | 24.9 | 24.5 | 24.1 | 23.7 | 23.4 | 23.1 | 22.8 |
| Compressor discharge temperature | °C. | 136.4 | 138.7 | 140.9 | 143.1 | 145.2 | 147.2 | 149.3 | 151.3 |
| Evaporator inlet pressure | bar | 1.24 | 1.34 | 1.44 | 1.54 | 1.64 | 1.75 | 1.86 | 1.97 |
| Condenser inlet pressure | bar | 20.3 | 21.4 | 22.4 | 23.5 | 24.5 | 25.5 | 26.6 | 27.6 |
| Evaporator inlet temperature | °C. | −35.2 | −36.2 | −37.2 | −38.2 | −39.2 | −40.2 | −41.2 | −42.2 |
| Evaporator dewpoint | °C. | −24.5 | −23.8 | −23.2 | −22.7 | −22.2 | −21.8 | −21.4 | −21.1 |
| Evaporator exit gas temperature | °C. | −19.5 | −18.8 | −18.2 | −17.7 | −17.2 | −16.8 | −16.4 | −16.1 |
| Evaporator mean temperature | °C. | −29.9 | −30.0 | −30.2 | −30.4 | −30.7 | −31.0 | −31.3 | −31.6 |
| Evaporator glide (out-in) | K | 10.8 | 12.4 | 13.9 | 15.5 | 17.0 | 18.4 | 19.8 | 21.1 |
| Compressor suction pressure | bar | 1.21 | 1.31 | 1.41 | 1.51 | 1.62 | 1.73 | 1.84 | 1.96 |
| Compressor discharge pressure | bar | 20.3 | 21.4 | 22.4 | 23.5 | 24.5 | 25.5 | 26.6 | 27.6 |
| Suction line pressure drop | Pa/m | 166 | 153 | 141 | 131 | 122 | 113 | 106 | 100 |
| Pressure drop relative to reference | | 56.9% | 52.2% | 48.2% | 44.7% | 41.6% | 38.9% | 36.4% | 34.2% |
| Condenser dew point | °C. | 61.1 | 61.2 | 61.1 | 61.0 | 60.7 | 60.4 | 60.0 | 59.5 |
| Condenser bubble point | °C. | 29.7 | 28.6 | 27.7 | 26.9 | 26.2 | 25.7 | 25.2 | 24.8 |
| Condenser exit liquid temperature | °C. | 28.7 | 27.6 | 26.7 | 25.9 | 25.2 | 24.7 | 24.2 | 23.8 |
| Condenser mean temperature | °C. | 45.4 | 44.9 | 44.4 | 43.9 | 43.5 | 43.0 | 42.6 | 42.1 |
| Condenser glide (in-out) | K | 31.4 | 32.6 | 33.4 | 34.1 | 34.5 | 34.7 | 34.8 | 34.7 |

TABLE 31

Theoretical Performance Data of Selected R-744/R600a/R-1234ze(E) blends containing 0-14% R-744 and 6% R600a

| | | Composition CO$_2$/R600a/R-1234ze(E) % by weight | | | | | | | |
|---|---|---|---|---|---|---|---|---|---|
| | | 0/6/94 | 2/6/92 | 4/6/90 | 6/6/88 | 8/6/86 | 10/6/84 | 12/6/82 | 14/6/80 |
| COP (heating) | | 1.98 | 2.04 | 2.09 | 2.12 | 2.15 | 2.17 | 2.18 | 2.20 |
| COP relative to Reference | | 93.9% | 96.8% | 99.0% | 100.6% | 101.9% | 102.8% | 103.6% | 104.2% |
| Volumetric heating capacity at suction | kJ/m3 | 657 | 735 | 818 | 903 | 991 | 1082 | 1175 | 1271 |
| Capacity relative to Reference | | 74.8% | 83.7% | 93.1% | 102.7% | 112.8% | 123.1% | 133.7% | 144.6% |
| Critical temperature | °C. | 112.65 | 109.44 | 106.15 | 102.92 | 99.80 | 96.81 | 93.95 | 91.21 |
| Critical pressure | bar | 39.26 | 40.46 | 41.50 | 42.46 | 43.37 | 44.25 | 45.11 | 45.95 |
| Condenser enthalpy change | kJ/kg | 216.3 | 229.5 | 241.1 | 251.0 | 259.6 | 267.1 | 273.8 | 279.9 |
| Pressure ratio | | 17.77 | 18.01 | 18.13 | 18.10 | 17.93 | 17.67 | 17.35 | 16.99 |
| Refrigerant mass flow | kg/hr | 33.3 | 31.4 | 29.9 | 28.7 | 27.7 | 27.0 | 26.3 | 25.7 |
| Compressor discharge temperature | °C. | 111.1 | 115.1 | 118.9 | 122.4 | 125.5 | 128.4 | 131.1 | 133.6 |
| Evaporator inlet pressure | bar | 0.70 | 0.74 | 0.79 | 0.85 | 0.92 | 1.00 | 1.08 | 1.16 |
| Condenser inlet pressure | bar | 11.1 | 12.3 | 13.4 | 14.6 | 15.8 | 16.9 | 18.1 | 19.2 |
| Evaporator inlet temperature | °C. | −29.0 | −29.7 | −30.4 | −31.1 | −31.8 | −32.6 | −33.4 | −34.3 |
| Evaporator dewpoint | °C. | −29.9 | −29.4 | −28.8 | −28.1 | −27.4 | −26.7 | −25.9 | −25.2 |
| Evaporator exit gas temperature | °C. | −24.9 | −24.4 | −23.8 | −23.1 | −22.4 | −21.7 | −20.9 | −20.2 |
| Evaporator mean temperature | °C. | −29.5 | −29.5 | −29.6 | −29.6 | −29.6 | −29.6 | −29.7 | −29.7 |
| Evaporator glide (out-in) | K | −0.8 | 0.3 | 1.6 | 2.9 | 4.4 | 5.9 | 7.5 | 9.1 |
| Compressor suction pressure | bar | 0.63 | 0.68 | 0.74 | 0.81 | 0.88 | 0.96 | 1.04 | 1.13 |
| Compressor discharge pressure | bar | 11.1 | 12.3 | 13.4 | 14.6 | 15.8 | 16.9 | 18.1 | 19.2 |
| Suction line pressure drop | Pa/m | 424 | 362 | 314 | 276 | 245 | 220 | 198 | 180 |
| Pressure drop relative to reference | | 145.0% | 123.9% | 107.4% | 94.4% | 83.9% | 75.2% | 67.9% | 61.8% |
| Condenser dew point | °C. | 53.4 | 55.2 | 56.7 | 58.0 | 59.1 | 59.9 | 60.5 | 60.9 |
| Condenser bubble point | °C. | 53.1 | 47.7 | 43.2 | 39.6 | 36.7 | 34.4 | 32.6 | 31.0 |
| Condenser exit liquid temperature | °C. | 52.1 | 46.7 | 42.2 | 38.6 | 35.7 | 33.4 | 31.6 | 30.0 |
| Condenser mean temperature | °C. | 53.3 | 51.4 | 50.0 | 48.8 | 47.9 | 47.2 | 46.5 | 45.9 |
| Condenser glide (in-out) | K | 0.3 | 7.4 | 13.5 | 18.4 | 22.3 | 25.5 | 27.9 | 29.9 |

TABLE 32

Theoretical Performance Data of Selected R-744/R600a/R-1234ze(E) blends containing 16-30% R-744 and 6% R600a

| | | Composition $CO_2$/R600a/R-1234ze(E) % by weight ▶ | | | | | | | |
|---|---|---|---|---|---|---|---|---|---|
| | | 16/6/78 | 18/6/76 | 20/6/74 | 22/6/72 | 24/6/70 | 26/6/68 | 28/6/66 | 30/6/64 |
| COP (heating) | | 2.21 | 2.22 | 2.22 | 2.23 | 2.23 | 2.23 | 2.23 | 2.23 |
| COP relative to Reference | | 104.7% | 105.1% | 105.4% | 105.6% | 105.7% | 105.8% | 105.8% | 105.8% |
| Volumetric heating capacity at suction | kJ/m3 | 1369 | 1470 | 1572 | 1675 | 1780 | 1886 | 1993 | 2100 |
| Capacity relative to Reference | | 155.8% | 167.2% | 178.9% | 190.7% | 202.6% | 214.6% | 226.8% | 239.0% |
| Critical temperature | ° C. | 88.58 | 86.07 | 83.67 | 81.36 | 79.16 | 77.04 | 75.00 | 73.05 |
| Critical pressure | bar | 46.77 | 47.57 | 48.37 | 49.15 | 49.93 | 50.69 | 51.45 | 52.20 |
| Condenser enthalpy change | kJ/kg | 285.4 | 290.6 | 295.4 | 300.0 | 304.4 | 308.7 | 312.8 | 316.8 |
| Pressure ratio | | 16.61 | 16.22 | 15.83 | 15.44 | 15.07 | 14.71 | 14.37 | 14.05 |
| Refrigerant mass flow | kg/hr | 25.2 | 24.8 | 24.4 | 24.0 | 23.7 | 23.3 | 23.0 | 22.7 |
| Compressor discharge temperature | ° C. | 136.0 | 138.3 | 140.4 | 142.6 | 144.6 | 146.7 | 148.7 | 150.7 |
| Evaporator inlet pressure | bar | 1.25 | 1.34 | 1.44 | 1.54 | 1.65 | 1.76 | 1.87 | 1.98 |
| Condenser inlet pressure | bar | 20.3 | 21.4 | 22.4 | 23.5 | 24.5 | 25.5 | 26.6 | 27.6 |
| Evaporator inlet temperature | ° C. | −35.2 | −36.1 | −37.1 | −38.1 | −39.1 | −40.1 | −41.0 | −42.0 |
| Evaporator dewpoint | ° C. | −24.5 | −23.9 | −23.3 | −22.8 | −22.3 | −21.8 | −21.5 | −21.1 |
| Evaporator exit gas temperature | ° C. | −19.5 | −18.9 | −18.3 | −17.8 | −17.3 | −16.8 | −16.5 | −16.1 |
| Evaporator mean temperature | ° C. | −29.8 | −30.0 | −30.2 | −30.4 | −30.7 | −30.9 | −31.2 | −31.6 |
| Evaporator glide (out-in) | K | 10.6 | 12.2 | 13.8 | 15.3 | 16.8 | 18.2 | 19.6 | 20.9 |
| Compressor suction pressure | bar | 1.22 | 1.32 | 1.42 | 1.52 | 1.63 | 1.74 | 1.85 | 1.96 |
| Compressor discharge pressure | bar | 20.3 | 21.4 | 22.4 | 23.5 | 24.5 | 25.5 | 26.6 | 27.6 |
| Suction line pressure drop | Pa/m | 165 | 152 | 140 | 130 | 121 | 113 | 106 | 100 |
| Pressure drop relative to reference | | 56.5% | 52.0% | 48.0% | 44.5% | 41.4% | 38.7% | 36.3% | 34.1% |
| Condenser dew point | ° C. | 61.1 | 61.2 | 61.2 | 61.0 | 60.8 | 60.4 | 60.0 | 59.6 |
| Condenser bubble point | ° C. | 29.7 | 28.7 | 27.7 | 27.0 | 26.3 | 25.7 | 25.3 | 24.8 |
| Condenser exit liquid temperature | ° C. | 28.7 | 27.7 | 26.7 | 26.0 | 25.3 | 24.7 | 24.3 | 23.8 |
| Condenser mean temperature | ° C. | 45.4 | 44.9 | 44.4 | 44.0 | 43.5 | 43.1 | 42.6 | 42.2 |
| Condenser glide (in-out) | K | 31.4 | 32.5 | 33.4 | 34.0 | 34.5 | 34.7 | 34.8 | 34.7 |

TABLE 33

Theoretical Performance Data of Selected R-744/R600a/R-1234ze(E) blends containing 0-14% R-744 and 7% R600a

| | | Composition $CO_2$/R600a/R-1234ze(E) % by weight ▶ | | | | | | | |
|---|---|---|---|---|---|---|---|---|---|
| | | 0/7/93 | 2/7/91 | 4/7/89 | 6/7/87 | 8/7/85 | 10/7/83 | 12/7/81 | 14/7/79 |
| COP (heating) | | 1.98 | 2.04 | 2.08 | 2.12 | 2.15 | 2.17 | 2.18 | 2.20 |
| COP relative to Reference | | 93.8% | 96.7% | 98.9% | 100.5% | 101.8% | 102.8% | 103.5% | 104.1% |
| Volumetric heating capacity at suction | kJ/m3 | 663 | 741 | 822 | 907 | 995 | 1085 | 1178 | 1274 |
| Capacity relative to Reference | | 75.4% | 84.3% | 93.6% | 103.3% | 113.2% | 123.5% | 134.1% | 145.0% |
| Critical temperature | ° C. | 113.08 | 109.93 | 106.70 | 103.52 | 100.45 | 97.49 | 94.65 | 91.93 |
| Critical pressure | bar | 39.61 | 40.83 | 41.90 | 42.88 | 43.82 | 44.73 | 45.61 | 46.46 |
| Condenser enthalpy change | kJ/kg | 217.3 | 230.5 | 242.2 | 252.2 | 260.8 | 268.4 | 275.1 | 281.2 |
| Pressure ratio | | 17.64 | 17.87 | 17.99 | 17.97 | 17.82 | 17.58 | 17.27 | 16.92 |
| Refrigerant mass flow | kg/hr | 33.1 | 31.2 | 29.7 | 28.6 | 27.6 | 26.8 | 26.2 | 25.6 |
| Compressor discharge temperature | ° C. | 110.8 | 114.8 | 118.5 | 122.0 | 125.1 | 128.0 | 130.7 | 133.2 |
| Evaporator inlet pressure | bar | 0.71 | 0.75 | 0.80 | 0.86 | 0.93 | 1.00 | 1.08 | 1.17 |
| Condenser inlet pressure | bar | 11.2 | 12.3 | 13.5 | 14.6 | 15.8 | 17.0 | 18.1 | 19.2 |
| Evaporator inlet temperature | ° C. | −29.0 | −29.7 | −30.3 | −31.0 | −31.8 | −32.5 | −33.3 | −34.2 |
| Evaporator dewpoint | ° C. | −29.8 | −29.4 | −28.8 | −28.1 | −27.4 | −26.7 | −26.0 | −25.3 |
| Evaporator exit gas temperature | ° C. | −24.8 | −24.4 | −23.8 | −23.1 | −22.4 | −21.7 | −21.0 | −20.3 |
| Evaporator mean temperature | ° C. | −29.4 | −29.5 | −29.6 | −29.6 | −29.6 | −29.6 | −29.6 | −29.7 |
| Evaporator glide (out-in) | K | −0.8 | 0.3 | 1.5 | 2.9 | 4.3 | 5.8 | 7.4 | 8.9 |
| Compressor suction pressure | bar | 0.63 | 0.69 | 0.75 | 0.81 | 0.89 | 0.96 | 1.05 | 1.13 |
| Compressor discharge pressure | bar | 11.2 | 12.3 | 13.5 | 14.6 | 15.8 | 17.0 | 18.1 | 19.2 |
| Suction line pressure drop | Pa/m | 419 | 358 | 311 | 273 | 243 | 218 | 197 | 179 |
| Pressure drop relative to reference | | 143.3% | 122.6% | 106.4% | 93.6% | 83.2% | 74.7% | 67.5% | 61.4% |
| Condenser dew point | ° C. | 53.5 | 55.2 | 56.7 | 58.0 | 59.1 | 59.9 | 60.5 | 60.9 |
| Condenser bubble point | ° C. | 53.2 | 47.8 | 43.3 | 39.7 | 36.9 | 34.5 | 32.6 | 31.1 |
| Condenser exit liquid temperature | ° C. | 52.2 | 46.8 | 42.3 | 38.7 | 35.9 | 33.5 | 31.6 | 30.1 |
| Condenser mean temperature | ° C. | 53.3 | 51.5 | 50.0 | 48.9 | 48.0 | 47.2 | 46.6 | 46.0 |
| Condenser glide (in-out) | K | 0.3 | 7.3 | 13.4 | 18.3 | 22.2 | 25.4 | 27.9 | 29.8 |

TABLE 34

Theoretical Performance Data of Selected R-744/R600a/R-1234ze(E) blends containing 16-30% R-744 and 7% R600a

| | | Composition $CO_2$/R600a/R-1234ze(E) % by weight▶ | | | | | | | |
|---|---|---|---|---|---|---|---|---|---|
| | | 16/7/77 | 18/7/75 | 20/7/73 | 22/7/71 | 24/7/69 | 26/7/67 | 28/7/65 | 30/7/63 |
| COP (heating) | | 2.21 | 2.21 | 2.22 | 2.22 | 2.23 | 2.23 | 2.23 | 2.23 |
| COP relative to Reference | | 104.6% | 105.0% | 105.3% | 105.5% | 105.6% | 105.7% | 105.8% | 105.7% |
| Volumetric heating capacity at suction | kJ/m3 | 1372 | 1472 | 1574 | 1677 | 1781 | 1887 | 1993 | 2100 |
| Capacity relative to Reference | | 156.1% | 167.5% | 179.1% | 190.8% | 202.7% | 214.8% | 226.9% | 239.0% |
| Critical temperature | °C. | 89.32 | 86.83 | 84.43 | 82.13 | 79.93 | 77.81 | 75.78 | 73.82 |
| Critical pressure | bar | 47.30 | 48.12 | 48.93 | 49.73 | 50.51 | 51.28 | 52.04 | 52.80 |
| Condenser enthalpy change | kJ/kg | 286.8 | 291.9 | 296.8 | 301.4 | 305.8 | 310.0 | 314.1 | 318.1 |
| Pressure ratio | | 16.55 | 16.16 | 15.77 | 15.39 | 15.02 | 14.67 | 14.33 | 14.01 |
| Refrigerant mass flow | kg/hr | 25.1 | 24.7 | 24.3 | 23.9 | 23.5 | 23.2 | 22.9 | 22.6 |
| Compressor discharge temperature | °C. | 135.6 | 137.8 | 140.0 | 142.1 | 144.1 | 146.1 | 148.1 | 150.1 |
| Evaporator inlet pressure | bar | 1.25 | 1.35 | 1.45 | 1.55 | 1.65 | 1.76 | 1.87 | 1.98 |
| Condenser inlet pressure | bar | 20.3 | 21.4 | 22.4 | 23.5 | 24.5 | 25.5 | 26.5 | 27.5 |
| Evaporator inlet temperature | °C. | −35.1 | −36.0 | −37.0 | −37.9 | −38.9 | −39.9 | −40.9 | −41.9 |
| Evaporator dewpoint | °C. | −24.6 | −23.9 | −23.4 | −22.8 | −22.3 | −21.9 | −21.5 | −21.2 |
| Evaporator exit gas temperature | °C. | −19.6 | −18.9 | −18.4 | −17.8 | −17.3 | −16.9 | −16.5 | −16.2 |
| Evaporator mean temperature | °C. | −29.8 | −30.0 | −30.2 | −30.4 | −30.6 | −30.9 | −31.2 | −31.5 |
| Evaporator glide (out-in) | K | 10.5 | 12.1 | 13.6 | 15.1 | 16.6 | 18.0 | 19.4 | 20.7 |
| Compressor suction pressure | bar | 1.23 | 1.32 | 1.42 | 1.53 | 1.63 | 1.74 | 1.85 | 1.97 |
| Compressor discharge pressure | bar | 20.3 | 21.4 | 22.4 | 23.5 | 24.5 | 25.5 | 26.5 | 27.5 |
| Suction line pressure drop | Pa/m | 164 | 151 | 139 | 129 | 120 | 113 | 106 | 99 |
| Pressure drop relative to reference | | 56.2% | 51.7% | 47.8% | 44.3% | 41.3% | 38.5% | 36.1% | 34.0% |
| Condenser dew point | °C. | 61.1 | 61.2 | 61.2 | 61.1 | 60.8 | 60.5 | 60.1 | 59.7 |
| Condenser bubble point | °C. | 29.8 | 28.7 | 27.8 | 27.0 | 26.4 | 25.8 | 25.3 | 24.9 |
| Condenser exit liquid temperature | °C. | 28.8 | 27.7 | 26.8 | 26.0 | 25.4 | 24.8 | 24.3 | 23.9 |
| Condenser mean temperature | °C. | 45.5 | 45.0 | 44.5 | 44.0 | 43.6 | 43.2 | 42.7 | 42.3 |
| Condenser glide (in-out) | K | 31.3 | 32.5 | 33.4 | 34.0 | 34.5 | 34.7 | 34.8 | 34.8 |

TABLE 35

Theoretical Performance Data of Selected R-744/R600a/R-1234ze(E) blends containing 0-14% R-744 and 8% R600a

| | | Composition $CO_2$/R600a/R-1234ze(E) % by weight▶ | | | | | | | |
|---|---|---|---|---|---|---|---|---|---|
| | | 0/8/92 | 2/8/90 | 4/8/88 | 6/8/86 | 8/8/84 | 10/8/82 | 12/8/80 | 14/8/78 |
| COP (heating) | | 1.98 | 2.04 | 2.08 | 2.12 | 2.14 | 2.16 | 2.18 | 2.19 |
| COP relative to Reference | | 93.7% | 96.6% | 98.8% | 100.4% | 101.7% | 102.7% | 103.4% | 104.1% |
| Volumetric heating capacity at suction | kJ/m3 | 668 | 745 | 827 | 911 | 999 | 1089 | 1181 | 1277 |
| Capacity relative to Reference | | 76.0% | 84.8% | 94.1% | 103.7% | 113.7% | 123.9% | 134.5% | 145.3% |
| Critical temperature | °C. | 113.50 | 110.41 | 107.23 | 104.10 | 101.07 | 98.15 | 95.34 | 92.64 |
| Critical pressure | bar | 39.94 | 41.17 | 42.26 | 43.28 | 44.24 | 45.17 | 46.07 | 46.95 |
| Condenser enthalpy change | kJ/kg | 218.5 | 231.6 | 243.3 | 253.4 | 262.1 | 269.7 | 276.5 | 282.6 |
| Pressure ratio | | 17.51 | 17.74 | 17.87 | 17.86 | 17.72 | 17.49 | 17.19 | 16.85 |
| Refrigerant mass flow | kg/hr | 33.0 | 31.1 | 29.6 | 28.4 | 27.5 | 26.7 | 26.0 | 25.5 |
| Compressor discharge temperature | °C. | 110.6 | 114.5 | 118.2 | 121.7 | 124.8 | 127.7 | 130.4 | 132.8 |
| Evaporator inlet pressure | bar | 0.71 | 0.76 | 0.81 | 0.87 | 0.93 | 1.01 | 1.09 | 1.17 |
| Condenser inlet pressure | bar | 11.2 | 12.3 | 13.5 | 14.7 | 15.8 | 17.0 | 18.1 | 19.2 |
| Evaporator inlet temperature | °C. | −29.0 | −29.7 | −30.3 | −31.0 | −31.7 | −32.5 | −33.3 | −34.1 |
| Evaporator dewpoint | °C. | −29.8 | −29.4 | −28.8 | −28.1 | −27.4 | −26.7 | −26.0 | −25.3 |
| Evaporator exit gas temperature | °C. | −24.8 | −24.4 | −23.8 | −23.1 | −22.4 | −21.7 | −21.0 | −20.3 |
| Evaporator mean temperature | °C. | −29.4 | −29.5 | −29.6 | −29.6 | −29.6 | −29.6 | −29.6 | −29.7 |
| Evaporator glide (out-in) | K | −0.8 | 0.3 | 1.5 | 2.9 | 4.3 | 5.8 | 7.3 | 8.8 |
| Compressor suction pressure | bar | 0.64 | 0.70 | 0.76 | 0.82 | 0.89 | 0.97 | 1.05 | 1.14 |
| Compressor discharge pressure | bar | 11.2 | 12.3 | 13.5 | 14.7 | 15.8 | 17.0 | 18.1 | 19.2 |
| Suction line pressure drop | Pa/m | 414 | 355 | 308 | 271 | 241 | 217 | 196 | 178 |
| Pressure drop relative to reference | | 141.6% | 121.5% | 105.5% | 92.9% | 82.6% | 74.2% | 67.1% | 61.1% |
| Condenser dew point | °C. | 53.5 | 55.2 | 56.7 | 58.0 | 59.1 | 59.9 | 60.5 | 60.9 |
| Condenser bubble point | °C. | 53.3 | 47.9 | 43.5 | 39.9 | 37.0 | 34.6 | 32.7 | 31.1 |
| Condenser exit liquid temperature | °C. | 52.3 | 46.9 | 42.5 | 38.9 | 36.0 | 33.6 | 31.7 | 30.1 |
| Condenser mean temperature | °C. | 53.4 | 51.6 | 50.1 | 48.9 | 48.0 | 47.3 | 46.6 | 46.0 |
| Condenser glide (in-out) | K | 0.2 | 7.2 | 13.2 | 18.2 | 22.1 | 25.3 | 27.8 | 29.8 |

TABLE 36

Theoretical Performance Data of Selected R-744/R600a/R-1234ze(E) blends containing 16-30% R-744 and 8% R600a

| | | Composition CO$_2$/R600a/R-1234ze(E) % by weight▶ | | | | | | | |
|---|---|---|---|---|---|---|---|---|---|
| | | 16/8/76 | 18/8/74 | 20/8/72 | 22/8/70 | 24/8/68 | 26/8/66 | 28/8/64 | 30/8/62 |
| COP (heating) | | 2.20 | 2.21 | 2.22 | 2.22 | 2.23 | 2.23 | 2.23 | 2.23 |
| COP relative to Reference | | 104.5% | 104.9% | 105.2% | 105.4% | 105.6% | 105.7% | 105.7% | 105.7% |
| Volumetric heating capacity at suction | kJ/m3 | 1374 | 1474 | 1575 | 1678 | 1782 | 1887 | 1993 | 2100 |
| Capacity relative to Reference | | 156.4% | 167.7% | 179.2% | 191.0% | 202.8% | 214.8% | 226.9% | 239.0% |
| Critical temperature | °C. | 90.05 | 87.57 | 85.18 | 82.89 | 80.70 | 78.58 | 76.55 | 74.60 |
| Critical pressure | bar | 47.80 | 48.64 | 49.46 | 50.27 | 51.06 | 51.84 | 52.61 | 53.37 |
| Condenser enthalpy change | kJ/kg | 288.2 | 293.4 | 298.2 | 302.8 | 307.2 | 311.4 | 315.5 | 319.4 |
| Pressure ratio | | 16.49 | 16.11 | 15.73 | 15.35 | 14.98 | 14.63 | 14.29 | 13.97 |
| Refrigerant mass flow | kg/hr | 25.0 | 24.5 | 24.1 | 23.8 | 23.4 | 23.1 | 22.8 | 22.5 |
| Compressor discharge temperature | °C. | 135.2 | 137.4 | 139.5 | 141.6 | 143.6 | 145.6 | 147.6 | 149.5 |
| Evaporator inlet pressure | bar | 1.26 | 1.35 | 1.45 | 1.55 | 1.66 | 1.76 | 1.87 | 1.99 |
| Condenser inlet pressure | bar | 20.3 | 21.4 | 22.4 | 23.5 | 24.5 | 25.5 | 26.5 | 27.5 |
| Evaporator inlet temperature | °C. | −35.0 | −35.9 | −36.9 | −37.8 | −38.8 | −39.8 | −40.8 | −41.7 |
| Evaporator dewpoint | °C. | −24.6 | −24.0 | −23.4 | −22.9 | −22.4 | −21.9 | −21.6 | −21.2 |
| Evaporator exit gas temperature | °C. | −19.6 | −19.0 | −18.4 | −17.9 | −17.4 | −16.9 | −16.6 | −16.2 |
| Evaporator mean temperature | °C. | −29.8 | −30.0 | −30.1 | −30.3 | −30.6 | −30.9 | −31.2 | −31.5 |
| Evaporator glide (out-in) | K | 10.4 | 11.9 | 13.5 | 15.0 | 16.4 | 17.8 | 19.2 | 20.5 |
| Compressor suction pressure | bar | 1.23 | 1.33 | 1.43 | 1.53 | 1.64 | 1.74 | 1.86 | 1.97 |
| Compressor discharge pressure | bar | 20.3 | 21.4 | 22.4 | 23.5 | 24.5 | 25.5 | 26.5 | 27.5 |
| Suction line pressure drop | Pa/m | 163 | 150 | 139 | 129 | 120 | 112 | 105 | 99 |
| Pressure drop relative to reference | | 55.9% | 51.4% | 47.5% | 44.1% | 41.1% | 38.4% | 36.0% | 33.9% |
| Condenser dew point | °C. | 61.2 | 61.3 | 61.3 | 61.1 | 60.9 | 60.6 | 60.2 | 59.8 |
| Condenser bubble point | °C. | 29.8 | 28.8 | 27.8 | 27.1 | 26.4 | 25.8 | 25.3 | 24.9 |
| Condenser exit liquid temperature | °C. | 28.8 | 27.8 | 26.8 | 26.1 | 25.4 | 24.8 | 24.3 | 23.9 |
| Condenser mean temperature | °C. | 45.5 | 45.0 | 44.6 | 44.1 | 43.7 | 43.2 | 42.8 | 42.4 |
| Condenser glide (in-out) | K | 31.3 | 32.5 | 33.4 | 34.1 | 34.5 | 34.8 | 34.9 | 34.9 |

TABLE 37

Theoretical Performance Data of Selected R-744/R600a/R-1234ze(E) blends containing 0-14% R-744 and 9% R600a

| | | Composition CO$_2$/R600a/R-1234ze(E) % by weight▶ | | | | | | | |
|---|---|---|---|---|---|---|---|---|---|
| | | 0/9/91 | 2/9/89 | 4/9/87 | 6/9/85 | 8/9/83 | 10/9/81 | 12/9/79 | 14/9/77 |
| COP (heating) | | 1.98 | 2.03 | 2.08 | 2.12 | 2.14 | 2.16 | 2.18 | 2.19 |
| COP relative to Reference | | 93.7% | 96.5% | 98.7% | 100.3% | 101.6% | 102.6% | 103.4% | 104.0% |
| Volumetric heating capacity at suction | kJ/m3 | 672 | 749 | 830 | 915 | 1002 | 1091 | 1184 | 1279 |
| Capacity relative to Reference | | 76.5% | 85.3% | 94.5% | 104.1% | 114.0% | 124.2% | 134.7% | 145.5% |
| Critical temperature | °C. | 113.92 | 110.87 | 107.75 | 104.67 | 101.68 | 98.79 | 96.01 | 93.34 |
| Critical pressure | bar | 40.24 | 41.49 | 42.60 | 43.64 | 44.63 | 45.58 | 46.50 | 47.40 |
| Condenser enthalpy change | kJ/kg | 219.6 | 232.8 | 244.5 | 254.6 | 263.4 | 271.1 | 277.9 | 284.0 |
| Pressure ratio | | 17.38 | 17.62 | 17.75 | 17.75 | 17.63 | 17.41 | 17.12 | 16.79 |
| Refrigerant mass flow | kg/hr | 32.8 | 30.9 | 29.5 | 28.3 | 27.3 | 26.6 | 25.9 | 25.3 |
| Compressor discharge temperature | °C. | 110.3 | 114.2 | 117.9 | 121.4 | 124.5 | 127.4 | 130.0 | 132.5 |
| Evaporator inlet pressure | bar | 0.72 | 0.76 | 0.81 | 0.87 | 0.94 | 1.01 | 1.09 | 1.17 |
| Condenser inlet pressure | bar | 11.3 | 12.4 | 13.5 | 14.7 | 15.8 | 17.0 | 18.1 | 19.2 |
| Evaporator inlet temperature | °C. | −29.0 | −29.7 | −30.3 | −31.0 | −31.7 | −32.4 | −33.2 | −34.1 |
| Evaporator dewpoint | °C. | −29.8 | −29.4 | −28.8 | −28.2 | −27.5 | −26.8 | −26.0 | −25.4 |
| Evaporator exit gas temperature | °C. | −24.8 | −24.4 | −23.8 | −23.2 | −22.5 | −21.8 | −21.0 | −20.4 |
| Evaporator mean temperature | °C. | −29.4 | −29.5 | −29.6 | −29.6 | −29.6 | −29.6 | −29.6 | −29.7 |
| Evaporator glide (out-in) | K | −0.7 | 0.3 | 1.5 | 2.8 | 4.2 | 5.7 | 7.2 | 8.7 |
| Compressor suction pressure | bar | 0.65 | 0.70 | 0.76 | 0.83 | 0.90 | 0.97 | 1.06 | 1.14 |
| Compressor discharge pressure | bar | 11.3 | 12.4 | 13.5 | 14.7 | 15.8 | 17.0 | 18.1 | 19.2 |
| Suction line pressure drop | Pa/m | 409 | 351 | 306 | 269 | 240 | 215 | 195 | 177 |
| Pressure drop relative to reference | | 140.1% | 120.3% | 104.7% | 92.2% | 82.1% | 73.7% | 66.7% | 60.7% |
| Condenser dew point | °C. | 53.5 | 55.2 | 56.7 | 58.0 | 59.1 | 59.9 | 60.5 | 61.0 |
| Condenser bubble point | °C. | 53.3 | 48.1 | 43.6 | 40.0 | 37.1 | 34.7 | 32.8 | 31.2 |
| Condenser exit liquid temperature | °C. | 52.3 | 47.1 | 42.6 | 39.0 | 36.1 | 33.7 | 31.8 | 30.2 |
| Condenser mean temperature | °C. | 53.4 | 51.6 | 50.2 | 49.0 | 48.1 | 47.3 | 46.7 | 46.1 |
| Condenser glide (in-out) | K | 0.2 | 7.1 | 13.1 | 18.1 | 22.0 | 25.2 | 27.8 | 29.8 |

TABLE 38

Theoretical Performance Data of Selected R-744/R600a/R-1234ze(E) blends containing 16-30% R-744 and 9% R600a

| | | Composition $CO_2$/R600a/R-1234ze(E) % by weight ▶ | | | | | | | |
|---|---|---|---|---|---|---|---|---|---|
| | | 16/9/75 | 18/9/73 | 20/9/71 | 22/9/69 | 24/9/67 | 26/9/65 | 28/9/63 | 30/9/61 |
| COP (heating) | | 2.20 | 2.21 | 2.22 | 2.22 | 2.23 | 2.23 | 2.23 | 2.23 |
| COP relative to Reference | | 104.5% | 104.9% | 105.2% | 105.4% | 105.6% | 105.7% | 105.7% | 105.7% |
| Volumetric heating capacity at suction | kJ/m3 | 1376 | 1475 | 1576 | 1678 | 1782 | 1887 | 1992 | 2099 |
| Capacity relative to Reference | | 156.6% | 167.8% | 179.3% | 191.0% | 202.8% | 214.7% | 226.7% | 238.8% |
| Critical temperature | °C. | 90.77 | 88.30 | 85.93 | 83.65 | 81.45 | 79.35 | 77.32 | 75.36 |
| Critical pressure | bar | 48.27 | 49.13 | 49.96 | 50.78 | 51.58 | 52.37 | 53.15 | 53.92 |
| Condenser enthalpy change | kJ/kg | 289.7 | 294.9 | 299.7 | 304.3 | 308.7 | 312.9 | 317.0 | 320.9 |
| Pressure ratio | | 16.43 | 16.06 | 15.68 | 15.31 | 14.95 | 14.60 | 14.26 | 13.94 |
| Refrigerant mass flow | kg/hr | 24.9 | 24.4 | 24.0 | 23.7 | 23.3 | 23.0 | 22.7 | 22.4 |
| Compressor discharge temperature | °C. | 134.8 | 137.0 | 139.1 | 141.2 | 143.2 | 145.1 | 147.1 | 149.0 |
| Evaporator inlet pressure | bar | 1.26 | 1.36 | 1.45 | 1.55 | 1.66 | 1.77 | 1.88 | 1.99 |
| Condenser inlet pressure | bar | 20.3 | 21.4 | 22.4 | 23.5 | 24.5 | 25.5 | 26.5 | 27.5 |
| Evaporator inlet temperature | °C. | −34.9 | −35.8 | −36.8 | −37.7 | −38.7 | −39.7 | −40.6 | −41.6 |
| Evaporator dewpoint | °C. | −24.7 | −24.1 | −23.5 | −22.9 | −22.4 | −22.0 | −21.6 | −21.3 |
| Evaporator exit gas temperature | °C. | −19.7 | −19.1 | −18.5 | −17.9 | −17.4 | −17.0 | −16.6 | −16.3 |
| Evaporator mean temperature | °C. | −29.8 | −29.9 | −30.1 | −30.3 | −30.6 | −30.8 | −31.1 | −31.4 |
| Evaporator glide (out-in) | K | 10.2 | 11.8 | 13.3 | 14.8 | 16.2 | 17.7 | 19.0 | 20.3 |
| Compressor suction pressure | bar | 1.23 | 1.33 | 1.43 | 1.53 | 1.64 | 1.75 | 1.86 | 1.97 |
| Compressor discharge pressure | bar | 20.3 | 21.4 | 22.4 | 23.5 | 24.5 | 25.5 | 26.5 | 27.5 |
| Suction line pressure drop | Pa/m | 163 | 150 | 138 | 128 | 120 | 112 | 105 | 99 |
| Pressure drop relative to reference | | 55.6% | 51.2% | 47.3% | 44.0% | 41.0% | 38.3% | 35.9% | 33.8% |
| Condenser dew point | °C. | 61.2 | 61.4 | 61.4 | 61.2 | 61.0 | 60.7 | 60.4 | 59.9 |
| Condenser bubble point | °C. | 29.9 | 28.8 | 27.9 | 27.1 | 26.4 | 25.8 | 25.3 | 24.9 |
| Condenser exit liquid temperature | °C. | 28.9 | 27.8 | 26.9 | 26.1 | 25.4 | 24.8 | 24.3 | 23.9 |
| Condenser mean temperature | °C. | 45.6 | 45.1 | 44.6 | 44.2 | 43.7 | 43.3 | 42.9 | 42.4 |
| Condenser glide (in-out) | K | 31.3 | 32.6 | 33.5 | 34.2 | 34.6 | 34.9 | 35.0 | 35.0 |

TABLE 39

Theoretical Performance Data of Selected R-744/R600a/R-1234ze(E) blends containing 0-14% R-744 and 10% RG00a

| | | Composition $CO_2$/R600a/R-1234ze(E) % by weight ▶ | | | | | | | |
|---|---|---|---|---|---|---|---|---|---|
| | | 0/10/90 | 2/10/88 | 4/10/86 | 6/10/84 | 8/10/82 | 10/10/80 | 12/10/78 | 14/10/76 |
| COP (heating) | | 1.97 | 2.03 | 2.08 | 2.11 | 2.14 | 2.16 | 2.18 | 2.19 |
| COP relative to Reference | | 93.6% | 96.4% | 98.6% | 100.3% | 101.5% | 102.5% | 103.3% | 103.9% |
| Volumetric heating capacity at suction | kJ/m3 | 677 | 753 | 834 | 918 | 1004 | 1094 | 1186 | 1280 |
| Capacity relative to Reference | | 77.0% | 85.7% | 94.9% | 104.4% | 114.3% | 124.5% | 134.9% | 145.7% |
| Critical temperature | °C. | 114.32 | 111.32 | 108.25 | 105.22 | 102.27 | 99.42 | 96.67 | 94.02 |
| Critical pressure | bar | 40.52 | 41.78 | 42.91 | 43.97 | 44.99 | 45.96 | 46.91 | 47.82 |
| Condenser enthalpy change | kJ/kg | 220.8 | 234.0 | 245.7 | 255.9 | 264.7 | 272.5 | 279.4 | 285.6 |
| Pressure ratio | | 17.27 | 17.50 | 17.64 | 17.65 | 17.54 | 17.33 | 17.06 | 16.74 |
| Refrigerant mass flow | kg/hr | 32.6 | 30.8 | 29.3 | 28.1 | 27.2 | 26.4 | 25.8 | 25.2 |
| Compressor discharge temperature | °C. | 110.1 | 114.0 | 117.7 | 121.1 | 124.2 | 127.0 | 129.7 | 132.1 |
| Evaporator inlet pressure | bar | 0.72 | 0.77 | 0.82 | 0.88 | 0.94 | 1.02 | 1.09 | 1.18 |
| Condenser inlet pressure | bar | 11.3 | 12.4 | 13.5 | 14.7 | 15.8 | 17.0 | 18.1 | 19.2 |
| Evaporator inlet temperature | °C. | −29.0 | −29.7 | −30.3 | −30.9 | −31.6 | −32.4 | −33.2 | −34.0 |
| Evaporator dewpoint | °C. | −29.8 | −29.4 | −28.8 | −28.2 | −27.5 | −26.8 | −26.1 | −25.4 |
| Evaporator exit gas temperature | °C. | −24.8 | −24.4 | −23.8 | −23.2 | −22.5 | −21.8 | −21.1 | −20.4 |
| Evaporator mean temperature | °C. | −29.4 | −29.5 | −29.6 | −29.6 | −29.6 | −29.6 | −29.6 | −29.7 |
| Evaporator glide (out-in) | K | −0.7 | 0.3 | 1.5 | 2.8 | 4.1 | 5.6 | 7.1 | 8.6 |
| Compressor suction pressure | bar | 0.66 | 0.71 | 0.77 | 0.83 | 0.90 | 0.98 | 1.06 | 1.15 |
| Compressor discharge pressure | bar | 11.3 | 12.4 | 13.5 | 14.7 | 15.8 | 17.0 | 18.1 | 19.2 |
| Suction line pressure drop | Pa/m | 405 | 348 | 303 | 267 | 238 | 214 | 194 | 177 |
| Pressure drop relative to reference | | 138.6% | 119.3% | 103.9% | 91.5% | 81.5% | 73.2% | 66.3% | 60.4% |
| Condenser dew point | °C. | 53.5 | 55.2 | 56.7 | 58.0 | 59.1 | 59.9 | 60.6 | 61.0 |
| Condenser bubble point | °C. | 53.4 | 48.2 | 43.7 | 40.1 | 37.1 | 34.8 | 32.8 | 31.2 |
| Condenser exit liquid temperature | °C. | 52.4 | 47.2 | 42.7 | 39.1 | 36.1 | 33.8 | 31.8 | 30.2 |
| Condenser mean temperature | °C. | 53.5 | 51.7 | 50.2 | 49.1 | 48.1 | 47.4 | 46.7 | 46.1 |
| Condenser glide (in-out) | K | 0.2 | 7.0 | 13.0 | 18.0 | 22.0 | 25.2 | 27.7 | 29.8 |

TABLE 40

Theoretical Performance Data of Selected R-744/R600a/R-1234ze(E) blends containing 16-30% R-744 and 10% RG00a

| | | Composition $CO_2$/R600a/R-1234ze(E) % by weight▶ | | | | | | | |
|---|---|---|---|---|---|---|---|---|---|
| | | 16/10/74 | 18/10/72 | 20/10/70 | 22/10/68 | 24/10/66 | 26/10/64 | 28/10/62 | 30/10/60 |
| COP (heating) | | 2.20 | 2.21 | 2.22 | 2.22 | 2.22 | 2.23 | 2.23 | 2.23 |
| COP relative to Reference | | 104.4% | 104.8% | 105.1% | 105.4% | 105.5% | 105.6% | 105.7% | 105.7% |
| Volumetric heating capacity at suction | kJ/m3 | 1377 | 1475 | 1576 | 1678 | 1781 | 1885 | 1990 | 2096 |
| Capacity relative to Reference | | 156.7% | 167.9% | 179.3% | 190.9% | 202.7% | 214.6% | 226.5% | 238.6% |
| Critical temperature | °C. | 91.47 | 89.02 | 86.66 | 84.39 | 82.21 | 80.10 | 78.08 | 76.13 |
| Critical pressure | bar | 48.71 | 49.58 | 50.43 | 51.26 | 52.08 | 52.88 | 53.67 | 54.45 |
| Condenser enthalpy change | kJ/kg | 291.2 | 296.4 | 301.3 | 305.9 | 310.3 | 314.5 | 318.5 | 322.5 |
| Pressure ratio | | 16.39 | 16.02 | 15.65 | 15.28 | 14.92 | 14.58 | 14.24 | 13.92 |
| Refrigerant mass flow | kg/hr | 24.7 | 24.3 | 23.9 | 23.5 | 23.2 | 22.9 | 22.6 | 22.3 |
| Compressor discharge temperature | °C. | 134.5 | 136.7 | 138.8 | 140.8 | 142.8 | 144.7 | 146.6 | 148.5 |
| Evaporator inlet pressure | bar | 1.27 | 1.36 | 1.45 | 1.56 | 1.66 | 1.77 | 1.88 | 1.99 |
| Condenser inlet pressure | bar | 20.3 | 21.4 | 22.4 | 23.4 | 24.5 | 25.5 | 26.5 | 27.4 |
| Evaporator inlet temperature | °C. | −34.8 | −35.7 | −36.7 | −37.6 | −38.6 | −39.5 | −40.5 | −41.5 |
| Evaporator dewpoint | °C. | −24.7 | −24.1 | −23.5 | −23.0 | −22.5 | −22.0 | −21.6 | −21.3 |
| Evaporator exit gas temperature | °C. | −19.7 | −19.1 | −18.5 | −18.0 | −17.5 | −17.0 | −16.6 | −16.3 |
| Evaporator mean temperature | °C. | −29.8 | −29.9 | −30.1 | −30.3 | −30.5 | −30.8 | −31.1 | −31.4 |
| Evaporator glide (out-in) | K | 10.1 | 11.6 | 13.1 | 14.6 | 16.1 | 17.5 | 18.9 | 20.2 |
| Compressor suction pressure | bar | 1.24 | 1.33 | 1.43 | 1.53 | 1.64 | 1.75 | 1.86 | 1.97 |
| Compressor discharge pressure | bar | 20.3 | 21.4 | 22.4 | 23.4 | 24.5 | 25.5 | 26.5 | 27.4 |
| Suction line pressure drop | Pa/m | 162 | 149 | 138 | 128 | 119 | 111 | 105 | 98 |
| Pressure drop relative to reference | | 55.4% | 51.0% | 47.2% | 43.8% | 40.8% | 38.2% | 35.8% | 33.7% |
| Condenser dew point | °C. | 61.3 | 61.4 | 61.4 | 61.4 | 61.2 | 60.9 | 60.5 | 60.1 |
| Condenser bubble point | °C. | 29.9 | 28.8 | 27.9 | 27.1 | 26.4 | 25.8 | 25.3 | 24.9 |
| Condenser exit liquid temperature | °C. | 28.9 | 27.8 | 26.9 | 26.1 | 25.4 | 24.8 | 24.3 | 23.9 |
| Condenser mean temperature | °C. | 45.6 | 45.1 | 44.7 | 44.2 | 43.8 | 43.4 | 42.9 | 42.5 |
| Condenser glide (in-out) | K | 31.4 | 32.6 | 33.6 | 34.3 | 34.7 | 35.0 | 35.2 | 35.2 |

TABLE 41

Theoretical Performance Data of Selected R-744/R-1234ze(E) blends containing 0-14% R-744

| | | Composition $CO_2$/R-1234ze(E) % by weight▶ | | | | | | | |
|---|---|---|---|---|---|---|---|---|---|
| | | 0/100 | 2/98 | 4/96 | 6/94 | 8/92 | 10/90 | 12/88 | 14/86 |
| COP (heating) | | 1.99 | 2.05 | 2.10 | 2.14 | 2.16 | 2.18 | 2.20 | 2.21 |
| COP (heating) relative to Reference | | 94.4% | 97.4% | 99.6% | 101.3% | 102.5% | 103.5% | 104.3% | 104.9% |
| Volumetric heating capacity at suction | kJ/m3 | 615 | 695 | 778 | 864 | 953 | 1046 | 1141 | 1239 |
| Capacity relative to Reference | | 70.0% | 79.1% | 88.6% | 98.3% | 108.5% | 119.0% | 129.8% | 141.0% |
| Critical temperature | °C. | 109.89 | 105.93 | 102.20 | 98.69 | 95.38 | 92.25 | 89.29 | 86.48 |
| Critical pressure | bar | 36.57 | 37.34 | 38.10 | 38.87 | 39.63 | 40.40 | 41.16 | 41.92 |
| Condenser enthalpy change | kJ/kg | 210.2 | 223.7 | 235.1 | 244.8 | 253.2 | 260.5 | 267.2 | 273.2 |
| Pressure ratio | | 18.75 | 18.99 | 19.05 | 18.95 | 18.71 | 18.39 | 18.00 | 17.58 |
| Refrigerant mass flow | kg/hr | 34.2 | 32.2 | 30.6 | 29.4 | 28.4 | 27.6 | 27.0 | 26.4 |
| Compressor discharge temperature | °C. | 112.8 | 117.1 | 121.1 | 124.7 | 127.9 | 131.0 | 133.8 | 136.5 |
| Evaporator inlet pressure | bar | 0.65 | 0.69 | 0.74 | 0.80 | 0.87 | 0.95 | 1.03 | 1.11 |
| Condenser inlet pressure | bar | 10.7 | 11.9 | 13.1 | 14.3 | 15.5 | 16.7 | 17.8 | 19.0 |
| Evaporator inlet temperature | °C. | −28.9 | −29.6 | −30.3 | −31.1 | −31.9 | −32.7 | −33.6 | −34.5 |
| Evaporator dewpoint | °C. | −30.3 | −29.7 | −29.0 | −28.3 | −27.5 | −26.6 | −25.8 | −25.1 |
| Evaporator exit gas temperature | °C. | −25.3 | −24.7 | −24.0 | −23.3 | −22.5 | −21.6 | −20.8 | −20.1 |
| Evaporator mean temperature | °C. | −29.6 | −29.7 | −29.7 | −29.7 | −29.7 | −29.7 | −29.7 | −29.8 |
| Evaporator glide (out-in) | K | −1.3 | −0.1 | 1.3 | 2.8 | 4.4 | 6.0 | 7.7 | 9.4 |
| Compressor suction pressure | bar | 0.57 | 0.63 | 0.69 | 0.75 | 0.83 | 0.91 | 0.99 | 1.08 |
| Compressor discharge pressure | bar | 10.7 | 11.9 | 13.1 | 14.3 | 15.5 | 16.7 | 17.8 | 19.0 |
| Suction line pressure drop | Pa/m | 462 | 390 | 336 | 294 | 259 | 231 | 208 | 189 |
| Pressure drop relative to reference | | 158.3% | 133.6% | 115.0% | 100.5% | 88.8% | 79.2% | 71.3% | 64.6% |
| Condenser dew point | °C. | 53.1 | 55.1 | 56.7 | 58.1 | 59.2 | 60.0 | 60.5 | 60.9 |
| Condenser bubble point | °C. | 53.0 | 47.1 | 42.6 | 38.9 | 36.1 | 33.8 | 31.9 | 30.4 |
| Condenser exit liquid temperature | °C. | 52.0 | 46.1 | 41.6 | 37.9 | 35.1 | 32.8 | 30.9 | 29.4 |
| Condenser mean temperature | °C. | 53.1 | 51.1 | 49.7 | 48.5 | 47.6 | 46.9 | 46.2 | 45.7 |
| Condenser glide (in-out) | K | 0.1 | 7.9 | 14.2 | 19.1 | 23.1 | 26.2 | 28.6 | 30.6 |

TABLE 42

Theoretical Performance Data of Selected R-744/R-1234ze(E) blends containing 16-30% R-744

| | | Composition $CO_2$/R-1234ze(E) % by weight | | | | | | | |
|---|---|---|---|---|---|---|---|---|---|
| | | 16/84 | 18/82 | 20/80 | 22/78 | 24/76 | 26/74 | 28/72 | 30/70 |
| COP (heating) | | 2.22 | 2.23 | 2.23 | 2.24 | 2.24 | 2.24 | 2.24 | 2.24 |
| COP (heating) relative to Reference | | 105.4% | 105.7% | 106.0% | 106.2% | 106.3% | 106.3% | 106.3% | 106.2% |
| Volumetric heating capacity at suction | kJ/m3 | 1339 | 1441 | 1545 | 1650 | 1756 | 1862 | 1969 | 2076 |
| Capacity relative to Reference | | 152.4% | 164.0% | 175.8% | 187.7% | 199.8% | 211.9% | 224.1% | 236.3% |
| Critical temperature | °C. | 83.81 | 81.28 | 78.87 | 76.57 | 74.38 | 72.28 | 70.28 | 68.37 |
| Critical pressure | bar | 42.68 | 43.44 | 44.20 | 44.96 | 45.72 | 46.47 | 47.23 | 47.98 |
| Condenser enthalpy change | kJ/kg | 278.7 | 283.9 | 288.9 | 293.6 | 298.1 | 302.5 | 306.8 | 311.0 |
| Pressure ratio | | 17.15 | 16.72 | 16.29 | 15.88 | 15.49 | 15.12 | 14.77 | 14.44 |
| Refrigerant mass flow | kg/hr | 25.8 | 25.4 | 24.9 | 24.5 | 24.2 | 23.8 | 23.5 | 23.1 |
| Compressor discharge temperature | °C. | 139.0 | 141.4 | 143.8 | 146.1 | 148.4 | 150.6 | 152.9 | 155.1 |
| Evaporator inlet pressure | bar | 1.20 | 1.29 | 1.39 | 1.49 | 1.60 | 1.70 | 1.81 | 1.92 |
| Condenser inlet pressure | bar | 20.1 | 21.2 | 22.3 | 23.3 | 24.4 | 25.4 | 26.5 | 27.5 |
| Evaporator inlet temperature | °C. | −35.5 | −36.5 | −37.6 | −38.7 | −39.7 | −40.8 | −41.9 | −42.9 |
| Evaporator dewpoint | °C. | −24.4 | −23.7 | −23.1 | −22.5 | −22.0 | −21.6 | −21.2 | −20.9 |
| Evaporator exit gas temperature | °C. | −19.4 | −18.7 | −18.1 | −17.5 | −17.0 | −16.6 | −16.2 | −15.9 |
| Evaporator mean temperature | °C. | −29.9 | −30.1 | −30.3 | −30.6 | −30.9 | −31.2 | −31.5 | −31.9 |
| Evaporator glide (out-in) | K | 11.2 | 12.9 | 14.5 | 16.2 | 17.7 | 19.2 | 20.7 | 22.0 |
| Compressor suction pressure | bar | 1.17 | 1.27 | 1.37 | 1.47 | 1.57 | 1.68 | 1.79 | 1.90 |
| Compressor discharge pressure | bar | 20.1 | 21.2 | 22.3 | 23.3 | 24.4 | 25.4 | 26.5 | 27.5 |
| Suction line pressure drop | Pa/m | 172 | 157 | 145 | 134 | 125 | 116 | 109 | 102 |
| Pressure drop relative to reference | | 58.8% | 53.9% | 49.7% | 45.9% | 42.7% | 39.8% | 37.2% | 35.0% |
| Condenser dew point | °C. | 61.2 | 61.2 | 61.2 | 61.0 | 60.8 | 60.4 | 60.0 | 59.5 |
| Condenser bubble point | °C. | 29.1 | 28.0 | 27.1 | 26.3 | 25.7 | 25.1 | 24.6 | 24.1 |
| Condenser exit liquid temperature | °C. | 28.1 | 27.0 | 26.1 | 25.3 | 24.7 | 24.1 | 23.6 | 23.1 |
| Condenser mean temperature | °C. | 45.1 | 44.6 | 44.1 | 43.7 | 43.2 | 42.7 | 42.3 | 41.8 |
| Condenser glide (in-out) | K | 32.1 | 33.2 | 34.1 | 34.7 | 35.1 | 35.3 | 35.4 | 35.3 |

Lubricant Miscibility Data

The miscibility of compositions of the invention were tested with the polyalkylene glycol (PAG) lubricant YN12. The lubricant was present in a concentration of 4% w/w. This concentration is representative of the typical oil concentration present in an air conditioning system. The results of these experiments were compared to the miscibility of pure R-1234yf. The results shown below demonstrate that the compositions of the invention are more miscible with PAG lubricants than R-1234yf.

| Temperature/° C. | 0 | 10 | 20 | 30 | 40 |
|---|---|---|---|---|---|
| R-1234yf (comparative) | opaque | opaque | opaque | very opaque | opaque |
| $CO_2$/propene/R-1234ze (6/4/90% by weight) | slighty opaque | slighty opaque | slighty opaque | very slighty opaque | very slighty opaque |

In summary, the invention provides new compositions that exhibit a surprising combination of advantageous properties including good refrigeration performance, low flammability, low GWP, and/or miscibility with lubricants compared to existing refrigerants such as R-134a and the proposed refrigerant R-1234yf. The combination of hydrocarbon together with carbon dioxide and R-1234ze(E) gives an improved refrigeration performance, more versatility in selection and application of compressor lubricant, without significantly increasing the flammability hazard of R-1234ze(E) itself. This combination of advantages is completely unexpected.

The invention is defined by the following claims.

What is claimed is:

1. A heat transfer composition comprising:
   (i) from about 50 to about 95% by weight R-1234ze(E);
   (ii) from about 2 to about 30% by weight R-744; and
   (iii) from about 3 to about 20% by weight of a third component selected from R-1270, R-290, R-600, R600a, and mixtures thereof.

2. A method for preparing the composition of claim 1, the composition comprising R-134a, the method comprising introducing R-1234ze(E), R-744, and the third component into a heat transfer device containing an existing heat transfer fluid which is R-134a.

3. A method according to claim 2 further comprising removing at least some of the existing R-134a from the heat transfer device before introducing the R-1234ze(E), R-744, and the third component.

4. A method for generating greenhouse gas emission credit comprising (i) replacing an existing compound or composition with the composition of claim 1, wherein the composition has a lower GWP than the existing compound or composition; and (ii) obtaining greenhouse gas emission credit for said replacing step.

5. A composition according to claim 1 comprising from about 4 to about 30% R-744 by weight.

6. A method of claim 4 wherein the use of the composition results in at least one of a lower Total Equivalent Warming Impact, or a lower Life-Cycle Carbon Production than is attained by use of the existing compound or composition.

7. A method of claim 4 carried out on a product from at least one field of air-conditioning, refrigeration, heat transfer, blowing agents, aerosols or sprayable propellants, gaseous dielectrics, cryosurgery, veterinary procedures, dental procedures, fire extinguishing, flame suppression, solvents, cleaners, air horns, pellet guns, topical anesthetics, or expansion applications.

8. A composition according to claim 1 wherein the composition has a critical temperature of greater than about 65° C.

9. A composition according to claim 1 wherein the third component is selected from propylene, propane, isobutane and mixtures thereof.

10. A composition according to claim 9 comprising from about 60 to about 95% R-1234ze(E), from about 4 to about 30% by weight R-744 and from about 1 to about 10% by weight propylene.

11. A composition according to claim 10 comprising from about 64 to about 88% R-1234ze(E), from about 10 to about 28% by weight R-744 and from about 2 to about 8% by weight propylene.

12. A composition according to claim 9 comprising from about 60 to about 95% R-1234ze(E), from about 4 to about 30% by weight R-744 and from about 1 to about 10% by weight propane.

13. A composition according to claim 12 comprising from about 64 to about 88% R-1234ze(E), from about 10 to about 28% by weight R-744 and from about 2 to about 8% by weight propane.

14. A composition according to claim 9 comprising from about 60 to about 95% R-1234ze(E), from about 4 to about 30% by weight R-744 and from about 1 to about 10% by weight isobutane.

15. A composition according to claim 14 comprising from about 64 to about 88% R-1234ze(E), from about 10 to about 28% by weight R-744 and from about 2 to about 8% by weight isobutane.

16. A composition according to claim 9 comprising from about 60 to about 95% R-1234ze(E), from about 4 to about 30% by weight R-744 and from about 1 to about 10% by weight n-butane.

17. A composition according to claim 16 comprising from about 64 to about 88% R-1234ze(E), from about 10 to about 28% by weight R-744 and from about 2 to about 8% by weight n-butane.

18. A composition according to claim 1 consisting essentially of R-1234ze(E), R-744 and the third component.

19. A composition according to claim 1, further comprising R-125.

20. A composition according to claim 19 wherein the composition has a critical temperature of greater than about 70° C.

21. A composition according to claim 1, wherein the composition has a GWP of less than 1000.

22. A composition according to claim 1, wherein the composition has a volumetric refrigeration capacity within about 15% of an existing refrigerant that the composition is intended to replace.

23. A composition according to claim 1, wherein the composition is less flammable than propylene alone, propane alone, n-butane alone, isobutane alone or R-1234yf alone.

24. A composition according to claim 23 wherein the composition has at least one of:
(a) a higher flammable limit;
(b) a higher ignition energy; or
(c) a lower flame velocity
compared to propylene alone, propane alone, n-butane alone, isobutane alone or R-1234yf alone.

25. A composition according to claim 1 wherein the composition has a fluorine ratio (F/(F+H)) of from about 0.42 to about 0.7.

26. A composition according to claim 1 wherein the composition is non-flammable.

27. A composition according to claim 1, wherein the composition has a cycle efficiency within about 5% of an existing refrigerant that the composition is intended to replace.

28. A composition according to claim 1, wherein the composition has a compressor discharge temperature within about 15K of an existing refrigerant that the composition is intended to replace.

29. A composition comprising a lubricant and the composition of claim 1.

30. A composition according to claim 29, wherein the lubricant is selected from mineral oil, silicone oil, PABs, POEs, PAGs, PAG esters, PVEs, poly (alpha-olefins) and combinations thereof.

31. A composition according to claim 29 further comprising a stabilizer.

32. A composition according to claim 31, wherein the stabilizer is selected from diene-based compounds, phosphates, phenol compounds and epoxides, and mixtures thereof.

33. A composition comprising a flame retardant and the composition of claim 1.

34. A composition according to claim 33, wherein the flame retardant is selected from the group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

35. A composition according to claim 1 wherein the composition is a refrigerant composition.

36. A heat transfer device containing the composition of claim 1.

37. A method according to claim 4 wherein the existing compound or composition is a heat transfer composition.

38. A heat transfer device according to claim 36 wherein the heat transfer device is a refrigeration device.

39. A heat transfer device according to claim 38 wherein the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

40. A heat transfer device according to claim 38 wherein the heat transfer device contains a compressor.

41. A blowing agent comprising the composition of claim 1.

42. A foamable composition comprising one or more components capable of forming foam and the composition of claim 1, wherein the one or more components capable of forming foam are selected from polyurethanes, thermoplastic polymers and resins, and mixtures thereof.

43. A method according to claim 37 wherein the heat transfer composition is a refrigerant selected from R-134a, R-1234yf, R-152a, R-404A, R-410A, R-507, R-407A, R-407B, R-407D, R-407E and R-407F.

44. A foam comprising the composition of claim 1.

45. A sprayable composition comprising material to be sprayed and a propellant comprising the composition of claim 1.

46. A method for cooling an article comprising condensing the composition of claim 1 and thereafter evaporating the composition in the vicinity of the article to be cooled.

47. A method for heating an article comprising condensing the composition of claim 1 in the vicinity of the article to be heated and thereafter evaporating the composition.

48. A method for extracting a substance from biomass comprising contacting biomass with a solvent comprising the composition of claim 1, and separating the substance from the solvent.

49. A method of cleaning an article comprising contacting the article with a solvent comprising the composition of claim 1.

50. A method of extracting a material from an aqueous solution comprising contacting the aqueous solution with a solvent comprising the composition of claim 1, and separating the material from the solvent.

51. A method for extracting a material from a particulate solid matrix comprising contacting the particulate solid matrix with a solvent comprising the composition of claim 1, and separating the material from the solvent.

52. A mechanical power generation device containing the composition of claim 1.

53. A mechanical power generating device according to claim 52 wherein the mechanical power generating device is adapted to use a Rankine Cycle or modification thereof to generate work from heat.

54. A method of retrofitting a heat transfer device comprising the step of removing an existing heat transfer fluid, and introducing the composition of claim 1.

55. A method of claim 54 wherein the heat transfer device is a refrigeration device.

56. A method according to claim 55 wherein the heat transfer device is an air conditioning system.

57. A method for reducing the environmental impact arising from the operation of a product comprising an existing compound or composition, the method comprising replacing at least partially the existing compound or composition with the composition of claim 1.

58. A method according to claim 57 wherein the product is selected from a heat transfer device, a blowing agent, a foamable composition, a sprayable composition, a solvent or a mechanical power generation device.

59. A method according to claim 58 wherein the product is a heat transfer device.

* * * * *